United States Patent [19]
Rosheim

[11] Patent Number: 6,105,455
[45] Date of Patent: Aug. 22, 2000

[54] ROBOTIC MANIPULATOR

[75] Inventor: Mark E. Rosheim, Minneapolis, Minn.

[73] Assignee: Ross-Hime Designs, Incorporated, Minneapolis, Minn.

[21] Appl. No.: 09/396,191

[22] Filed: Sep. 14, 1999

Related U.S. Application Data

[60] Division of application No. 08/951,555, Oct. 16, 1997, Pat. No. 5,979,264, which is a continuation-in-part of application No. 08/816,359, Mar. 13, 1997, Pat. No. 5,893,296.

[51] Int. Cl.$^7$ .................................................. G05G 11/00
[52] U.S. Cl. .................................... 74/490.06; 74/490.03; 74/490.05
[58] Field of Search ........................... 74/490.01, 490.03, 74/490.05, 490.06; 901/16, 23, 29

[56] References Cited

U.S. PATENT DOCUMENTS

| 125,880 | 4/1872 | Clemens. | |
|---|---|---|---|
| 2,988,904 | 6/1961 | Mazziotti | 64/21 |
| 3,075,368 | 1/1963 | Hulse | 64/20 |
| 3,477,249 | 11/1969 | Culver | 64/21 |
| 4,396,344 | 8/1983 | Sugimoto et al. | 414/735 |
| 4,674,947 | 6/1987 | Hamada et al. | 414/735 |
| 4,819,496 | 4/1989 | Shelef. | |
| 5,556,242 | 9/1996 | Sheldon et al.. | |
| 5,656,905 | 8/1997 | Tsai. | |
| 5,699,695 | 12/1997 | Canfield et al. | 74/940.06 |
| 5,715,729 | 2/1998 | Toyama et al.. | |
| 5,771,747 | 6/1998 | Sheldon | 74/248 |
| 5,865,063 | 2/1999 | Sheldon | 74/490 |

OTHER PUBLICATIONS

*IEEE* publication "A Pantograph Linkage Parallel Platform Master Hand Controller for Force–Reflection", May 1992 by Gregory Long and Curtis Collins.
*IEEE* publication "HEXA: a fast six–DOF fully–parallel robot", by Pierrot, Dauchez and Fournier, 1991 (Figure 4).
Publication "A Coarse–Fine Approach to Force–Reflecting Hand Controller Design", by Stocco and Salcudean, dated Apr. 22, 1996 (Figures 6, 7 and 8).
*IEEE* publication "Kinematic Analysis of a Novel 6–DOF Parallel Manipulator", by Cleary, and Brooks, (Figure 2), 1993.
*IEEE* publication "A New Analytical System Applying 6 DOF Parallel Line Manipulator for Evaluating Motion Sensation", Mimura & Funahashi, 1995.
"On the Development of the Agile Eye" by C. Gosselin et al., Dec. 1996.
P. 166 of *Machine Design*, Jun. 21, 1973.
P. 291 of *Mechanisms & Mechanical Devices Sourceboook*, by N. Chironis, entitled "Intertwining Links Produce True Constant–Motion Universal", 1991.
Pp. 124 through 127 and 162 and 163 from *Robot Wrist Actuators* by Mark E. Rosheim, 1989.
Cover page and pp 90 and 92 from Dec. 1994 issue of *Discover* magazine.
Pp. 131 through 133 from *Robot Evolution—The Development of Anthrobotics* by Mark E. Rosheim, 1994.
"Constant–Velocity Shaft Couplings" by K. H. Hunt, *Journal of Engineering for Industry*, May 1973.

*Primary Examiner*—David M. Fenstermacher
*Attorney, Agent, or Firm*—Kinney & Lange, P.A.

[57] ABSTRACT

A controlled relative motion system comprising a base support, a pivot holder and a plurality of pivoting links with the pivoting links rotatably coupled to both the base support and to members of the pivot holder to rotate about axes which extend in different directions for each of these rotatable couplings in a link, typically in accord with specific geometrical arrangements, and in different directions from similar axes in another of such links. Such systems can incorporate a variety of force imparting members to control movements of various ones of the pivoting links or pivot holder members. The pivoting links can be bent, and the pivot holder members can be hinged.

16 Claims, 44 Drawing Sheets

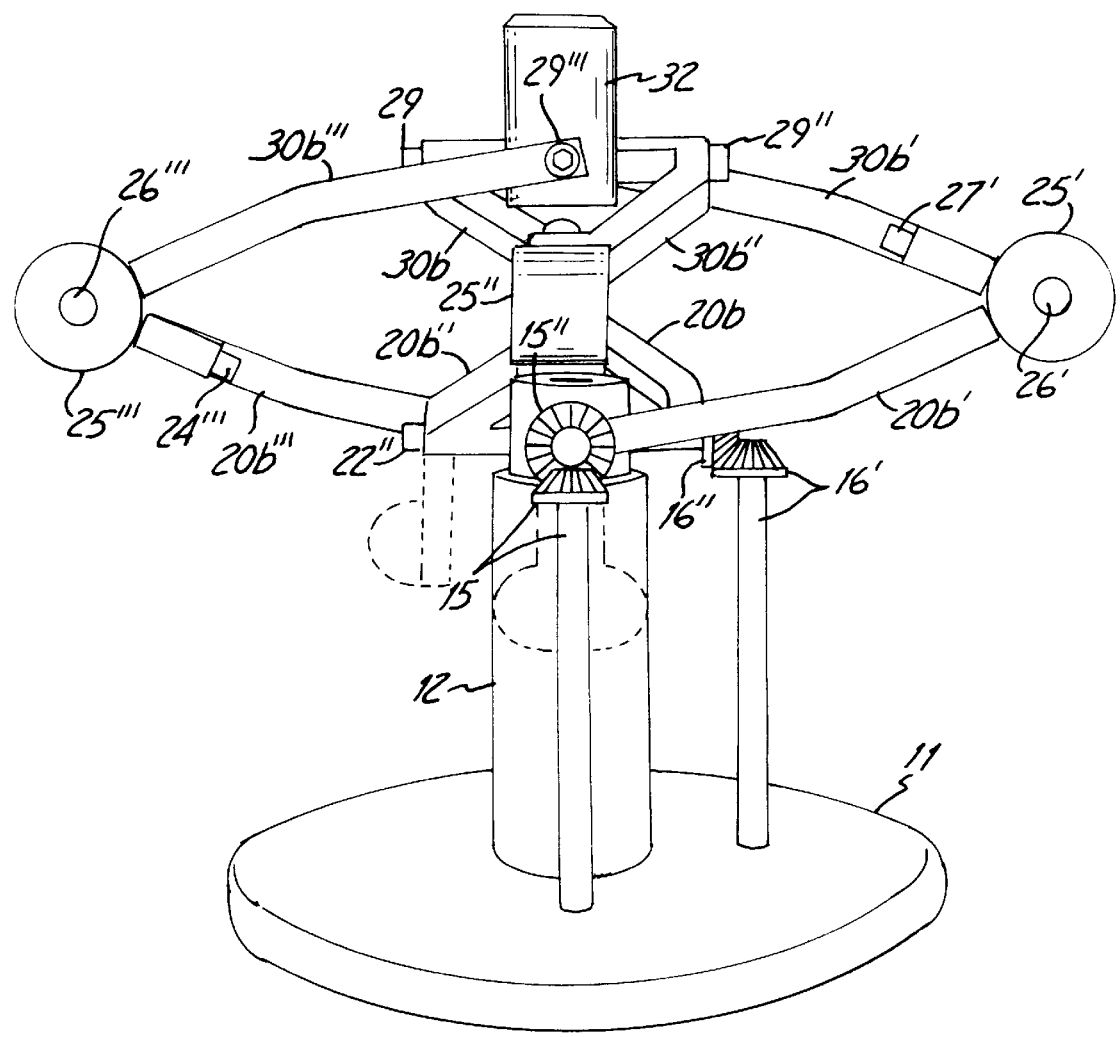

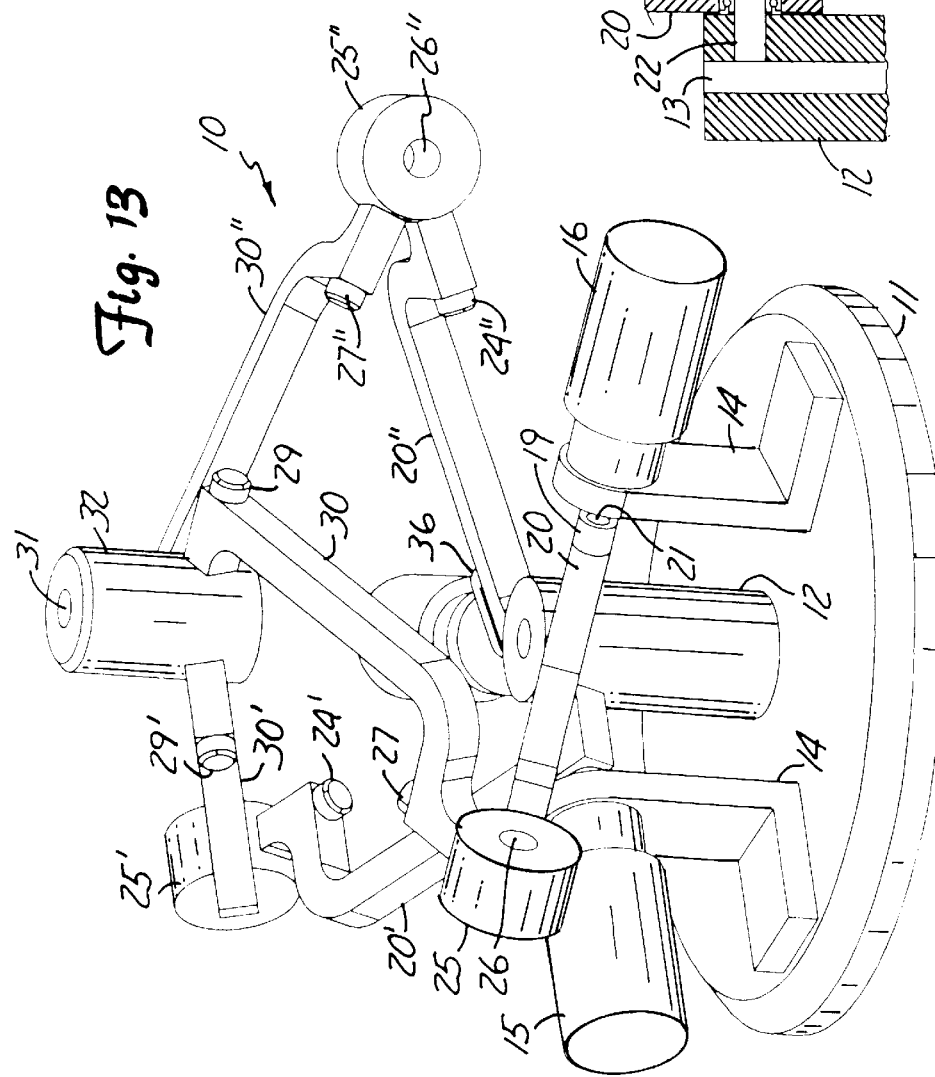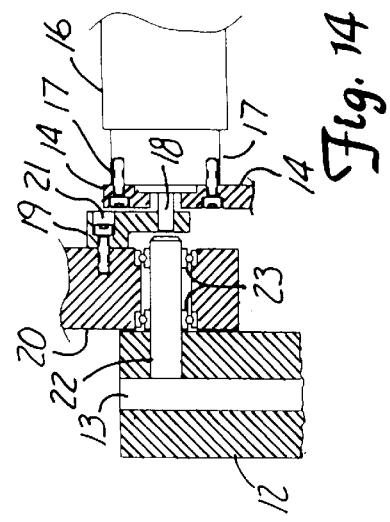

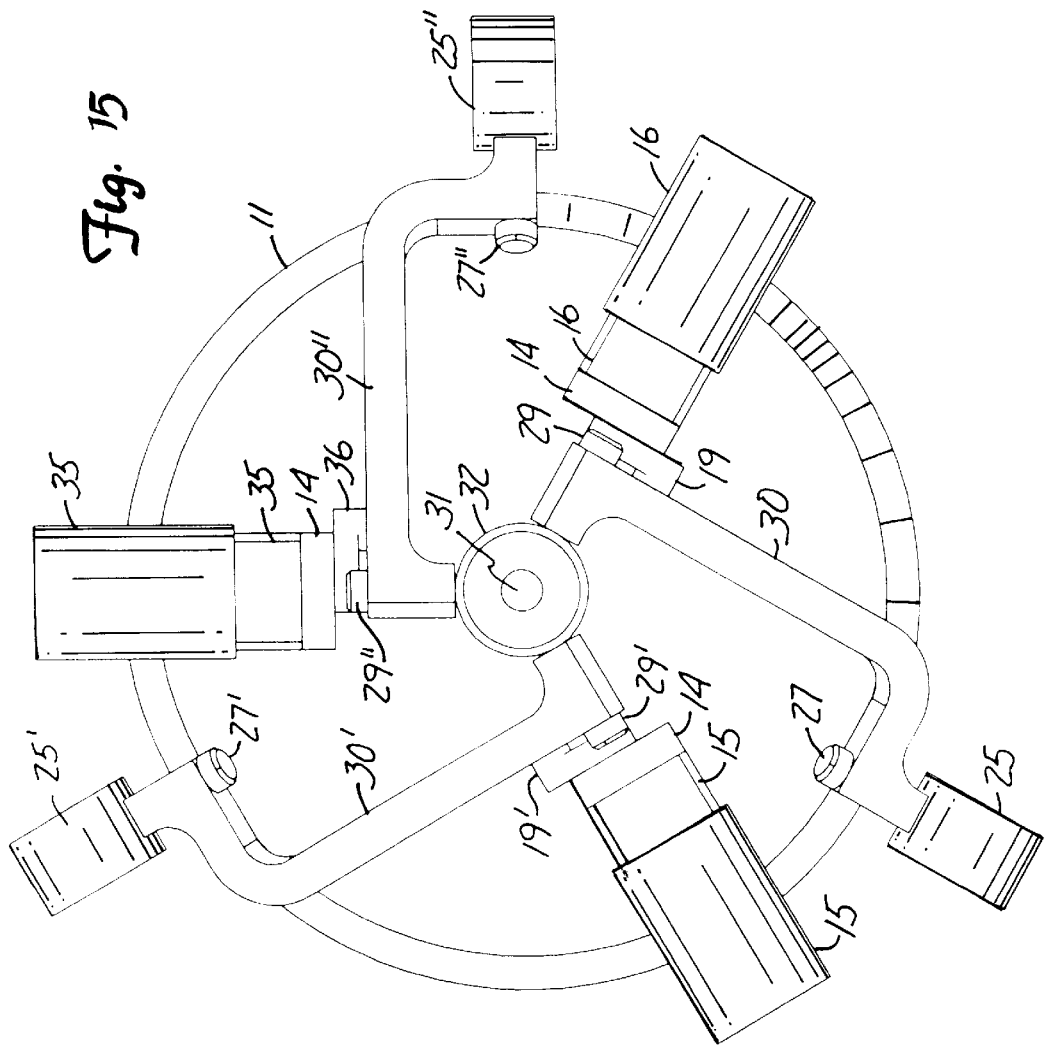

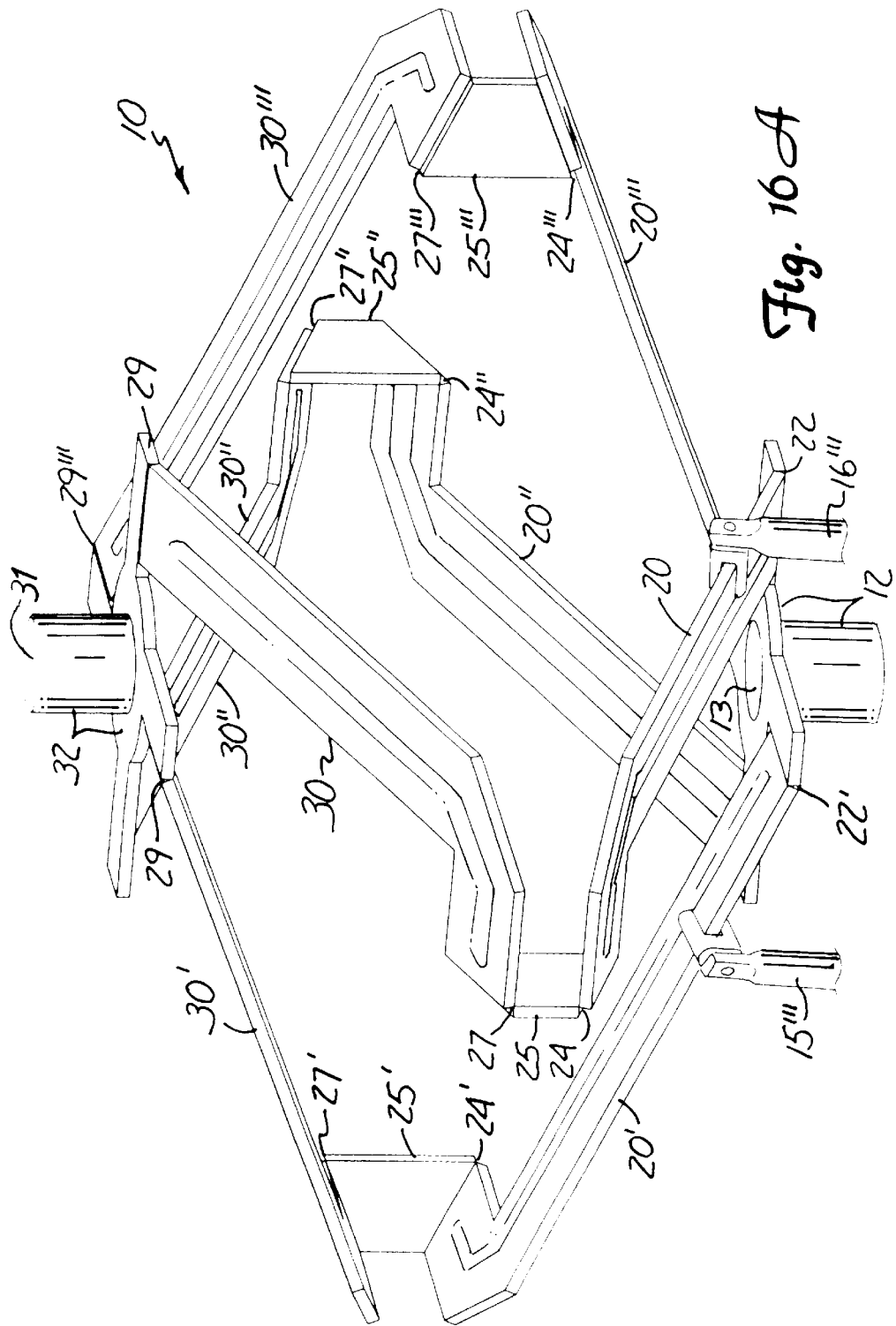

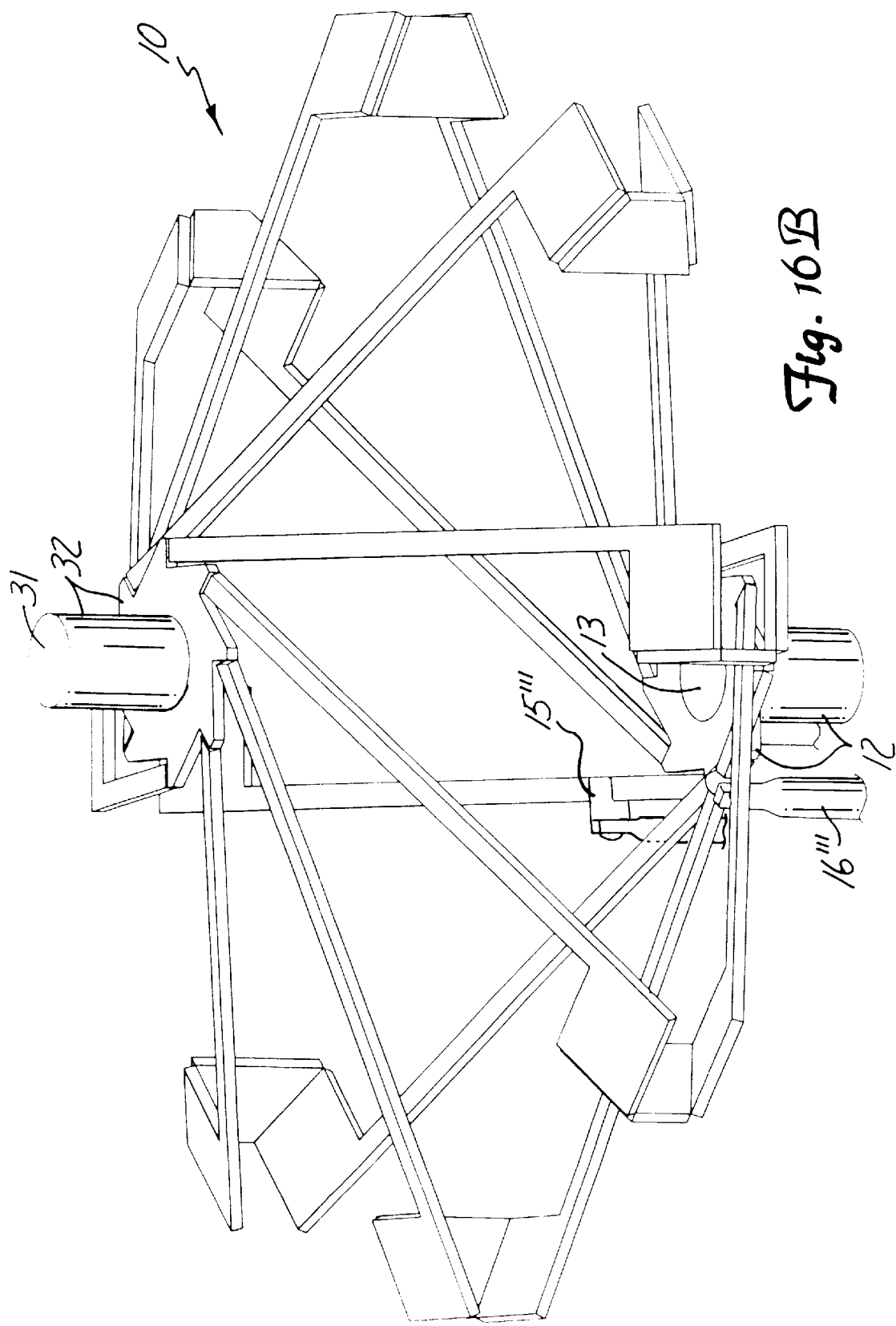

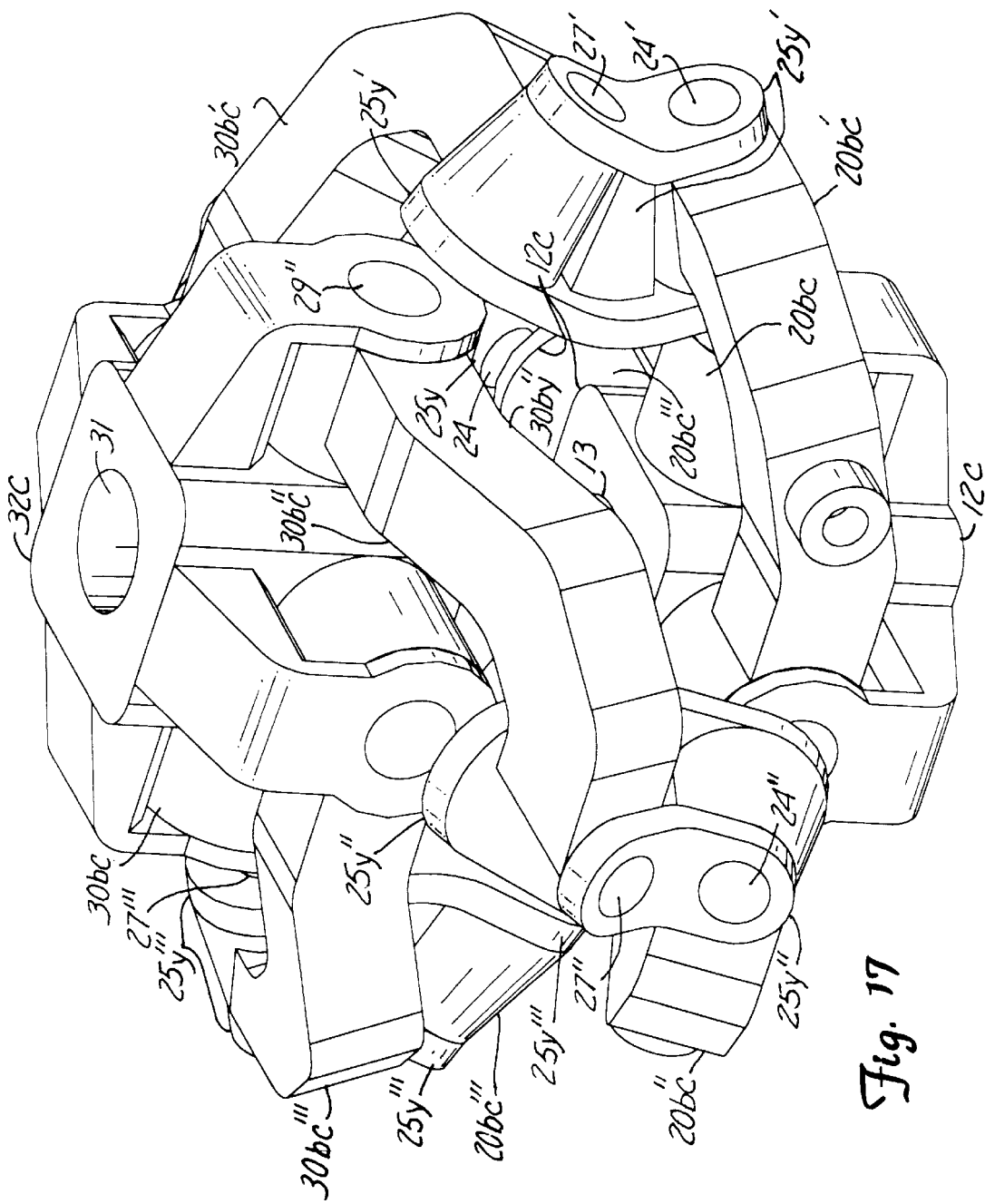

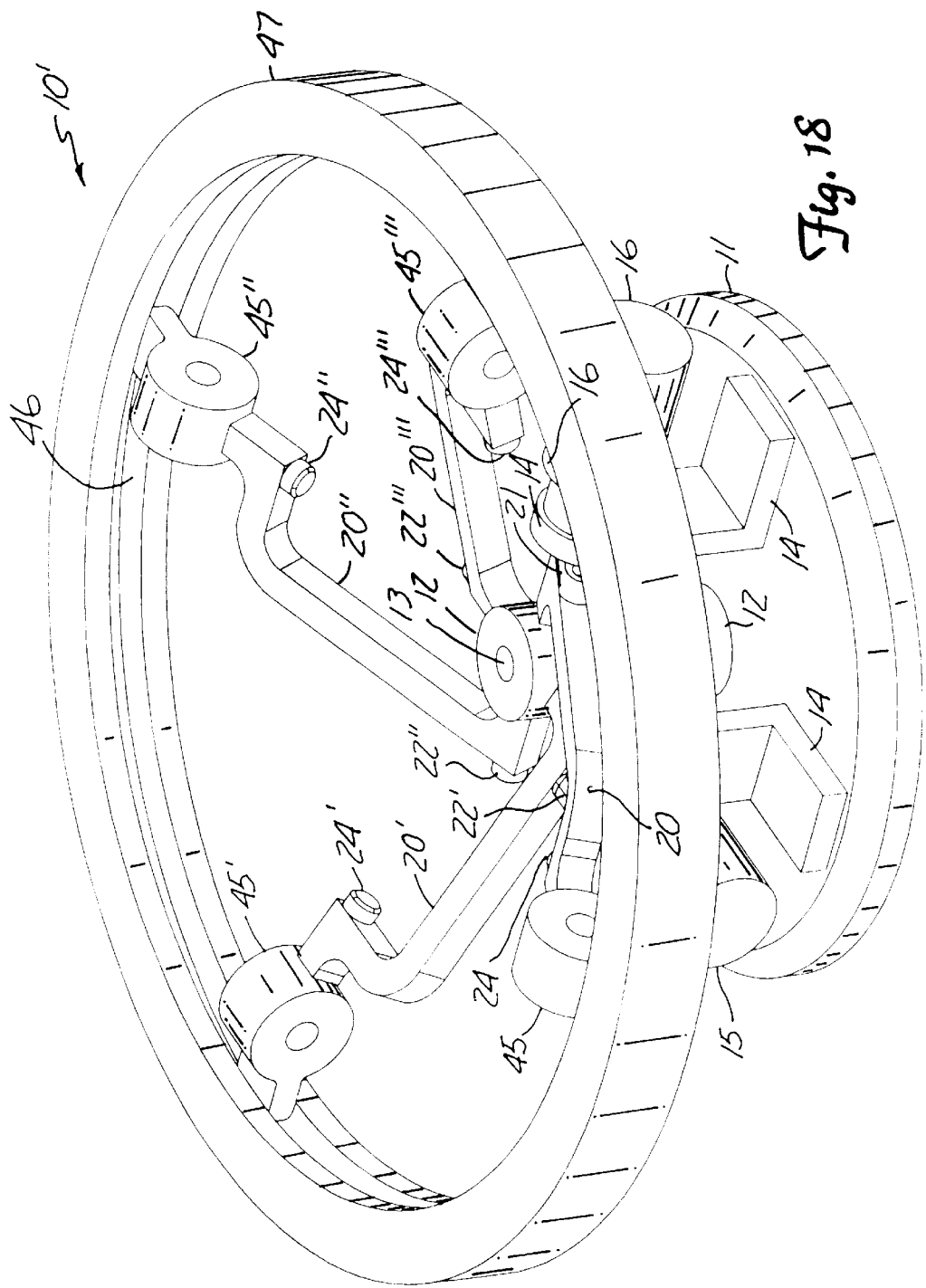

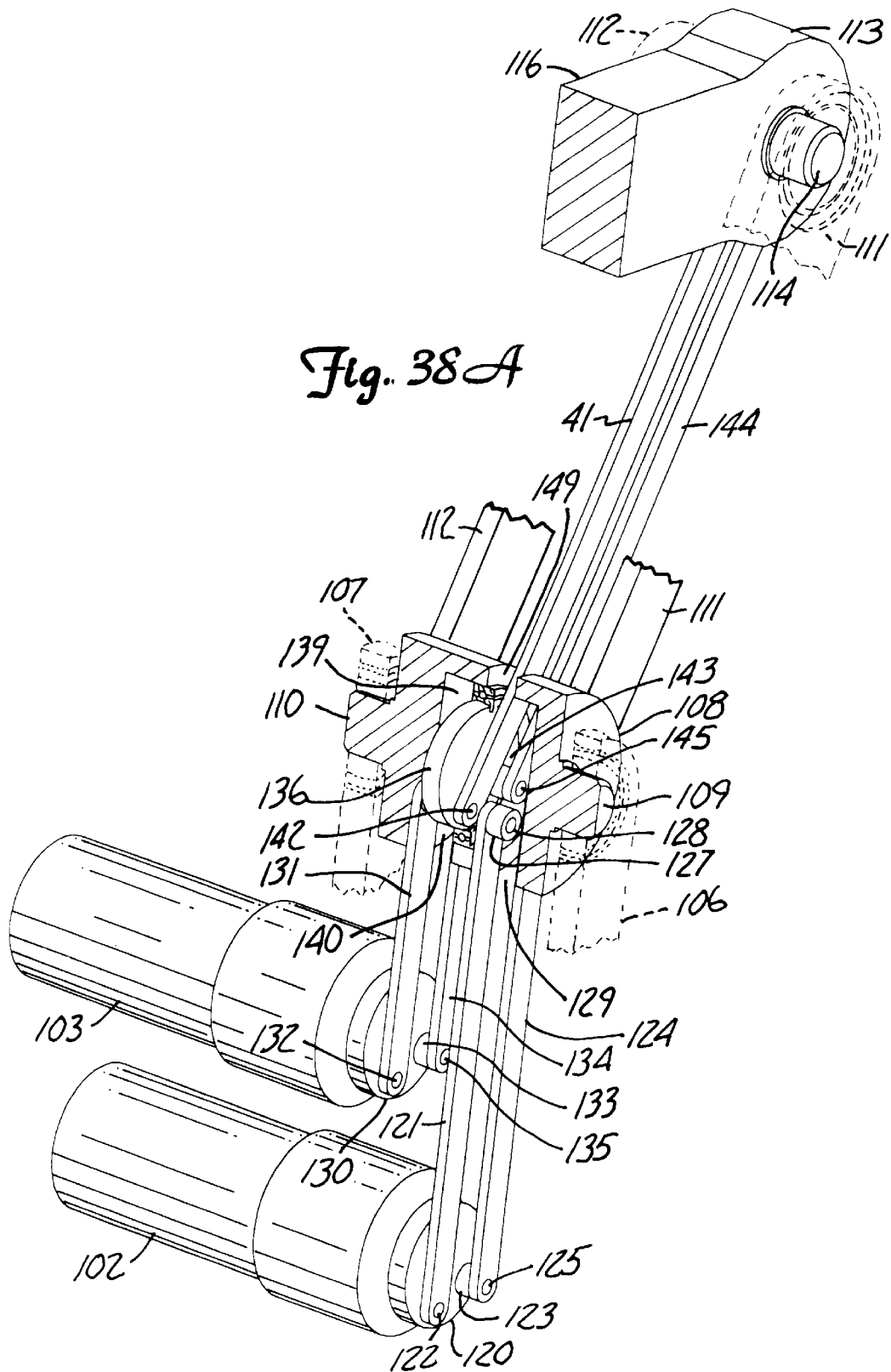

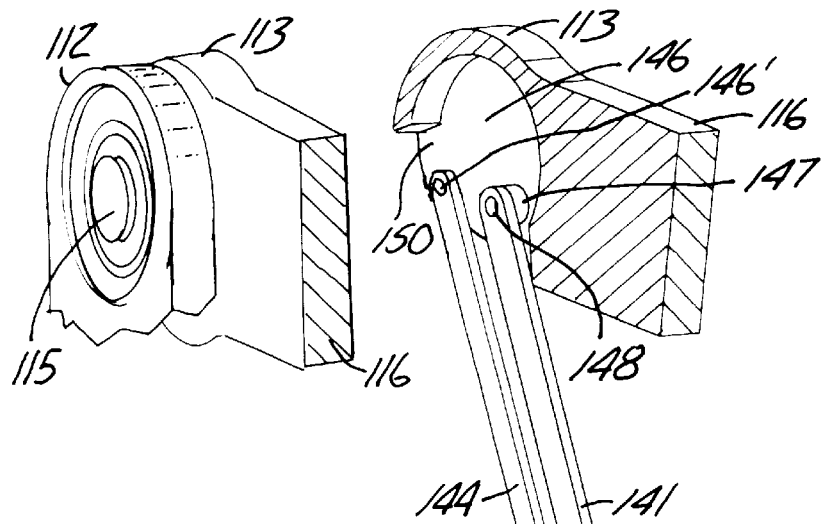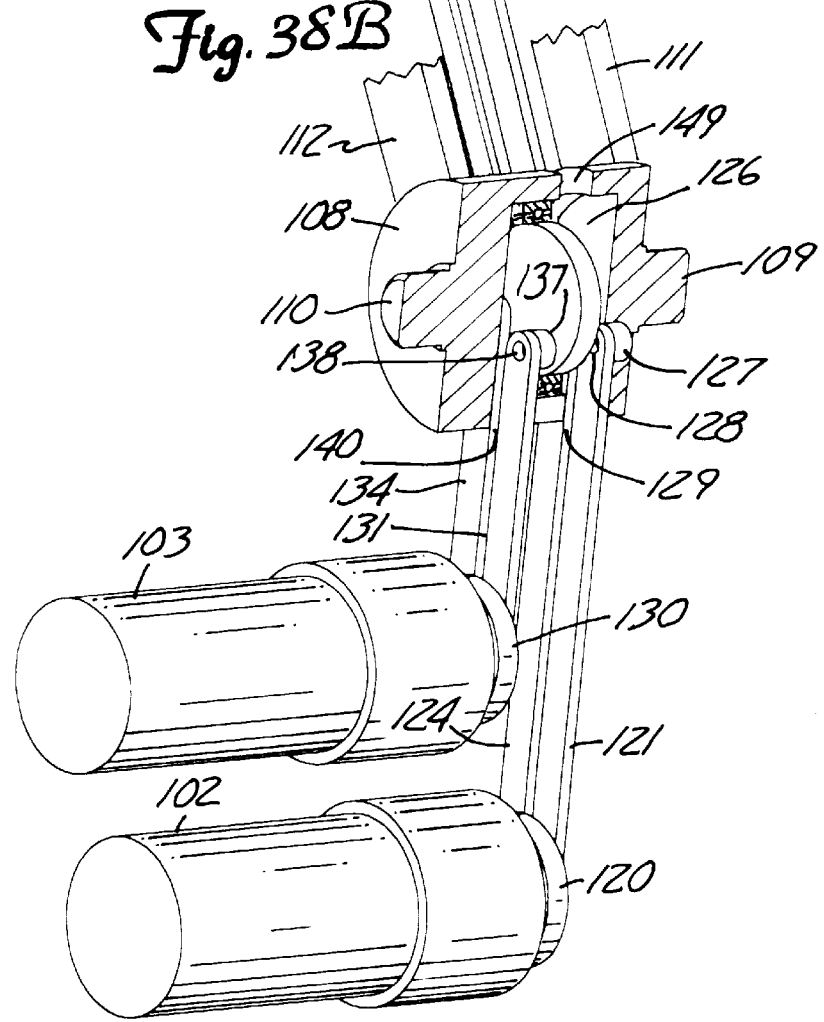
Fig. 38B

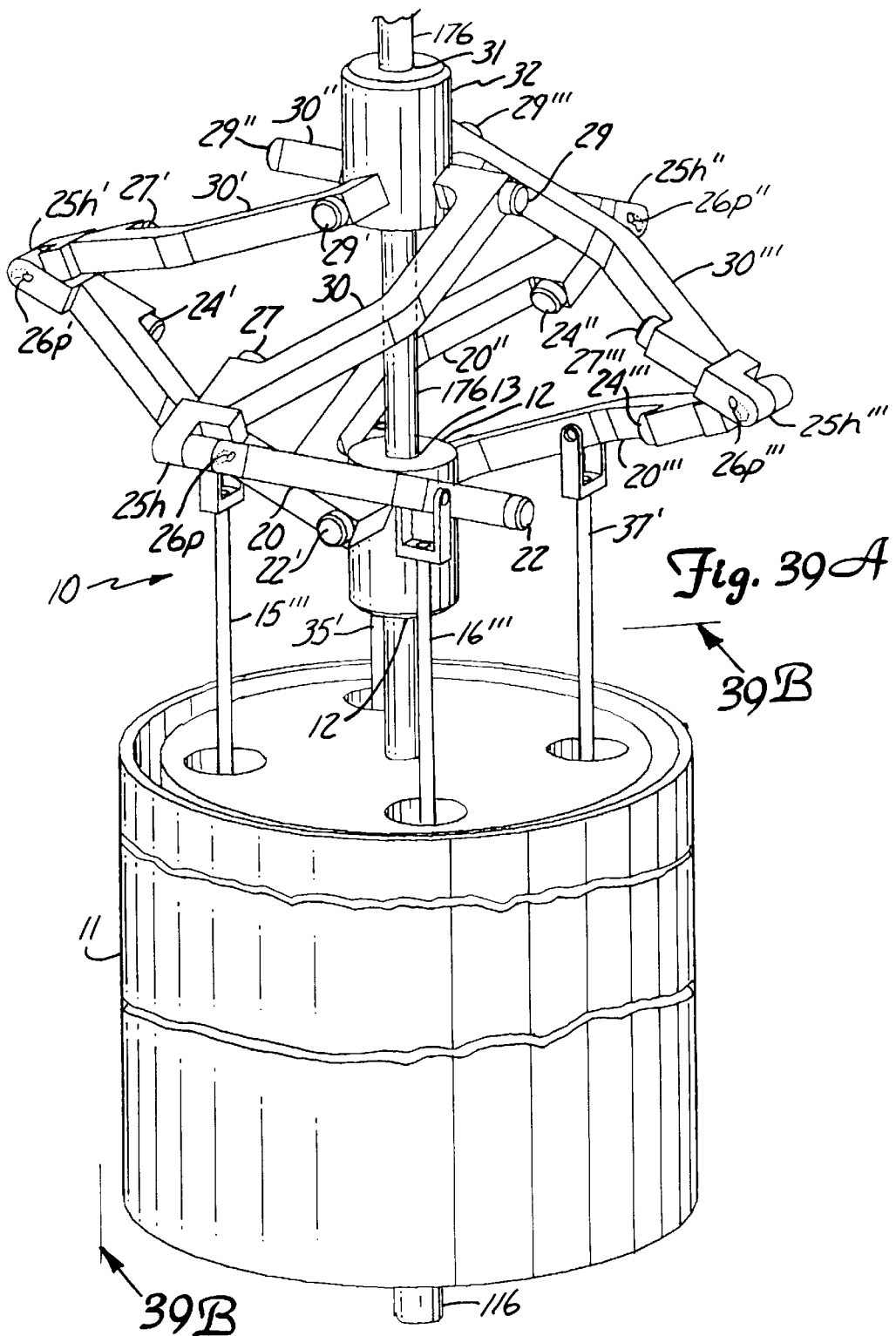

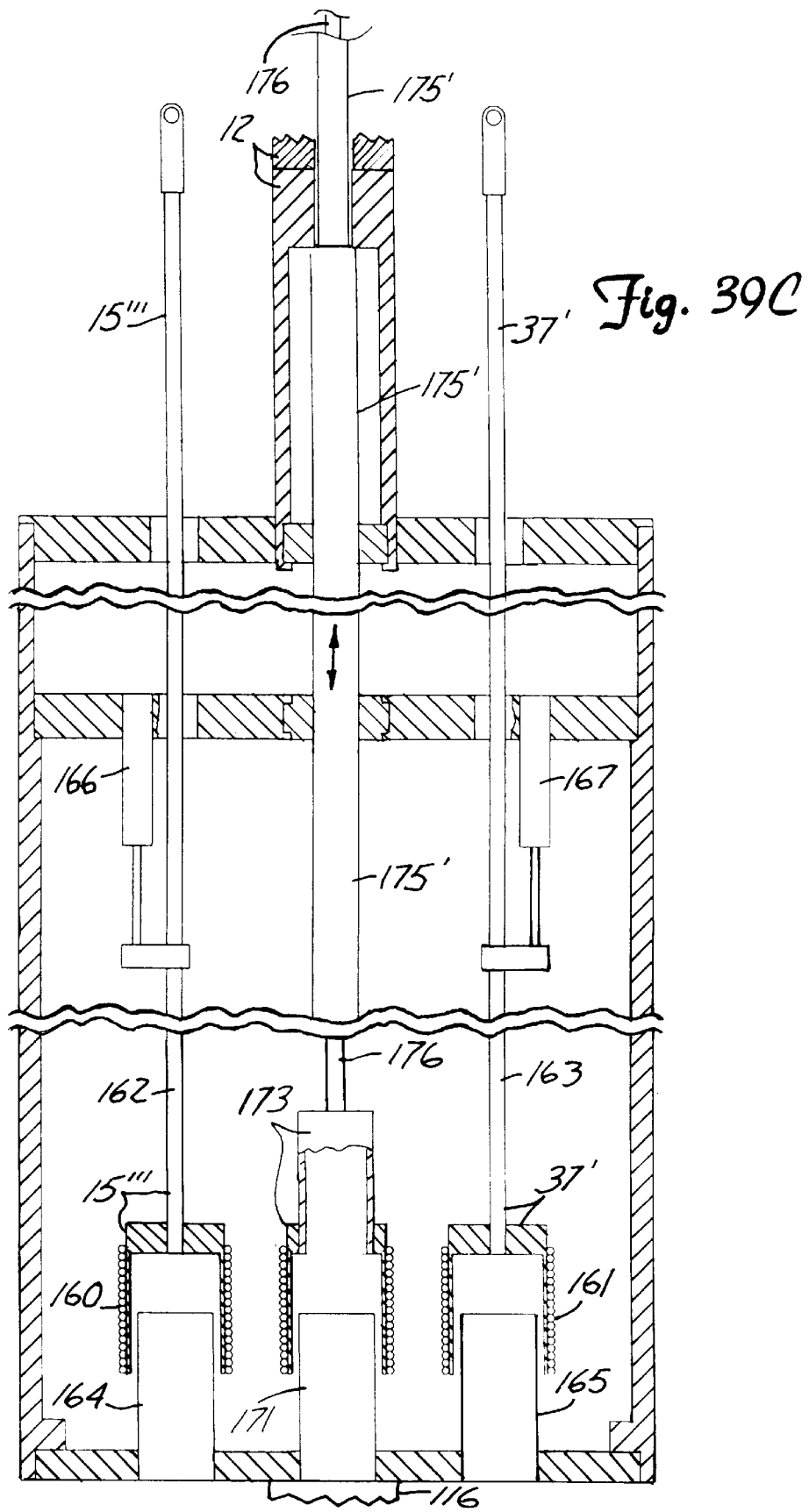

ROBOTIC MANIPULATOR

CROSS REFERENCE TO RELATED APPLICATIONS

This is a division of application Ser. No. 08/951,555, filed Oct. 16, 1997 now U.S. Pat. No. 5,979,264 for ROBOTIC MANIPULATOR which is a continuation-in-part of application Ser. No. 08/816,359, filed Mar. 13, 1997 now U.S. Pat. No. 5,893,296 for ROBOTIC MANIPULATOR.

BACKGROUND OF THE INVENTION

The present invention relates to controlled motion mechanical members used as a mechanical manipulator and, more particularly, to a motion controllable mechanical manipulator which can be formed from repeated use of components of relatively few component types.

A strong desire for increased automation in the workplace, and a desire to increase the use of animated figures depicting animals, humans or other characters in entertainment and other situations, along with an increased ability to control such mechanical manipulators has led to substantial efforts in the development of robotics. As a result, substantial advances have occurred in many aspects of robotics.

Perhaps the most widely used controlled component in robotic systems is a mechanical manipulator, that portion of a robot used to change the position of orientation of selected objects engaged by that manipulator. In many instances, such mechanical manipulators are desired to have capabilities similar to those of the human wrist or shoulder, that is, exhibiting two or more degrees of freedom of motion.

Although a number of such mechanical manipulators have been developed which to a greater or lesser degree achieve some of these desires therefor, most have been relatively complicated devices requiring complicated components and difficult assembly procedures or both. Many, in addition, represent compromises in having relatively limited range, or singularities within the ranges, or other limitations in performance. Thus, there is a strong desire for a mechanical manipulator which can, under control of the user, position objects anywhere over at least a hemispherical surface without any singularities in the operation of the device in this range, and which can be made both reliably and inexpensively.

SUMMARY OF THE INVENTION

The present invention provides a controlled relative motion system comprising a base support, a pivot holder and a plurality of pivoting links. The pivoting links are rotatably coupled to both the base support and to members of the pivot holder to rotate about axes which extend in different directions for each of these rotatable couplings in a link typically in accord with specific geometrical arrangements, and in different directions from similar axes in another of such links. The pivot holder can serve as a further base for a second similar controlled motion member system, or the pivot holder can be linked with a second plurality of pivoting links to a manipulable support. Such a manipulable support can be a part of, or support for, further such systems, or both. These systems can be supported on rotatable mounting arrangements at the base supports or pivot holders.

Such systems can incorporate a variety of force imparting members to control movements of various ones of the pivoting links or pivot holder members. Such members may be electric motors or linear actuators, and may be connected to the system directly or through drive trains and the like.

The pivoting links may be bent to allow the positions of the base and manipulable supports to be closer to one another. Pivot holders having hinged portions with one portion rotatably connected to a first plurality pivoting link and the other portion rotatably connected to a second plurality pivoting link provides a capability controlling the separation between the base and manipulable supports.

BRIEF DESCRIPTION OF THE DRAWINGS

FIG. 8 shows an elevation view of a further alternative embodiment of the present invention, FIGS. 16A through 22 show perspective views of alternative embodiments of the present invention.

DETAILED DESCRIPTION OF THE PREFERRED EMBODIMENTS

Figure 1:
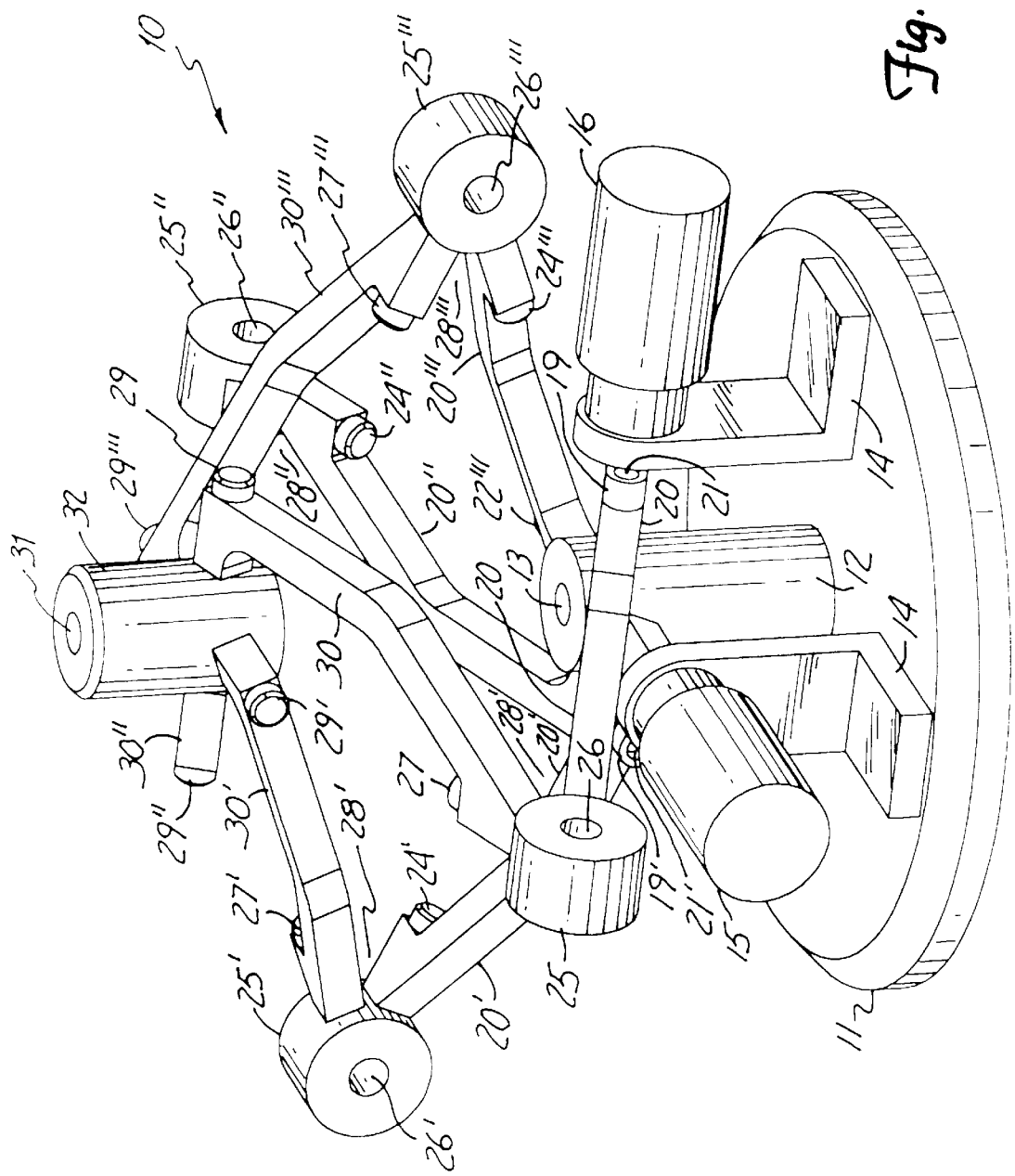
FIGS. 1 through 4 show perspective, elevation, plan and fragmentary views of an embodiment of the present invention.
Figure 2:
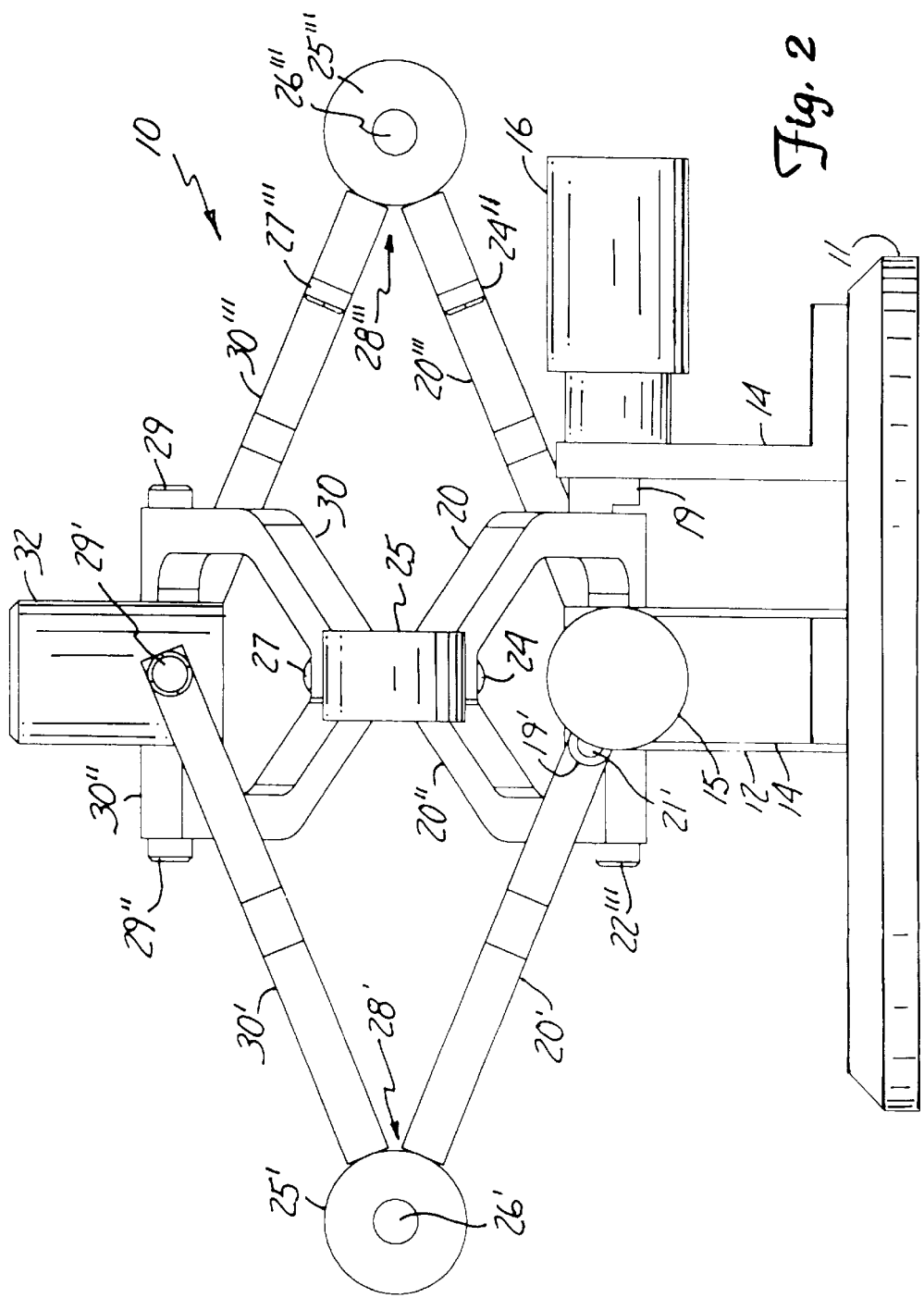
Figure 3:
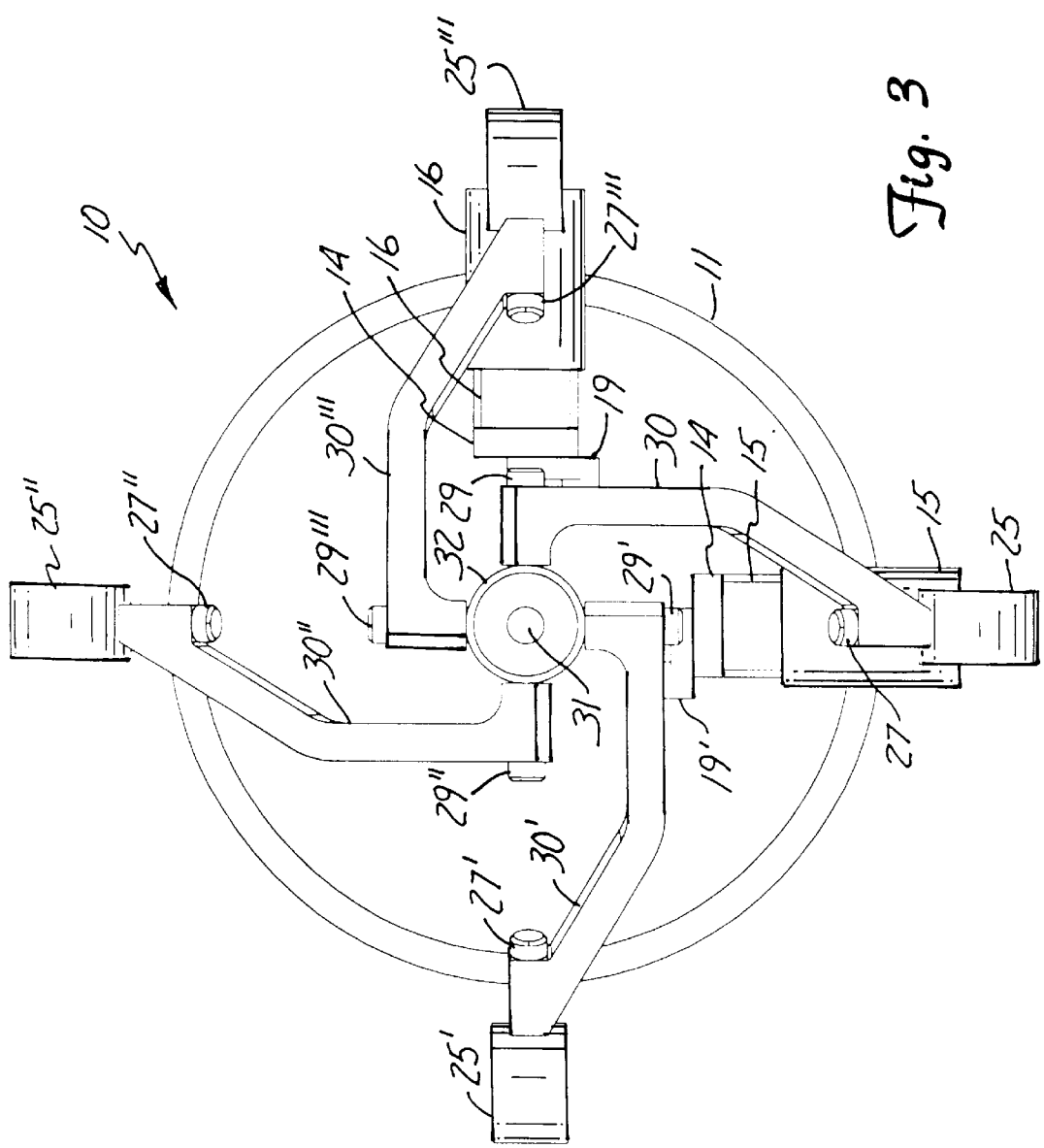

FIGS. 1, 2 and 3 show a first embodiment of a mechanical manipulator, or controlled member motion system, 10, which can have a very large output operating range in various configurations over which it is free of singularities, and which is operated by various force imparting devices directly or through various drive trains. FIG. 1 shows a perspective view of manipulator 10 with FIGS. 2 and 3 showing an elevation view and a top view thereof, respectively. Manipulator 10 is positioned on a mounting arrangement, 11, containing therein an electric motor arrangement, unseen in these figures, which can rotate mounting arrangement 11 in either the clockwise or counterclockwise direction as selected by the user to thereby carry the remainder of joint or manipulator 10 correspondingly with it in these directions. Directly supported on mounting arrangement 11 is a base support, 12, shown as truncated cylindrical shell structure though different geometrical shapes can be used. Support 12 has an opening, 13, extending vertically in these figures along the axis of radial symmetry for support 12 to parallel the outer curved sides thereof. Opening 13 extends through support 12 and from there through mounting arrangement 11 along the axis about which it is capable of rotating manipulator 10 so as to be capable of permitting some desired means extend therethrough such as electrical wiring, optical fibers or some mechanical arrangement, or some combination thereof.

Figure 4:
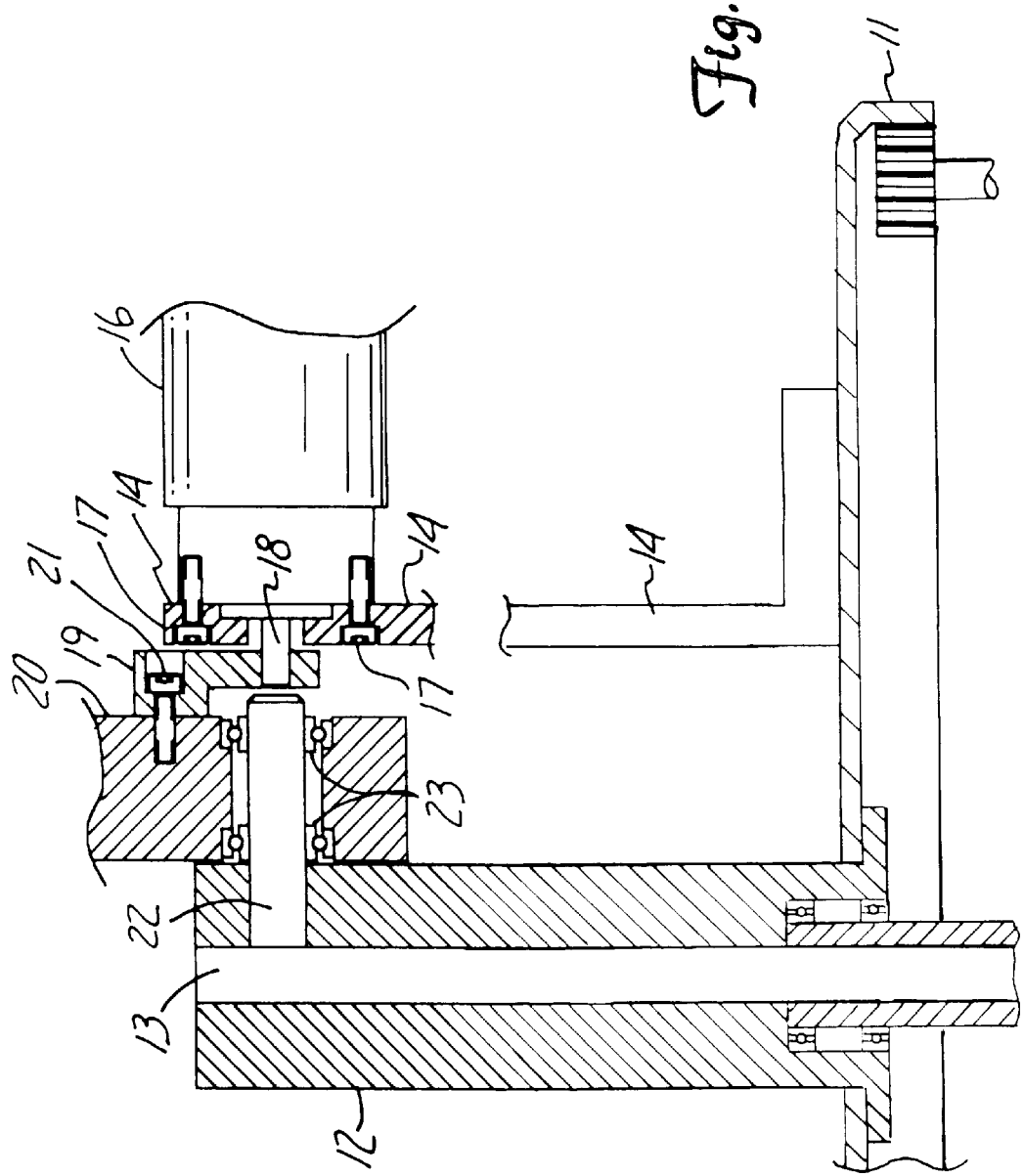

Also shown supported directly on mounting arrangement 11 are a pair of rotary actuator support pedestals, 14, each of which is shown supporting an electric motor along with the direct mechanical interconnection between that electric motor and the remaining portions of manipulator 10. That is, a pair of electric motors, 15 and 16, are each mounted in the corresponding one of pedestals 14 by screws, 17, as can be better seen in FIG. 4 which is a fragmentary view of a portion of each of FIGS. 1, 2 and 3 with parts of this fragmentary view shown in cross section. Electric motor 16 has a shaft, 18, extending from the rotor thereof, which is directly affixed in an opening of a crank arm, 19. Crank arm 19 is directly affixed to a pivoting link, 20, by a further screw, 21. Rotation by the rotor in electric motor 16 clockwise or counterclockwise causes shaft 18 to rotate in a corresponding angular direction which in turn causes crank arm 19 to correspondingly rotate.

Such rotations by crank arm 19 forces pivoting link 20 to in turn rotate one way or the other about a pin, 22, on a pair of bearings, 23, around a rotation axis extending through pin 22 that is more or less perpendicular to the length of link 20. Shaft 22 is directly affixed in an opening in base support 12, and could be a pivot screw rather than a pin. Such a pivot screw is threaded at the end thereof opposite the screw head only a relatively short distance in from that end to permit its being screwed firmly into base support 12 but only a fixed distance therein to assure a selected length of the screw is exposed outside support 12. The surface of this exposed portion of the screw from support 12 to the screw head is smooth especially if no bearing or bushing is used between this screw and pivoting link 20 (lubrication at the least would be likely to be used in this situation). Typically, there will be used either bearing set 23 or a bushing between pin or pivot screw 22 and pivoting link 20.

An identical electric motor rotational drive system for forcing rotational motion of another pivoting link is provided in connection with electric motor 15. As seen in FIGS. 1, 2 and 3, a crank arm, 19', is affixed to the rotor shaft of motor 15 (this mechanical connection is unseen in FIGS. 1, 2 and 3) with the other end of crank arm 19' being affixed by screw, 21', to a further pivoting link, 20', rotatably connected to base support 12. Thus, again, rotation of the rotor of electric motor 15 in either the clockwise or counterclockwise direction forces pivoting link 20' to correspondingly rotate in either a clockwise or counterclockwise direction. Pivoting link 20' can rotate on bearings about a joint or manipulator 10, 22', not seen in these figures, affixed to base support 12, and again around an axis extending therethrough more or less perpendicular to the length of link 20'.

Pivoting links 20 and 20' are two pivoting links in a plurality of lower pivoting links in manipulator 10, this lower plurality further including two other pivoting links, 20" and 20'". These last two pivoting links are each capable of rotating on bearings about a corresponding one of pins or pivot screws, 22" and 22'", respectively, with the corresponding axis of rotation extending therethrough substantially perpendicular to the length of links 20" and 20'". Pins or pivot screws 22" and 22'" are affixed to base support 12, and are seen in part in FIGS. 1 and 2. Each of pins or pivot screws 22, 22', 22" and 22'" is affixed to base support 12 such that the corresponding one of the plurality of lower pivoting links rotatably coupled to base support 12 thereby rotates about an axis therethrough that intersects, and is perpendicular to, the axis of radial symmetry of support 12, with these rotation axes being separated from adjacent ones by equal angles measured about the symmetry axis, here 90°.

The lower plurality of pivoting links 20, 20', 20" and 20'", in addition to each having an end thereof being rotatably connected to base support 12 as described above, also each have the opposite end thereof rotatably connected by four further pins or pivot screws, 24, 24', 24" and 24'", to a pivot holder comprising four individual and separated pivot holder members, 25, 25', 25" and 25'", which have no direct connections therebetween. Each of these pivot holder members is formed as a truncated portion of a cylindrical shell about an axis of radial symmetry, and each is shown with a corresponding one of a set of holes, 26, 26', 26" and 26'", extending therethrough parallel to the outer curve surface thereof along the shell axis of radial symmetry. The outer curved surface of each such pivot holder member shell is pierced by its corresponding one of pins or pivot screws 24, 24', 24" and 24'" in its being affixed therein. Each such pin or pivot screw has the end of the corresponding one of the lower plurality of pivoting links 20, 20', 20" and 20'" coupled thereto so as to be able to rotate thereabout on bearings with the axis of rotation of this link about such pin or pivot screw being more or less parallel to the length of the link and intersecting the shell axis of radial symmetry.

The axis of rotation of each of the lower plurality of pivoting links 20, 20', 20' and 20'" through a corresponding one of pins or pivot screws 24, 24', 24" and 24'" in being rotatably coupled to a corresponding one of pivot holder members 25, 25', 25" and 25'", and the axis of rotation of each of these links through a corresponding one of pins or pivot screws 22, 22', 22" and 22'" in being rotatably coupled to base support 12 are, in each link instance, perpendicular to planes that intersect one another at substantially right angles. These rotation axes for each of these links are also oriented in directions differing from those in an adjacent link, i.e. the next link thereafter around base support 12. This allows pivot holder members 25, 25', 25" and 25'" to be moved by the corresponding pivoting links substantially with respect to base support 12, but for the same length links these pivot holder members will always be in a plane common thereto, and will move about a circle in such planes.

Although pivot holder members 25, 25', 25" and 25'" are shown in these figures as truncated portions of cylindrical shells, this shape is not required but instead other geometrical shapes could be used. One such shape clearly could be just the inside half these cylindrical shells which could result from dividing each of them vertically along the axis of radial symmetry. Another alternative would be a triangular block having a side thereof substantially perpendicular to the axis of rotation about which the pivoting link from the lower plurality thereof can rotate in being rotatably coupled thereto by its corresponding pin or pivot screw.

Manipulator 10 is shown in these figures having a further upper plurality of pivoting links. A corresponding one of this plurality is rotatably coupled to each of pivot holder members 25, 25', 25" and 25'" by a corresponding one of a further set of pins or pivot screws, 27, 27', 27" and 27'", again which pierce the outer curved shell surface of that member in being affixed therein. The axis of rotation of the corresponding one of this upper plurality of pivoting links, in being able to rotate about its pin or pivot screws 27, 27', 27" and 27''', is directed so as to be more or less parallel to the length of the link and to intersect the axis of radial symmetry of the corresponding one of pivot holder members 25, 25', 25" and 25'''. As a result, there is a corresponding one of a set of angles, 28, 28', 28" and 28''', of a selected angular magnitude between the axis of rotation of the pivoting link from the lower plurality thereof rotatably connected to each pivot holder member and the axis of rotation of the one of the upper plurality of pivoting links also rotatably connected thereto as shown in these figures. The selection of the magnitude of each of angles 28, 28', 28" and 28''' effects the capabilities of manipulator 10 as will be described below. For any selected angle, increasing the diameter of the outer surface of the truncated cylindrical shell serving as pivot holder members 25, 25', 25" and 25''' will result in shortening the length of the pivoting links rotatably connected thereto from both the upper and the lower pluralities thereof.

Another set of pins or pivot screws, 29, 29', 29" and 29''', are each used at the opposite end of a corresponding one of an upper plurality of pivoting links, 30, 30', 30" and 30'''. If manipulator 10 is constructed symmetrically above and below a plane including the axes of radial symmetry of each of pivot holder members 25, 25', 25" and 25''' (a horizontal plane in FIG. 2), i.e., angles 28, 28', 28" and 28''' in these figures being bisected by such a common plane, the upper plurality of pivoting links 30, 30', 30" and 30''' can be identical in construction with each other and with each of the lower plurality of pivoting links 20, 20', 20" and 20'''. Although this is a significant economic factor in manufacturing significant numbers of joint or manipulator 10, this symmetry is not required for successful operation of such manipulators. However, the nature of the positioning of the output structure in such manipulators for a given rotation of the rotor shafts of motors 15 or 16 will change with differences in the portions of angles 28, 28', 28" and 28''' above and below the horizon. Also, the lengths of pivoting links in the upper and lower pluralities thereof need not all be the same to have successful operation of manipulator 10 but, again, the pattern of the positioning of this output structure will change depending on such differences.

The output structure which is controlled in manipulator 10 by motion of the rotors of electric motors 15 and 16 has a hole, 31, provided therethrough to form a cylindrical shell resulting in a manipulable support, 32, forming this structure. Again, geometrical shapes other than such a cylindrical shell can be used, and again various items can be extended through opening 31 such as electrical wiring or optical fibers or, in this output situation, a further mechanical device supported on support 32, or some combination of such features or other alternatives. Each of pivoting links 30, 30', 30" and 30''' in the upper plurality thereof is rotatably coupled by a corresponding one of pins or pivot screws 29, 29', 29" and 29''' to manipulable support 32. Here too, each of pins or pivot screws 29, 29', 29" and 29''' is affixed to support 32 such that the corresponding one of the plurality of upper pivoting links rotatably coupled to manipulable support 32 thereby rotates about an axis therethrough that intersects, and is perpendicular to, the axis of radial symmetry of support 32, with these rotation axes being separated from adjacent ones by equal angles measured about the symmetry axis, here again 90° because of the presence of four pivot links. Although the rotation axes of the pivoting links at the rotary couplings thereof to supports 12 and 32 are described as making equal angles with adjacent ones thereof as they occur about those supports, these angles need not be identical about either support, nor identical about one support with those about the other, to be able to position support 32 over a substantial angular range, though providing substantially such identities is often convenient.

The axis of rotation of such a one of pivoting links 30, 30', 30" and 30''' in the upper plurality thereof about its pin or pivot screw coupling it to support 32 extends through that pin or screw more or less perpendicular to the direction of the length of that link, and substantially parallel to the axis of rotation about the pin or pivot screw rotatably coupling the corresponding one of pivoting links 20, 20', 20" and 20''' in the lower plurality thereof to base support 12. The correspondence here between upper and lower plurality pivoting links is established by each being coupled to the same one of pivot holder members 25, 25', 25" and 25'''. Again here as for links in the lower plurality thereof, the axis of rotation of a pivot link 30, 30', 30" or 30''' in the upper plurality thereof about its corresponding one of pins or pivot screws 27, 27', 27" or 27''' is substantially perpendicular to a plane which intersects at substantially right angles that plane which is substantially perpendicular to the axis of rotation of that link about its corresponding one of pins 29, 29', 29" or 29'''.

If crank arms 19 and 19' are disconnected from the corresponding ones of pivoting links 20 and 20' by removing corresponding screws 21 and 21', motors 15 and 16 would no longer be capable of operating joint or manipulator 10 to position manipulable support 32 at a desired position. However, in these circumstances, should the rotational driving system for rotating mounting arrangement 11 be activated, the system shown in FIGS. 1, 2 and 3 will operate as a flexible joint with manipulable support 32 following the rotation of mounting arrangement 11 and base support 12 to transmit that rotational motion to manipulable support 32 without requiring supports 12 and 32 to be axially aligned, i.e., the axis of radial symmetry of one can be at a substantial angle with respect to the radially symmetrical axis of the other.

The various structural components of joint or manipulator 10 described in connection with FIGS. 1 through 4 above are typically formed of a metal or metals, or alloys thereof, appropriate for the intended use, i.e. perhaps stainless steel for a medical use, aluminum or titanium where weight is a primary concern, etc. Many or all of these components could molded polymeric materials instead.

Figure 5:
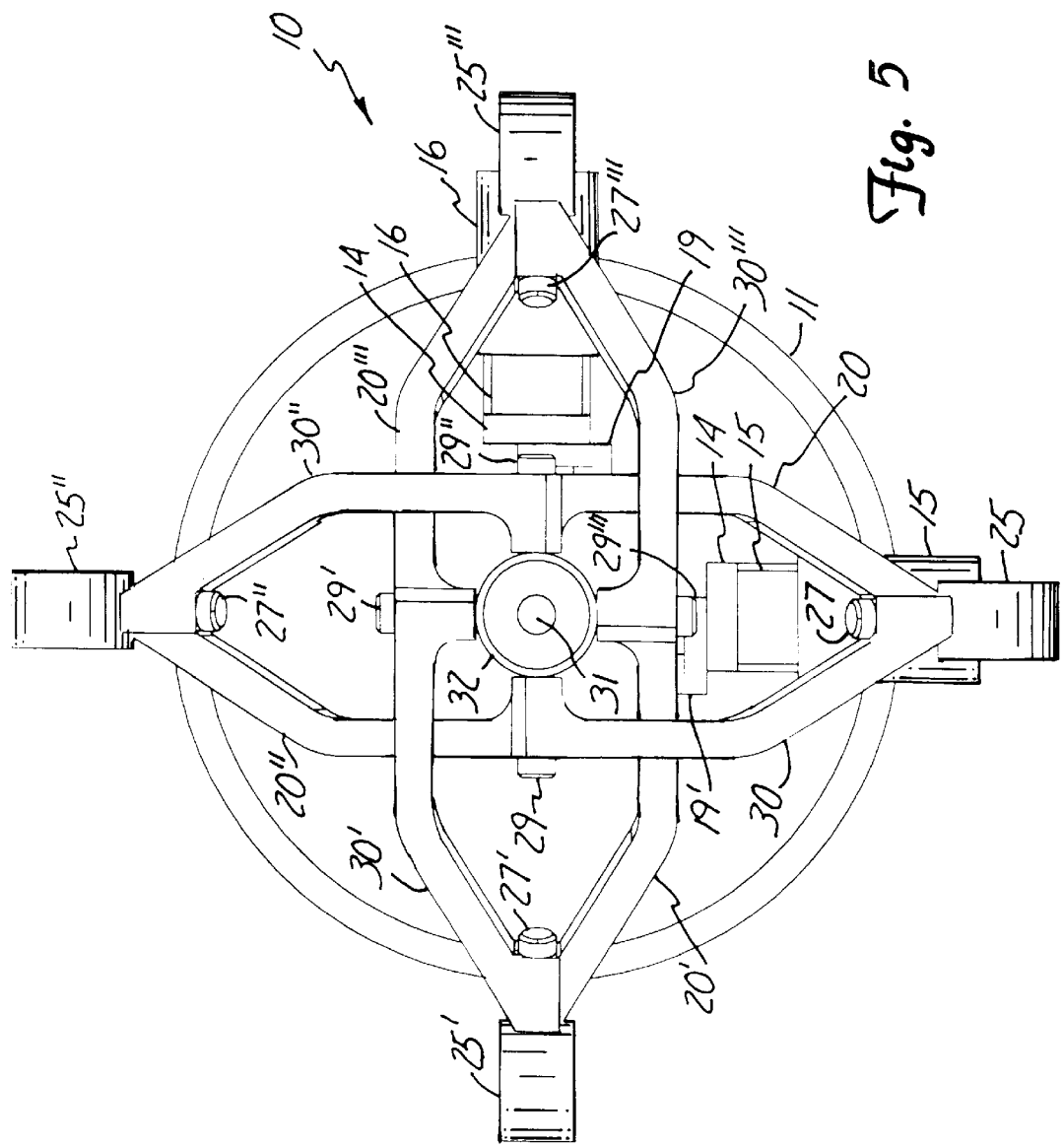
FIG. 5 shows a top view of an alternative embodiment of the present invention.

The top view of joint or manipulator 10 shown in FIG. 3 indicates that pivoting links 30, 30', 30" and 30''' in the upper plurality thereof are assembled to be directly over the corresponding ones (connected to the same pivot holder member) of pivoting links 20, 20', 20" and 20''' in the lower plurality thereof. That is, the pivoting links in the lower plurality thereof cannot be seen in FIG. 3 because the pivoting links in the upper plurality thereof are directly over them, requiring each combination of corresponding pivoting links from the upper and lower pluralities thereof to be both rotatably coupled to the same side of base support 12 and to the same side of manipulable support 32. This assembly pattern for the structure in manipulator 10 is not necessary, however, as each such combination can instead have the pivoting link from the upper plurality thereof and the pivoting link from the lower plurality thereof assembled on opposite sides of base support 12 and manipulable support 32 as is shown in FIG. 5. This results in a more even distribution of the pivot link masses about the central axis of joint or manipulator 10 extending toward the viewer through opening 31 and passing through unseen opening 13 there below for balance, and does not significantly affect the performance of the manipulator in positioning support 32.

Figure 6:
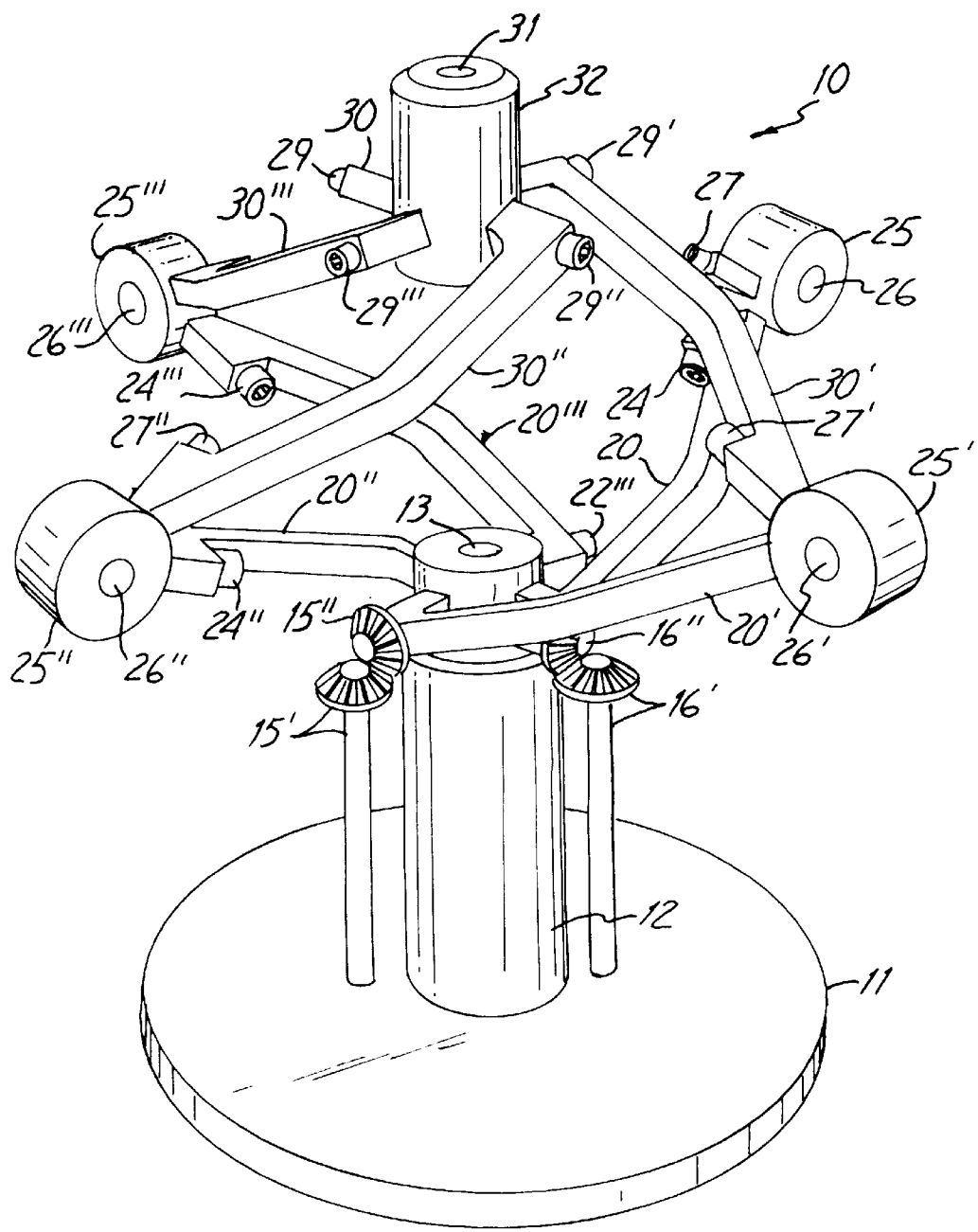
FIGS. 6, 7A and 7B show a perspective and two elevation views of an alternative embodiment of the present invention.
Figure 7A:
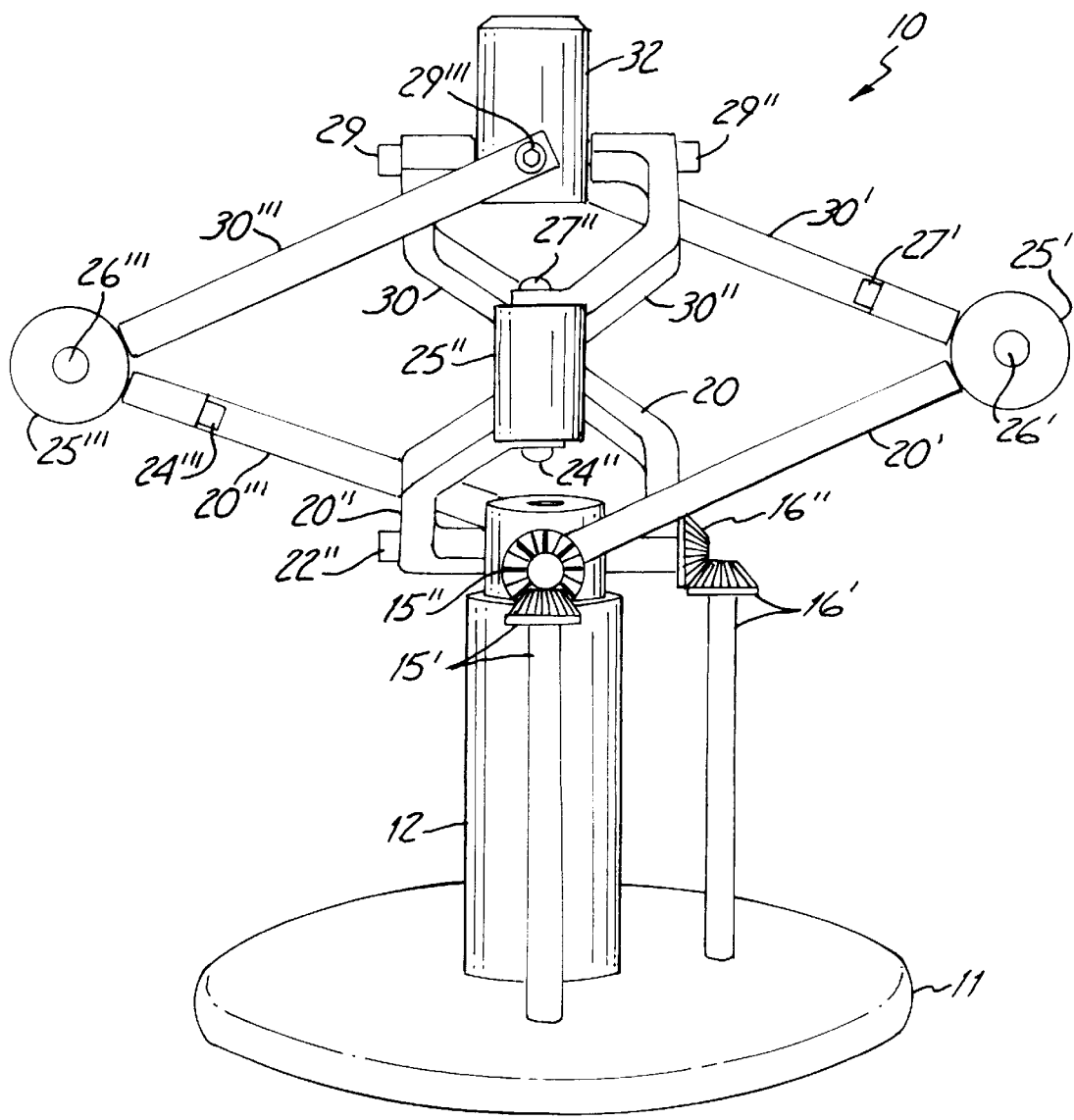

In a further alternative, a perspective view incorporating the configurational change shown in FIG. 5 is shown in FIG. 6 that corresponds to the perspective view shown in FIG. 1, and an elevation view for the FIG. 6 configuration is shown in FIG. 7A corresponding to the elevation view shown in FIG. 2. An alternative elevation view for the configuration shown in FIG. 6 is shown in FIG. 7B based on a shift of 45° in the point of view from that taken in FIG. 7A.

Figure 7B:
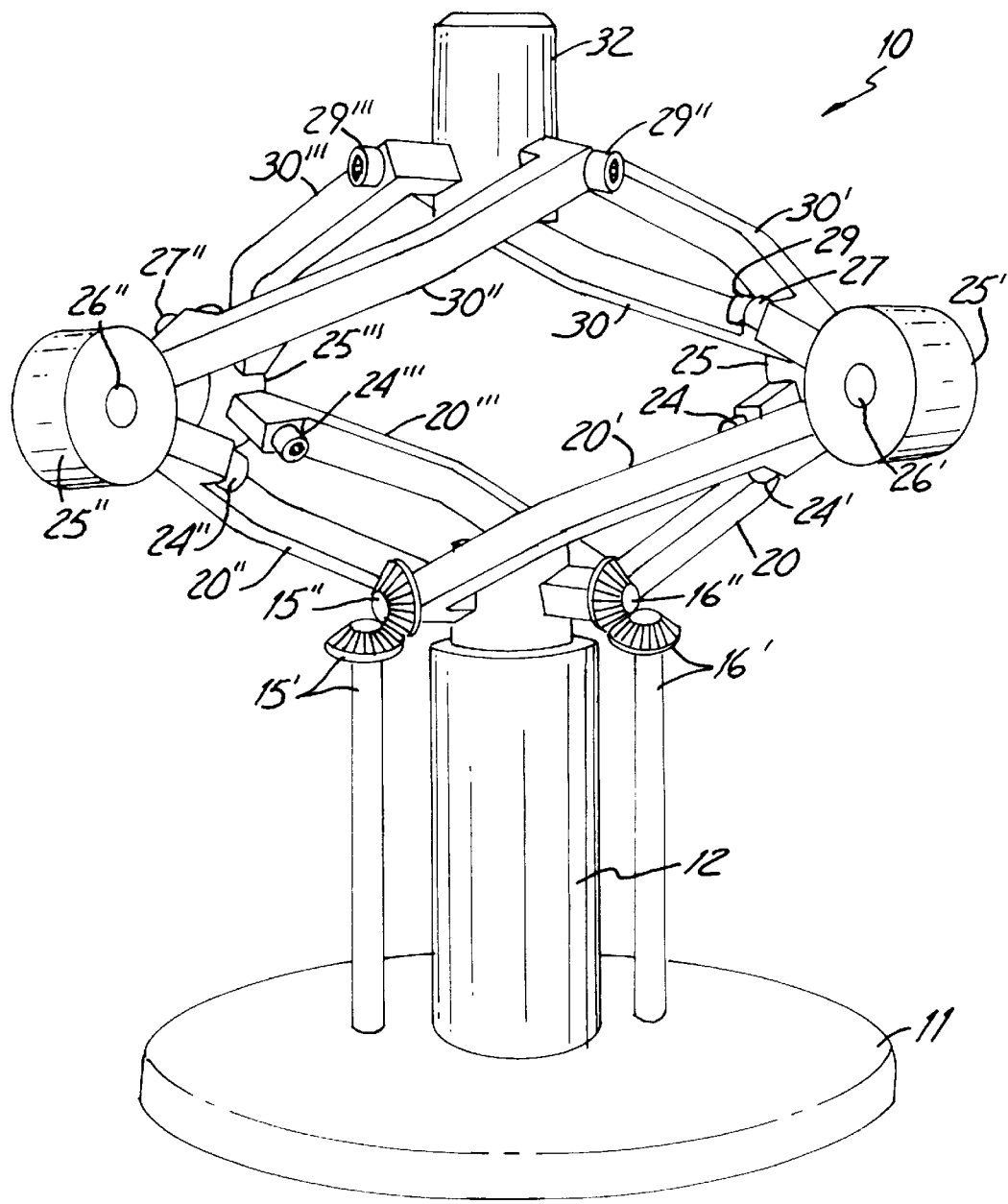

A change in the configuration of the version of joint or manipulator 10 shown in FIGS. 6, 7A and 7B from the configuration shown in FIG. 5 is based on the reversal in the earlier choice of which link in a combination of two corresponding pivoting links rotatably coupled to a pivot holder member is chosen to extend from that member to base support 12 and manipulable support 32. That is, the pivoting links extending from each pivot holder member which were in the lower plurality of pivoting links in the examples shown in FIGS. 1, 2, 3 and 5 are now in the upper plurality in FIGS. 6, 7A and 7B, and vice versa. This change, like the previous change in configuration in no longer having the pivoting links in the upper lower pluralities directly over one another, causes no limitation in the capabilities of manipulator 10 for positioning manipulable support 32 in any angular position desired. That is, manipulable support 32 can be placed in a particular desired angular position whether the configuration is that shown in FIGS. 1 through 3, or in the alternative configuration shown in FIG. 5, or in the further alternative configuration shown in FIGS. 6 through 7B resulting from particular patterns of assembling pivoting links to pivot holder members, and to base and manipulable supports 12 and 32. The designations used for the pivoting links in the upper and lower pluralities thereof in FIGS. 6 through 7B have not been changed because of the in consequentiality of these assembly differences.

Finally, a further change in configuration of joint or manipulator 10 is shown in FIGS. 6 through 7B from the configurations shown in FIGS. 1, 2, 3 and 5, that change being the substitution of a motor driven, gear based drive train for directing motion of pivoting links in the lower plurality thereof for the direct connection of electric motors 15 and 16 to these links for that purpose. Thus, electric motor 15 is now carried in mounting arrangement 11 in FIGS. 6 through 7B, and unseen in these figures, but an extension of its rotor shaft with a bevel gear affixed to the end thereof can be seen in these figures extending upward through mounting arrangement 11. This extended shaft and bevel gear affixed thereto form a combination together designated 15'. A further bevel gear, 15", engaged with this first bevel gear, is affixed to pivoting link 20' about pin or pivot screw 22' so this link can again be rotated clockwise or counterclockwise about pin or pivot screw 22' by rotation of the rotor shaft of unseen electric motor 15. Similarly, motor 16 is unseen in these figures in being supported under mounting arrangement 11, but an extension of its rotor shaft together with a bevel gear affixed on the end thereof as a combination, 16', engages a further bevel gear, 16", affixed to pivoting link 20 of the lower plurality of pivoting links about pin or pivot screw 22. Here too, rotation of the shaft of electric motor 16 either clockwise or counter clockwise allows rotating pivoting link 20 upward or downward about pin or pivot screw 22.

FIG. 8 shows an elevation view of a variation in the configuration of joint or manipulator 10 from the version seen in FIGS. 6 through 7B which reduces the vertical extent thereof from that shown therefor in those figures. The pivoting links 20, 20', 20" and 20'" in the lower plurality thereof and the pivoting links 30, 30', 30" and 30'" in the upper plurality thereof, near the locations where they are rotatably connected to base support 12 and manipulable support 32, respectively, extend therefrom at an angle with the vertical axis of those supports that is more nearly a right angle than they have with the same axis in the joint of FIGS. 6 through 7B. This allows the two supports to be nearer to one another along that vertical axis in the joint of FIG. 8. Nevertheless, these pivoting links in the joint of FIG. 8 have rotational axes that extend from the corresponding one of pivot holder members 25, 25', 25" and 25'" at an angle with respect to the vertical similar to that of the joint of FIGS. 6 through 7B because of each pivoting link being bent towards its corresponding pivot holder member in its corresponding vertical plane.

Additionally shown in FIG. 8 in dashed line form are counterweights attached to two of the lower plurality pivoting links. This is to provide same counterbalancing torque to those links to ease some of the loads on the actuators and gears. These counterweights are shown attached to links 20b' and 20b" near their rotatable connections to base support 12 of each at about 90° from the axis of the link.

Figure 9:
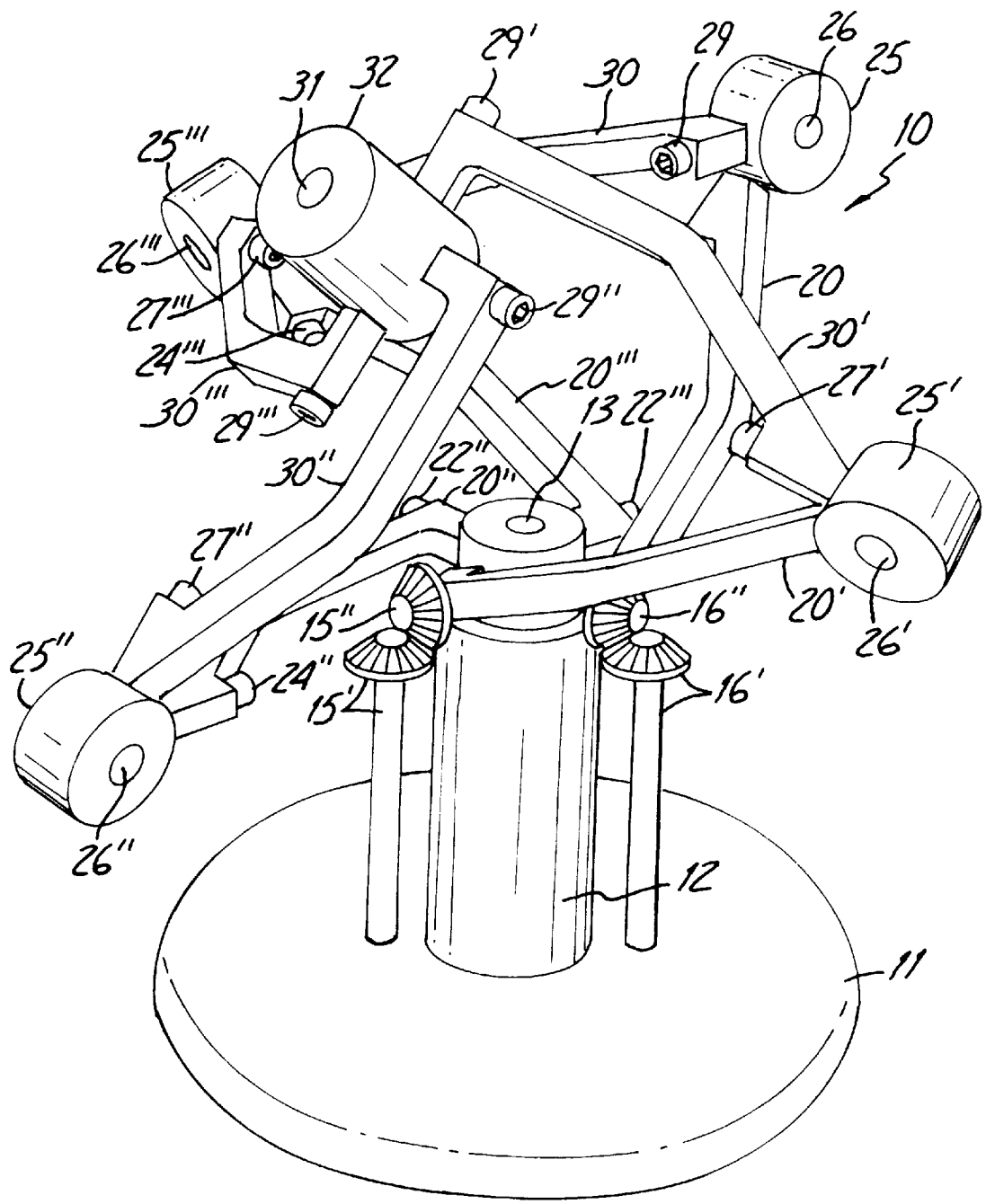
FIGS. 9 through 12 show various perspective views of the embodiment of the present invention shown in FIGS. 6 through 8, FIGS. 13 through 15 show perspective, fragmentary and plan views of an alternative embodiment of the present invention.
Figure 10:
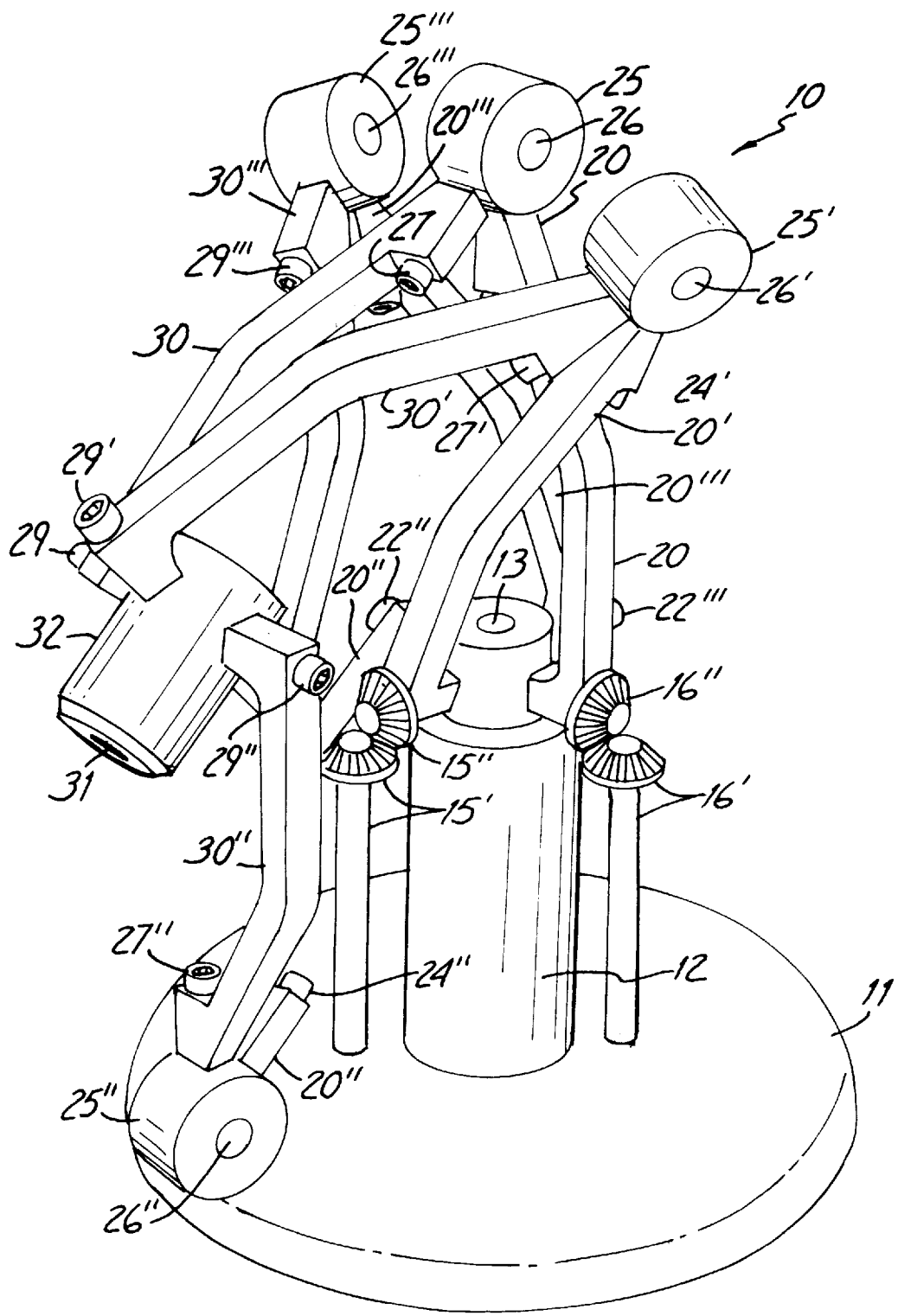

FIGS. 9 and 10 show perspective views of joint or manipulator 10 configured as in FIGS. 6 through 7B after rotation of shaft and gear combination 16' rotating so as to position manipulable support 32 at approximately 45° down from the vertical position thereof in FIGS. 6 through 7B in a vertical plane containing the rotation axis extending through pin or pivot screw 22' and passing through shaft and bevel gear combination 15'. Such motion would result from the rotor of unseen motor 16 rotating shaft and bevel gear combination 16' in a clockwise direction as seen in the figures with no rotation of the rotor of unseen motor 15. In FIG. 9, pivot holder member 25, and the ends of pivoting links 20 and 30 rotatably coupled thereto, have rotated upward from the positions they were in when manipulable support 32 was in the vertical position thereof shown in FIGS. 6 through 7B to enable support 32 to reach the position therefor shown in that figure. Similarly, pivot holder member 25", and the ends of pivoting links 20" and 30" rotatably coupled thereto, have rotated downward from the positions they were in when manipulable support 32 was in the vertical position therefor.

The rotation of these structural members and support 32 occurs primarily about a base center of rotational motion located at the intersection of the rotational axes through each of pins or pivot screws 22, 22', 22" and 22'" on the axis of radial symmetry of the truncated cylindrical shell forming base support 12. This rotation of these structures and support 32 occurs also with a significant rotation of pivoting link 30' and pivot holder member 25' about pivoting link 20', and of pivoting link 30'" and pivot holder member 25'" about pivoting link 20'", but without much movement of pivoting links 20' and 20'" themselves because of the relatively little lateral movement required of the base of support 32 to which these links are coupled for that support to achieve the position therefor shown in FIG. 9.

However, as manipulable support 32 passes the location therefor shown in FIG. 9 in being rotated downward over shaft and gear combination 15', the lateral component of movement of the base portion of manipulable support 32 increases requiring corresponding lateral movements of pivoting links 30' and 30'" therewith in view of their being rotatably coupled to support 32 by pins or pivot screws 29' and 29'". As can be seen in FIG. 10, this required lateral movement over shaft and gear combination 15' of these coupled ends of pivoting links 30' and 30'" requires that pivot holder members 25' and 25'" and the ends of pivoting links 20' and 20'" rotatably coupled thereto also rotate upward to facilitate this needed lateral movement by the ends of pivoting links 30' and 30'" rotatably coupled to manipulable support 32. Such an arrangement, as can be seen in FIG. 10, allows manipulable support 32 to move from pointing vertically upward in FIGS. 6 through 7B to pointing in a direction that is around 45° above the horizontal as shown in FIG. 9, and then continue such movement to eventually point in a direction that is on the order of 45° below the horizontal.

Around this point in the motion of support 32, further downward rotation thereof is prevented by pivoting links 30' and 30'" coming against pivoting link 30 to cause interference therebetween (of course, for different shaped structural components some other interference could occur such as between the pivot holding members to instead be the cause of termination of such downward motion). As this rotation is occurring and going from the position of manipulable support in FIG. 9 to that shown in FIG. 10, a significantly increased rotation occurs about a second or manipulable center of rotational motion located at the intersection of the axis of rotations passing through pins or pivot screws 29, 29', 29" and 29'" on the radial axis of symmetry of manipulable support 32. During the movement of manipulable support 32 from the vertical position shown in FIGS. 6 through 7B over shaft and gear combination 15' to the positions shown in FIGS. 9 and 10, pivot holder members 25, 25', 25" and 25'" remain in a common plane although the plane which changes its orientation and space with each increment of motion of support 32.

The situation of the structural members of joint or manipulator 10 changes somewhat when the downward movement of manipulable support 32 from the vertical position shown in FIGS. 6 through 7B is directed in a vertical plane that does not pass through two of pins or pivot screws 22, 22', 22" and 22'" as occurs when the downward motion of manipulable support 32 was over shaft and gear combination 15' so as to be in a plane passing through pins or pivot screws 22' and 22'". In this latter situation, the initial movement of manipulable support 32 involved the upward movement of pivot holder member 25 and the ends of pivoting links 20 and 30 coupled thereto, and the downward motion of pivot holder member 25" and the ends of pivoting links 20" and 30" coupled thereto. There was little initial movement of either of pivoting links 20' and 20'"; rather, there was primarily rotation about those pivoting links of pivoting links 30' and 30'" along with pivot holder members 25' and 25'".

Figure 11:
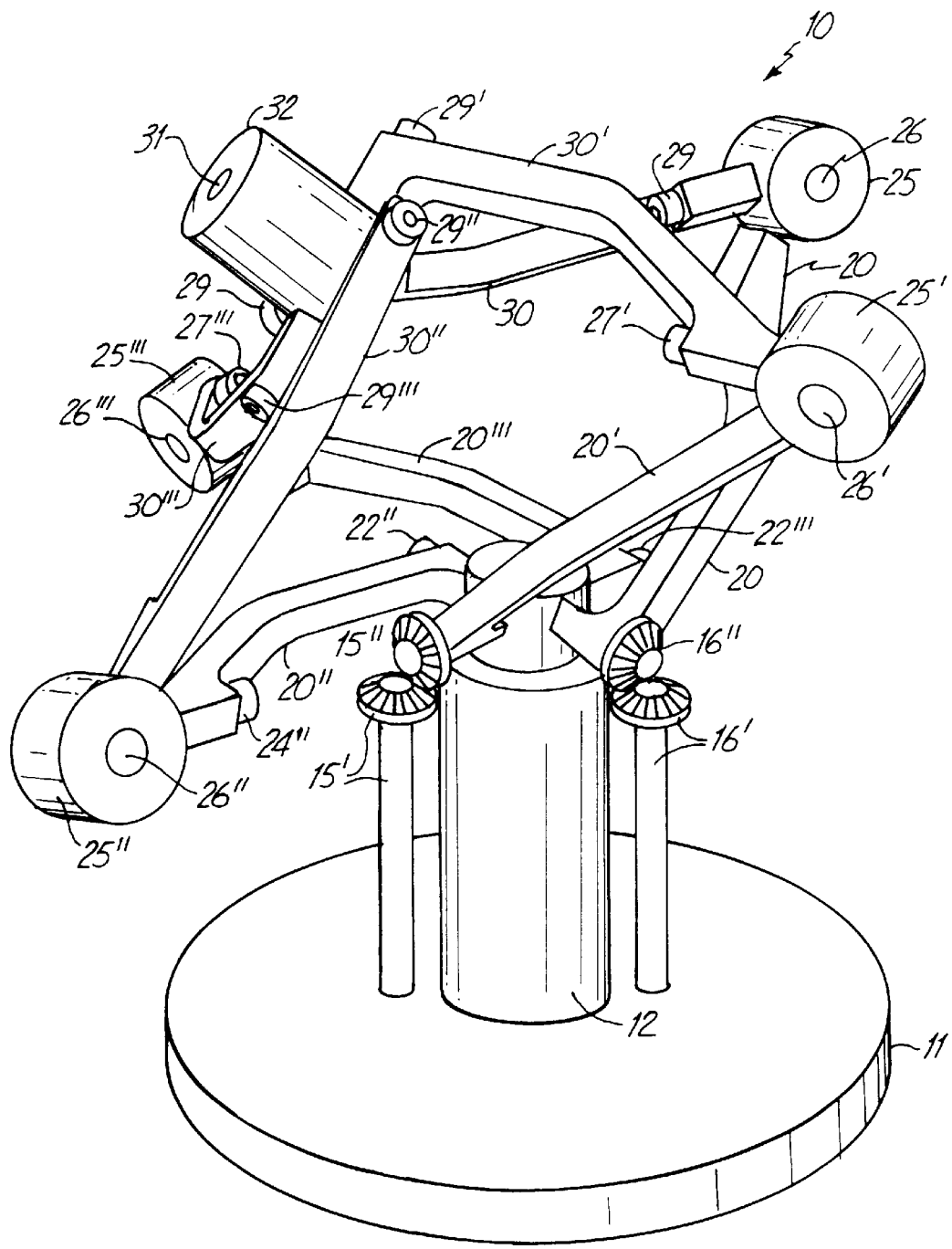

If, instead, the motion of manipulable support 32 from a vertical position downward occurs in the vertical plane which is at a 45° angle with respect to a plane intersecting pins or pivot screws 22' and 22'", i.e., a plane 45° from such a plane so as to occur halfway between pins or pivot screws 22' and 22", all of the pivoting links in both the lower and upper pluralities thereof immediately show significant movement in correspondence with the start of this movement by support 32. Such a motion would result from the rotors of both unseen motors 15 and 16 rotating so as to rotate both shaft and bevel gear combination 15' and shaft and bevel gear combination 16', respectively, equally in the clockwise direction as seen in the figures. The results of such movements are shown in FIG. 11 for reaching a first selected position in the movement of support 32, the combination of pivot holder member 25 and the ends of pivoting links 20 and 30 coupled thereto, along with the combination of pivot holder member 25' and the ends of pivoting links 20' and 30' coupled thereto, having both moved upward to allow moving manipulable support 32 to approximately 45° downward from the initial vertical position shown therefor in FIGS. 6 through 7B. On the other hand, the combination of pivot holder member 25'" and the ends of pivoting links 20'" and 30'" coupled thereto, along with the combination of pivot holder member 25" and the ends of pivoting links 20" and 30" coupled thereto, have both moved downward to accommodate this motion of support 32.

These motions occur because, initially, of the lateral movement component of the base of manipulable support 32, which must be followed by each of the upper plurality of pivoting links 30, 30', 30" and 30'" rotatably coupled thereto, thereby requiring the first two combinations to move upward and the second two combinations to move downward in accommodating that movement. The rotation about the manipulable center of motion increases as manipulable support 32 is moved further downward from the position shown therefor in FIG. 11 in the vertical plane indicated above to reaching the position shown therefor in FIG. 12 on the order of 45° below the horizontal. The downward motion of manipulable support 32 in this plane again is ended by interference occurring in the structural members, typically the coming together of pivoting links 30 and 30'.

Figure 12:
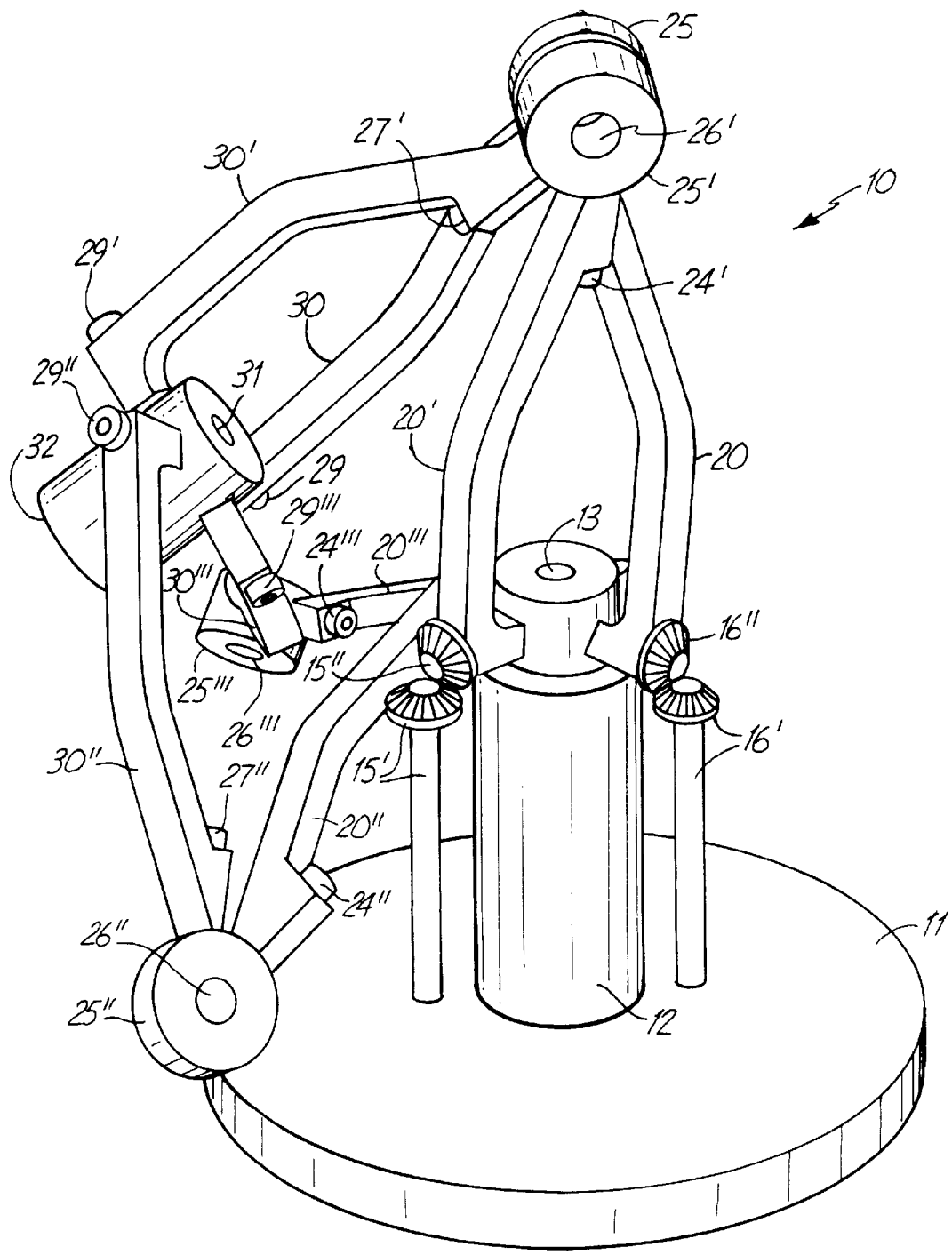

Again, over the range of motion of manipulable support 32 from the vertical position shown therefor in FIGS. 6, 7A and 7B through the position shown in FIG. 11 to the position reached in FIG. 12, pivot holder members 25, 25', 25" and 25'" remain in a common plane though one changing in space with every movement of support 32. Such a relationship will be maintained even if the angles 28, 28', 28" and 28'" each have a larger though identical portion thereof on one side of such a common plane than on the other so as to result in the pivoting links in the upper plurality thereof being of a common length but differing from that of the common length of the pivoting links in the lower plurality thereof. Where the links in the upper plurality or lower plurality differ among the members thereof as well as differing from those in the other plurality because of differing angles at the pivot holder members 25, 25', 25" and 25'" between the rotational axes of the pins or pivot screws 24, 24', 24" and 24'" and the rotational axes of the corresponding ones of pins or pivot screws 27, 27', 27" and 27'", manipulable support 32 can still be positioned over a useful angular range but such a common plane may not exist for all of pivot holder members 25, 25', 25" and 25'" during motions over that range.

Motions of manipulable support 32 from the vertical position therefor shown therefor in FIGS. 6 through 7B that are downward in vertical planes that are intermediate to those vertical planes in which such downward motion occurred in FIGS. 9 and 10, on the one hand, and in FIGS. 11 and 12, on the other, results in corresponding intermediate arrangements of the pivoting link and pivot holder member combinations described above in connection with the motion in the vertical plane connected with FIGS. 11 and 12. That is, as the selection of the vertical plane of downward motion for manipulable support 32 moves from the plane involved in FIGS. 11 and 12 toward the plane involved in FIGS. 9 and 10, or as manipulable support 32 in the position shown therefor in FIG. 12 moves directly toward the position shown therefor in FIG. 10, the combination of pivot holder member 25" and the ends of pivoting links 20" and 30" coupled thereto remains in the rotated downward position but the combination of pivot holder member 25'" and the ends of pivoting links 20'" and 30'" coupled thereto is increasingly elevated. At the point where manipulable support 32 as directed to move reaches the position shown therefor in FIG. 10, this latter combination involving pivot holder member 25''' and the ends of pivoting links 20''' and 30''' coupled thereto reaches the full upward position therefor shown in FIG. 10. Similar results occur for all of the other vertical planes of downward motion of manipulable support 32 positioned around base support 12.

Even if angles 28, 28', 28" and 28''' are chosen to be equal to one another and symmetrical about the common plane of the pivot holder members, different choices for that equal angular value will affect the capabilities of joint or manipulator 10 insofar as the extent thereof and the angular range of motion of manipulable support 32. Thus, a relatively smaller value for those angles but equal for each, such as the 45° choice made in the examples shown in FIGS. 1 through 12, will result in a relatively larger diameter circle on which pivot holder members 25, 25', 25" and 25''' can be positioned in the common planes they are in for corresponding positions of manipulable support 32. On the other hand, smaller angles generally tend to give a larger angular range of operation for manipulable support 32 because the coming together, or interference, of members 30, 30', 30" and 30''' of the upper plurality of pivoting links near their rotary couplings to pivot holder members 25, 25', 25" and 25''' are avoided over a larger angular position range of support 32 since they are farther from one another in the initial vertical position of that support.

Generally, just the opposite conditions occur for choices of the equal angle which are relatively large, such a the choice of 90°, or even more such as 120°. Such choices lead to a relatively smaller diameter circle on which pivot holder members 25, 25', 25" and 25''' can be positioned in the common planes they share for corresponding positions of manipulable support 32, but interference between the structural members will occur for much less movement of manipulable support 32 to thereby limit the angular range in which manipulable support 32 can operate to being at latitudes well above the horizon to say nothing of being able to reach angular positions below the horizon as can manipulator 10 in the examples shown in FIGS. 10 and 12.

A further aid in increasing the angular operating range or positioning of manipulable support 32 is removing a pivoting link from the upper plurality thereof, its corresponding pivot holder member and the corresponding lower pivoting link, and symmetrically repositioning the remaining links and members about the supports. Removing some such components from manipulator 10 results in there being fewer such components remaining therein to interfere with one another which generally tends to increase the range of motion or positioning available to manipulable support 32. One example of such a reduced number of these pivot holder member and upper and lower pivoting links combinations is shown in FIGS. 13, 14 and 15. In this example, there are just three pivoting links in the upper plurality thereof and, similarly, just three pivoting links in the lower plurality thereof.

The odd number of pivoting links in the upper and lower pluralities thereof, distributed with equal angle separation about supports 32 and 12 in being rotatably coupled thereto, results in there being no pair of orthogonal axes with respect to this three pivot holder member joint or manipulator 10 shown in these figures along which the imposition of control forces will provide complete control of that manipulator as was possible with the examples having four pivoting links in the upper and lower plurality thereof as shown in FIGS. 1 through 12. Even if one combination of pivot holder member and the two connected pivoting links was moved to have the rotational axes of the two links with respect to the two supports orthogonal to similar axes of one of the other combinations so the angles between all three were no longer equal, the imposition of control forces along the orthogonal sets of such axes will be insufficient to provide adequate to provide complete control. Although there will be sufficient control to move the manipulable center of rotational motion in manipulable support 32 anywhere in a suitable angular range in either situation, there will be insufficient control to also maintain the desired orientation of the top or output surface of manipulable support 32. Such operating capability and such limits on control will usually be present even if different angular relationships are used between the rotational axes of upper level pivoting links in being coupled to manipulable support 32 than are used between the rotational axes of lower level pivoting links in being coupled to base support 12.

Thus, a third electric motor, 35, is added to the example shown in FIGS. 13, 14 and 15 because three electric motors, or three force imparting means of some kind operating through corresponding drive trains, are required to enable the positioning of the output support, or manipulable support 32, over the full possible angular range with good stability in reaching and maintaining a desired position therein. The same numerical designations are used in connection with the examples shown in FIGS. 13, 14 and 15 as have been used in the examples shown in FIGS. 1 through 12, but with the components having numerical designators including triple primes in these earlier examples being omitted in FIGS. 13, 14 and 15.

As can be seen in FIG. 14, the direct coupling of electric motor 16 to pivoting link 20 is the same for the system of FIGS. 13, 14 and 15 as it was for the system of FIGS. 1 through 4. This same motor-load coupling system is used in directly coupling electric motor 35 to pivoting link 20" through using an added crank arm, 36, in the same position with respect to that motor and link as crank arm 19 is to the motor and link shown in FIG. 14. Pivoting links 20, 20', and 20" in the lower plurality thereof, in addition to being directly coupled to the corresponding electric motors, are again rotatably coupled to base support 12 by pins 22, 22' and 22" being affixed in that support so as to permit these pivot arms to rotate thereabout on bearings not seen except for bearing set 23 seen in FIG. 14. Again, pivot screws could instead be used rather than pins, and in either case, pivot screws or pins 22, 22' and 22" are affixed in base support 12 such that the axis of rotation for the pivoting links rotating thereabout on bearings extends along the long axis of the pin or pivot screw. These pins or pivot screws 22, 22' and 22" are also affixed in base support 12 such that these rotation axes intersect one another at the axis of radial symmetry of the truncated cylindrical shell forming base support 12 (base center of rotational motion) with there being equal angles between these rotation axes, here 120°.

Similarly, pins or pivot screws 29, 29' and 29" are used in rotatably coupling pivoting links 30, 30' and 30" to manipulable support 32 with the axis of rotation of these pivoting links about these pins or pivot screws extending along the long axis of such pins or pivot screws. These axes, too, are separated by equal angles of 120° and intersect at the axis of radial symmetry of the truncated cylindrical shelf serving as manipulable support 32 (manipulable center of rotational motion).

The rotary couplings of lower plurality pivoting links 20, 20', 20" and 20''' to base support 12 and to pivot holder members 25, 25', 25" and 25''', and the rotary couplings of upper plurality pivoting links 30, 30', 30" and 30''' to these same pivot holder members and to manipulable support 32, have in each instance above been described as being provided based on either pins or pivot screws. Such rotary couplings have been shown completed by the pivoting links involved being capable of pivoting around those pins or pivot screws on bearings, or possibly on bushings, or in some instances with the pivoting link surface directly against the pin or pivot screw surface with perhaps some lubrication therebetween. Such rotary coupling arrangements, however, are not the only possibilities. A further possibility is the use of hinges with two side members therein for affixing to the components that are to rotate with respect to each other with these side members being rotatably coupled to one another by a hinge pin which may be a separate component or integral with one of the members. Use of a hinge in joint or manipulator 10 has one side member of the hinge affixed to, or integral with, the pivoting link of interest, and with the other side member of the hinge being affixed to, or integral with, any of base support 12, pivot holder member 25, 25', 25" and 25'", or to manipulable support 32 as appropriate. In the affixing, or integrating, of the side members of a hinge being used to assemble pivoting links to such other members of joint or manipulator 10, the hinge is arranged so that the result is the hinge pin being positioned along the same axis as the rotational axis that extended through the pin or pivot screw in the earlier forms of the rotary coupling described above.

A further possibility in a hinged rotary coupling is the use of a so called "living hinge" in which the two sides of the hinge are each integral with one of the two corresponding structural members being hinged together to accomplish the affixing of the hinge sides thereto, and the hinge pin is provided by a thin portion of the material forming the hinge being continuously extended between these two corresponding structural members rather than by a separate pin. A joint or manipulator 10 embodying such "living hinge" structures is shown in FIG. 16A. In this figure, structures having the same purpose as similar purpose components in the joints or manipulator examples previously given have retained the same numerical designations here as were used in the earlier examples. This is so even though there are significant structural differences in the structural members used in FIG. 16A as compared to similar purpose components used in the earlier examples because of the use of "living hinges" in the FIG. 16A system in place of the pins or pivot screws used in the earlier examples.

Thus, an output shaft, 15'", extending from a linear actuator not shown in FIG. 16A (perhaps having one end thereof mounted on a mounting arrangement also not shown in FIG. 16A) is used to rotate pivoting link 20' about "living hinge" 22' that connects that pivoting link to base support 12. In the same manner, an output shaft, 16'", extending from a linear actuator not seen in FIG. 16 is used to rotate pivoting link 20 about "living hinge" 22 connecting it to base support 12. These "living hinges" replace corresponding pins or pivot screws 22' and 22 in previous examples. Such "living hinges" are also provided in the structure of FIG. 16A for connecting pivoting links 20' and 20'" to base support 12 to rotate thereabout although these hinges are unseen in that figure. The other "living hinges" provided in place of the pins or pivot screws used in the previous examples in FIGS. 1 through 15 are designated with the numerical designations in FIG. 16A that were used for such pins or pivot screws in the previous examples.

As can be seen, pivoting links 20, 20', 20" and 20'" in the lower plurality thereof are formed as extended flat sheets with a more or less central ridge embossed therein for strength. Alternative to such a ridge for strengthening would be an edge flange along the long sides of the link bent at a significant angle with respect to the rest of the sheet, or a rigid backing strip affixed to the center of the link sheet, or the like. Pivoting links 30, 30', 30" and 30'" in the upper plurality thereof are provided in the same manner. Pivot holder members 25, 25', 25" and 25'" are also provided as flat sheet portions. Base support 12 and manipulable support 32 are each provided as truncated cylindrical shell portions affixed to a four-arm cross with the arms being 90° apart and approximately the same length, the cylindrical shell portions being affixed to the region where these arms cross one another.

The construction of the upper and lower pluralities of pivoting links, the pivot holder members, and the "living hinges" therebetween used in place of pins or pivot screws in the structure of FIG. 16A allows the structure to be formed relatively inexpensively. One possibility is stamping, cutting or molding of upper and lower halves of joint or manipulator 10 with a dividing line being the intersection of pivot holder members 25, 25', 25" and 25'" with the horizontal plane common thereto at the point midway therein between the upper and lower pivoting link rotatably attached thereto by corresponding "living hinges". Each such half so formed can then be assembled into the structure of joint or manipulator 10 in FIG. 16A by merely welding the two halves of each pivot holder member together if the material chosen is a weldable metal, or by adhering the two sides of each pivot holder member together if the material is a polymer or some other material suitably joined by adhesion. If, instead of the dividing line being in a common horizontal plane, the divide is made at the living hinges, and these hinges are made as bendable in one direction as the other, identical upper and lower halves can be made to reduce the number of different components used in the assembled manipulator. A further possibility is the provision of a three dimensional mold to form joint or manipulator 10 of FIG. 16A as a complete entity in a single molding process (except for the linear actuators in most instances).

The resulting structure in FIG. 16A for joint or manipulator 10 can be used to position manipulable support 32 therein anywhere over a wide angular range by forcing pivoting links 20 or 20' to selected rotational positions about the corresponding portion of base support 12 to which they are rotatably coupled by "living hinges" 22 and 22', respectively. The performance of such a joint or manipulator 10 can be made quite repeatable if the structural members, especially the "living hinges" used therein, are carefully made with materials exhibiting the same properties from batch to batch as well as carefully maintaining essentially identical dimensions from batch to batch in each unit made such as by use of precise laser cutting techniques. In addition, joint or manipulator 10 can be made exceeding small by using these methods, such as cutting the halves and forming the living hinges all by the use of lasers.

A further possibility is to use shape memory alloys for joint or manipulator 10 of FIG. 16A (or at least for the "living hinges") with heaters at the hinges, such as deposited resistive heaters, to control the degree of bending at these hinges by applying heat thereto. Suitable shape memory alloys are from thermal elastic martensitic alloy systems such as nickel-titanium alloy systems, including the alloy NITINOL.

In addition, such a joint or manipulator can be formed using alternative numbers of pivoting links in the upper and lower pluralities thereof, along with corresponding numbers of pivot holder members, as has been shown in previous examples where such pluralities have included alternative uses of both three and four links as described in FIGS. 1 through 16A. The possible number of pivoting arms in each of the upper and lower pluralities, however, is not limited to these alternative numbers shown in the examples previously given. This is demonstrated by a further example shown in FIG. 16B where, arbitrarily, eight pivoting links are used in each of the upper and lower pluralities thereof. Base support 12 and manipulable support 32 are indicated in this structural arrangement for joint or manipulator 10 in FIG. 16B, but separate designations are not provided for all eight pivoting links in each of the upper and lower pluralities thereof nor for the eight pivot holder members in view of the clear correspondence with the previous examples.

A compact, ruggedized version of joint or manipulator 10 is shown in FIG. 17 in which "living hinges", pins or pivot screws, the latter two with or without bearings or bushings, as described above are used in clevis or shackle arrangements, and pivot holder members as described above are used in yoke arrangements, to rotatably secure therein the ends of lower plurality pivoting links 20, 20', 20" and 20'" and the ends of upper plurality pivoting links 30, 30', 30" and 30'" using the designations therefor used in previous figures. Such arrangements result in the shaft about which a corresponding pivoting link end rotates being supported at both ends at its location in a support or holder rather than just at one end thereof as previously shown. These pivoting links are redesignated 20bc, 20bc', 20bc" and 20bc'" and 30bc, 30bc', 30bc" and 30bc'", respectively, in FIG. 17. Base support 12 of previous figures has been redesignated 12c and manipulable support 32 of previous figures has been redesignated 32c in view of their being modified by having four outward and upward (support 12c) or downward (support 32c) extending arms that extend from opposite sides of the main bodies of the supports. These extending arms each thereby form a "U" shaped space between the corresponding main support body and itself to rotatably accommodate the ends of the pivoting links therein which are secured there by the use of a pin extending through the arm and link end into the main body that allows the link to rotate thereabout.

Pivot holder members 25, 25', 25" and 25'" of previous figures have been redesignated 25y, 25y', 25y" and 25y'" in FIG. 17 as they have been converted to yokes each having a pair of clevis members therein to provide two "U" shaped spaces in each for rotatably accommodating in these spaces the remaining ends of the pivoting links again by the use of a pin extending through the clevis portions and link end therebetween to allow the link to rotate thereabout. In the arrangement shown, very little of each pivot holder extends away from joint 10 outside of the corresponding pivot link ends held therein to provide a compact joint in the directions of the plane containing these holders. Compaction of the extent of joint 10 in a direction perpendicular to that plane is again achieved by bending the pivoting links as shown in FIG. 8.

As indicated above, pivot holder members 25, 25', 25" and 25'" (or just 25, 25', 25" in the situation of three links in the upper and lower pluralities thereof) in figures preceding FIG. 17 remain in common planes during motions of manipulable support 32 in at least many configurations of joint or manipulator 10. Furthermore, in many of these configurations, these pivot holder members are also essentially only on a certain circle in the common planes which is of a substantially constant diameter. Because of these characteristics, these pivot holder members can be linked to one another to some degree as opposed to being free of any direct interconnections therebetween as seen in the examples described above in connection with FIGS. 1 through 17.

Thus, FIG. 18 shows just a lower half of a joint of manipulator 10 as described above and shown in various configurations in FIGS. 1 through 12. Here, however, four pivot holder members, 45, 45', 45" and 45'", of somewhat different configuration compared to those in previous examples are provided, the difference being in the presence of a tab extending from the outside thereof away from the side of the member having pivoting links rotatably coupled thereto. These tabs extend outward along the midpoint common plane of pivot holder members 25, 25', 25" and 25'". The components shown in reduced manipulator 10' of FIG. 18 have numerical designations there that are the same as those used for components in the structures of FIGS. 1 through 12 of a similar nature.

These tabs on these pivot holder members fit into a slot, 46, in a ring, 47, to thereby link the pivot holder members to one another to a degree. The tabs on each of pivot holders 45, 45', 45" and 45'" can have hardened surfaces to permit the tab to serve as a slider, or can have slider bushings provided thereover, or can have a ball bearing captured on the end thereof for fitting into slot 46. Slot 46 may be provided with a bushing insert or ball bearings to further reduce the friction of the tabs on the pivot holder members moving therein. Provision of ring 46 as shown in FIG. 18 adds both rigidity and strength to the reduced form joint or manipulator, 10', shown there.

Figure 19:
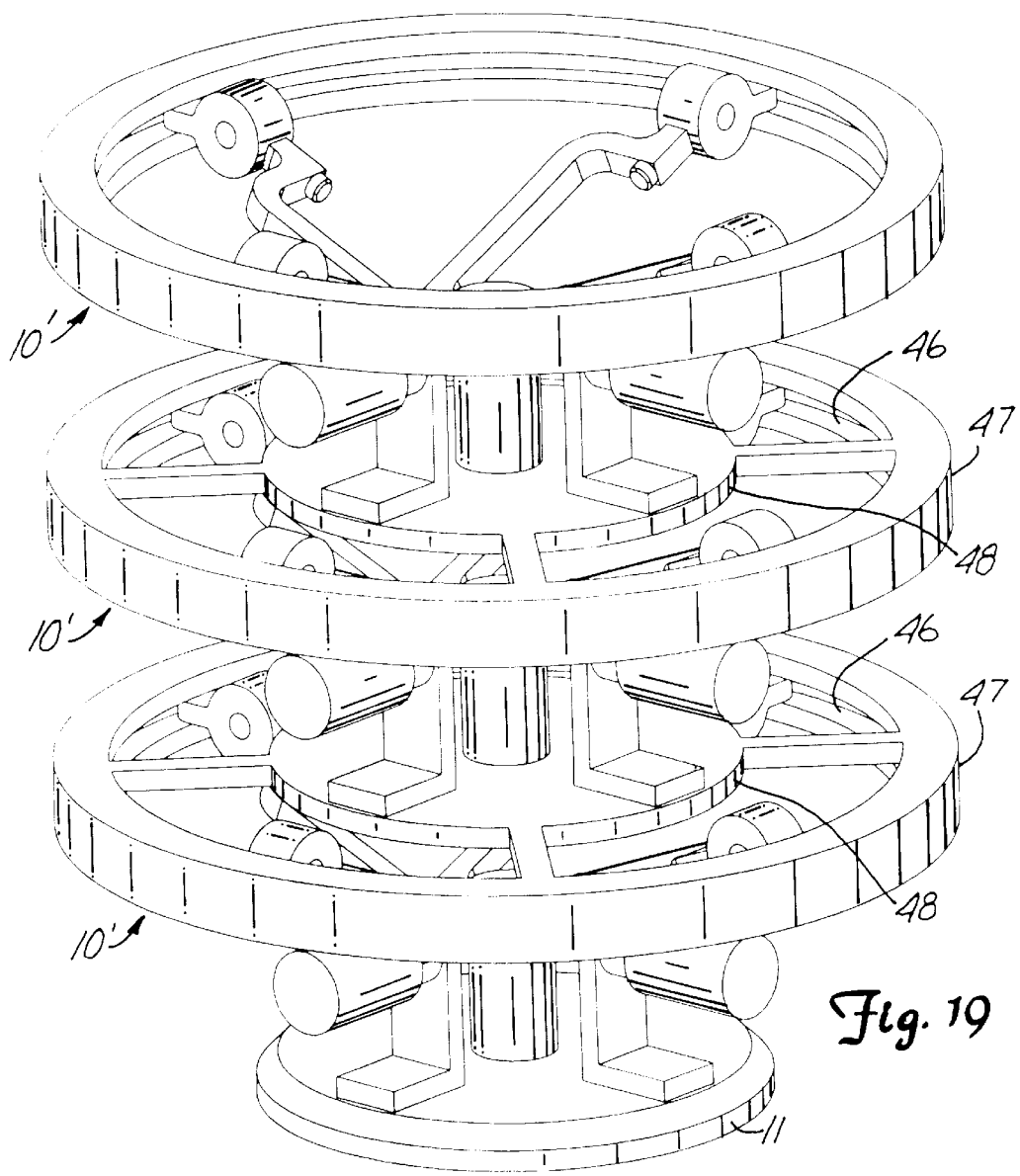

The presence of ring 46 allows providing other construction with respect to joint or manipulator 10', because a platform can be supported across that ring if desired by the user. One such possibility as shown in FIG. 19 where the provision of such a platform, 48, is used to support another such reduced manipulator 10' thereon so as to allow stacking of such reduced manipulators. This presents an alternative way to provide an oriented platform capable of greater angular motion than would be available from a single reduced manipulator 10' by itself. The numerical designations provided in FIG. 18 are not all repeated in FIG. 19, as referring to FIG. 18 makes clear the nature of the components in the stacked manipulators shown in FIG. 19.

Figure 20:
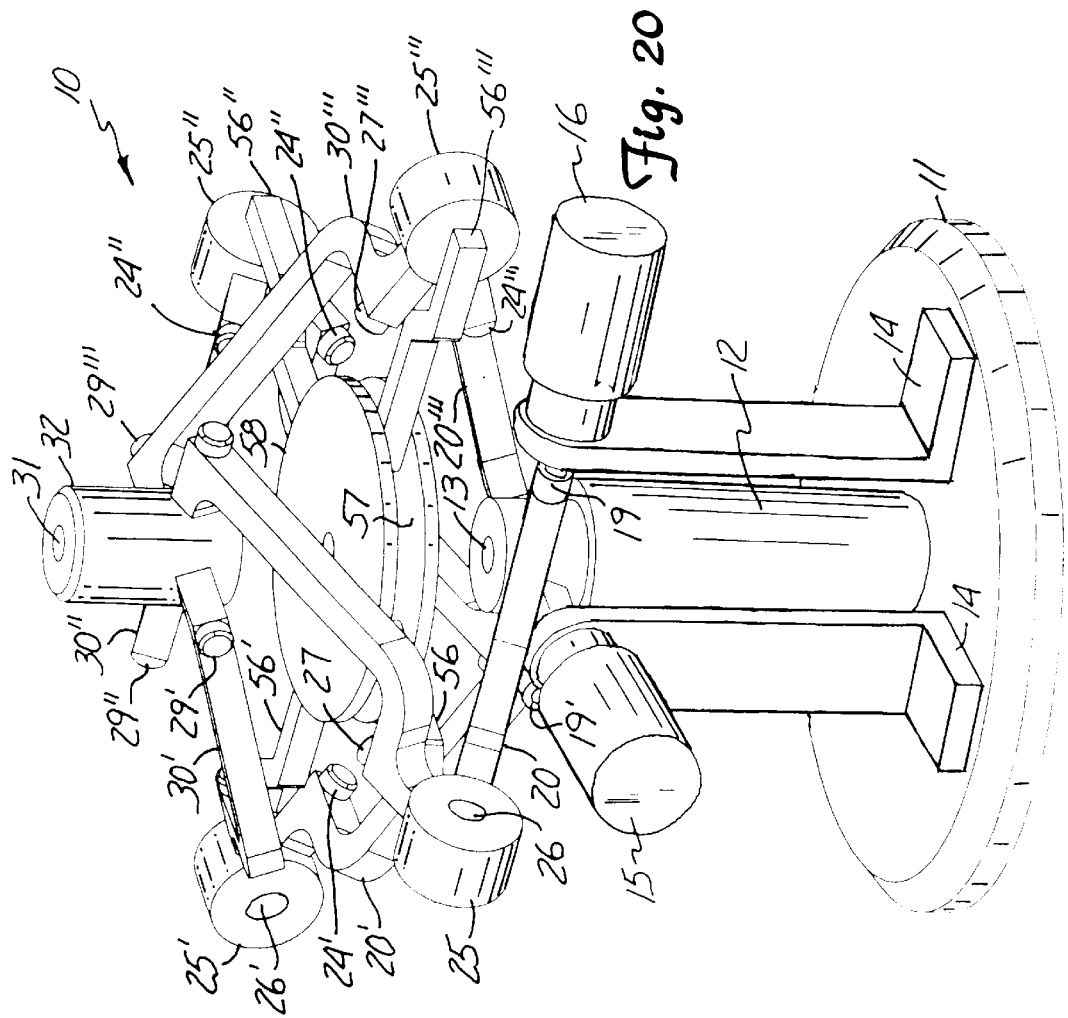

Such a banding ring arrangement can also be provided, of course, for a full joint or manipulator 10 of the kind described in connection with FIGS. 1 through 15 insofar as providing pivot holder members with tabs extending on the outer sides thereof into the slot of such a surrounding ring to add rigidity and strength. However, because of the presence of the upper plurality of pivoting links 30, 30', 30" and 30'" along with manipulable support 32 above that ring may interfere with providing a platform supported on the ring, another alternative is shown in FIG. 20. Here, arms, 56, 56', 56" and 56'", are affixed in corresponding ones of openings 26, 26', 26" and 26'" in corresponding pivot holder member 25, 25', 25" and 25'". The opposite ends of arms 56, 56', 56" and 56'" each fit into a slot, 57, in an interior platform, 58. Support arms 56, 56', 56" and 56'" are affixed in the corresponding ones of the pivot holder members so as to bisect the angle between the rotation axis of the two pivoting links rotatably coupled to each of those members in supporting platform 58, i.e. extend along the common midpoint plane. Platform 58 in this joint interior location is available to, for instance, support additional mechanical instruments operating through opening 31 in manipulable support 32, or to support electronics or optic systems operating through that same opening in support 32.

Alternatively, support arms 56, 56', 56" and 56'" can have the interior ends thereof formed as truncated cylindrical shell with these arms being of sufficient length, and of sufficient separation from the common plane in some instances, to allow them to be stacked over one another such that the axis of radial symmetry of each is aligned with the others. A rod, a pin, through the central opening of each such arm shell will hold them together along a common axis to again provide added strength and rigidity to the manipulator. Also, bearings or bushings may be provided between the shells and the pin to reduce friction.

Joint or manipulator 10 as shown in FIGS. 1 through 15 can also be repeated in a stacked fashion in much the same manner as reduced joint or manipulator 10' of FIG. 18 was stacked in FIG. 19. Thus, in FIG. 21, one such joint or manipulator 10 is operably stacked upon another. In so doing, manipulable support 32 of the lower manipulator is combined with the base support of the upper manipulator through forming a common cylindrical shell that is designated 32, 12', there being an opening extending through this shell designated 31, 13'. A lower sector gear, 65, is affixed to pivoting link 30' of the lower manipulator by pin or pivot screw 29', and another lower sector gear, 66, is affixed to pivoting link 30 by pin or pivot screw 29. Similarly, a pair of upper sector gears, 65' and 66', are affixed to two of the pivoting links in the lower plurality thereof for the upper manipulator, and each is engaged with a corresponding one of lower sector gears 65 and 66.

Thus, rotation of pivoting links 30 and 30' of the lower manipulator in response to force imparting means rotating pivoting links in the lower plurality thereof in that manipulator will result in rotation of lower sector gear 65 and 66, respectively, and so of upper sector gears 65' and 66', respectively, along with the lower plurality pivoting arms of the upper manipulator to which they are affixed. Such rotation will result in forcing the output structure, 32' of the upper manipulator in FIG. 21 to correspondingly move. Most of the components in the upper manipulator are not given numerical designations here as their nature can be easily derived from considering a similar component in the lower manipulator in FIG. 21 and consulting the description of similar components in connection with the manipulators of FIGS. 1 through 12.

Figure 21:
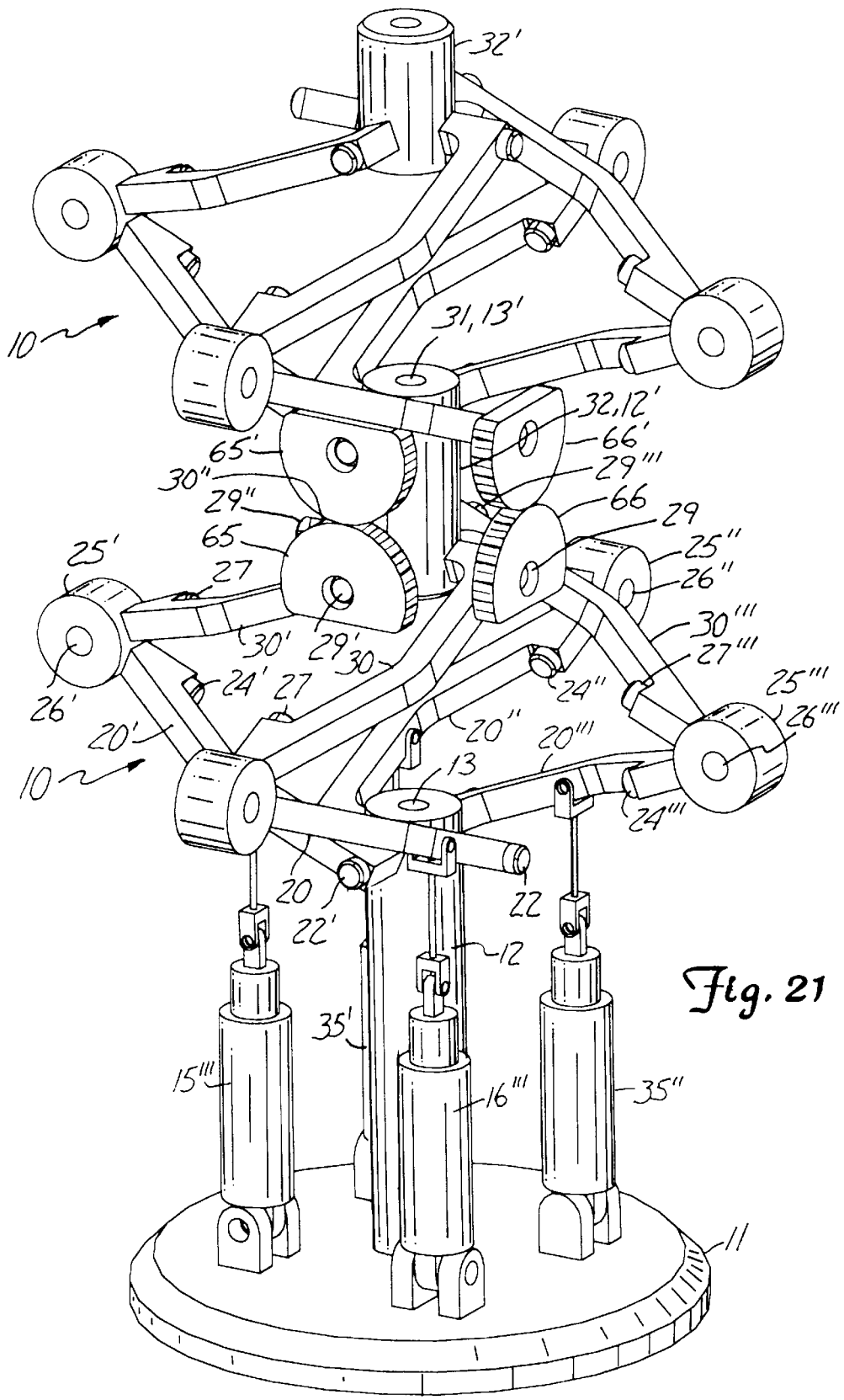

A further change in the system shown in FIG. 21 as compared with the similar manipulators shown in FIGS. 1 through 12 is the substitution of linear actuators for the directly and indirectly connected electric motors used in the examples of FIGS. 1 through 12. These linear actuators are rotatably coupled at one end thereof to mounting arrangement 11 and at the other end thereof to a corresponding one of the pivoting links in the lower plurality thereof in the lower manipulator of FIG. 21 through the use in each instance of a clevis and pin. Two of these linear actuators have been labeled 15''' and 16''' in accord with the use of two linear actuators carrying those designations in the system of FIG. 16. Here, however, two further linear actuators are also used to operate the two remaining pivoting links in the lower plurality thereof in this lower manipulator. These two other linear actuators have been designated 35' and 35'' in accord with the designation of 35 for the added motor actuator used in connection of the system of FIG. 13.

Figure 22:
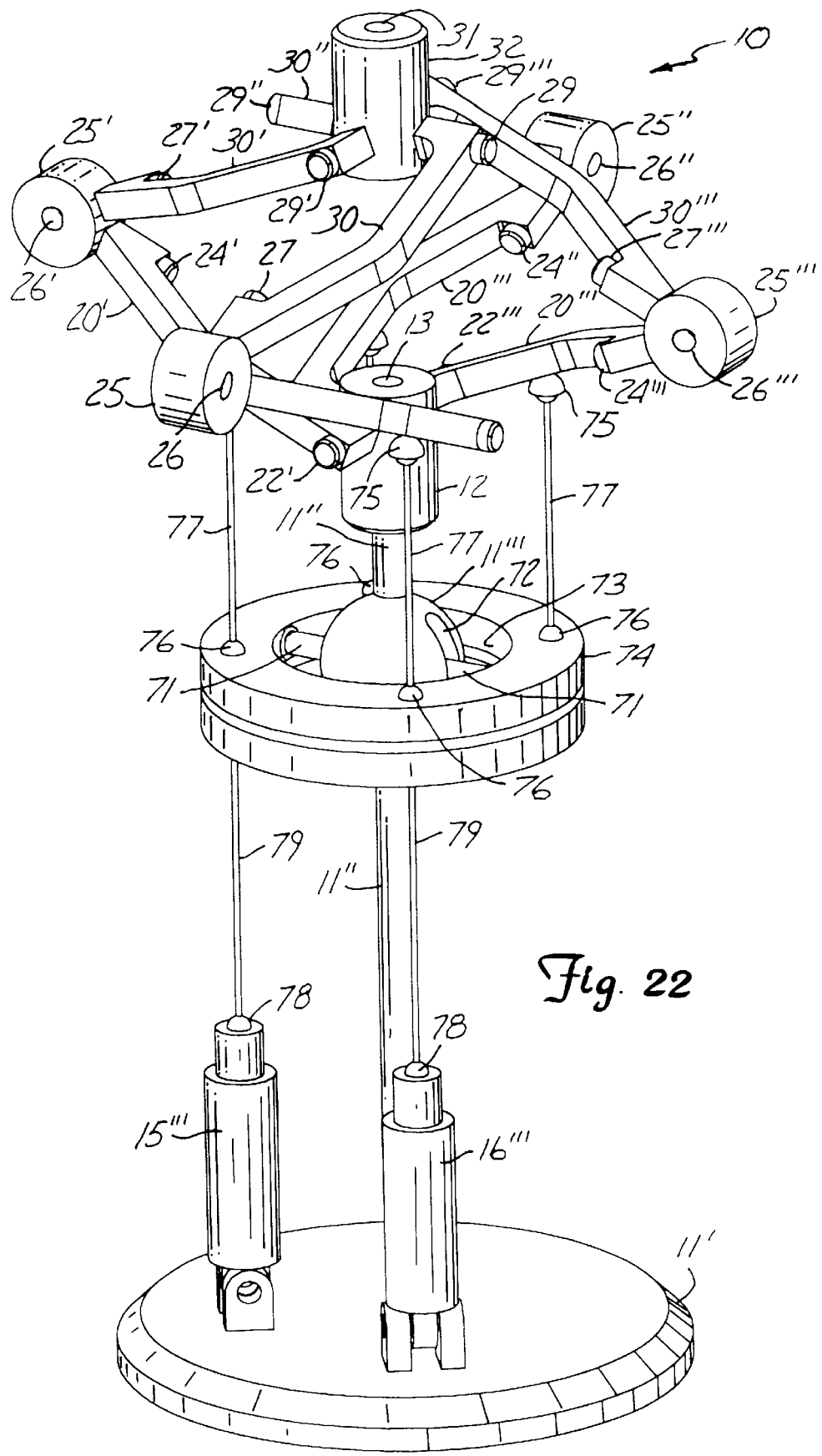

A variation is shown in FIG. 22 in the use of linear actuators in connection with the examples of joint or manipulator 10 in FIGS. 1 through 12. The main mounting arrangement base, 11', supports a hollow support shaft, 11'', extending upward therefrom to base support 12 of manipulator 10, but this shaft is divided into two sections by a slotted ball, 11''', with the two sections affixed to opposite sides of this slotted ball to extend vertically to support 12. These two sections also extend more or less perpendicularly to a second generally transverse shaft, 71, extending through a slot, 72, in ball 11''' past the ball outer surface with slot 72 opening generally along the direction of shaft 71. Shaft 71 can rotate back and forth in slot 72 about a pin affixed in ball 11''' extending through a midpoint diameter of this shaft that is oriented perpendicular to the extent of support shaft 11''. The portions of each end of shaft 71 extending past the ball outer surface are supported above a bearing interface, 73, by being inserted in bearings in openings in the upper half of a ring, 74, so as to be rotatably coupled to this upper half. Typically, the upper half of ring 74 is supported by the lower half thereof and the upper half thereof can rotate on bearings at interface 73 with respect to the lower half. A passageway in slotted ball 11''' bypassing slot 72 and meeting each section of shaft 11'' would allow a complete passageway from mounting arrangement base 11' to opening 13 in base support 12.

Each of pivoting links 20, 20', 20'' and 20''' in the lower plurality thereof have a socket, 75, connected thereto. The top surface of ring 74 also has corresponding sockets, 76, connected thereto. Connecting rods, 77, with a ball at each end thereof extend between a corresponding one of sockets 76 on the surface of ring 74 and a socket 75 connected to a corresponding one of the pivoting links in the lower plurality thereof in manipulator 10, the balls on each end of each rod being fitted into the corresponding sockets. Thus, tilting the upper surface of ring 74 leads to pushing and pulling on pivoting link 20, 20', 20'' and 20''' in the lower plurality thereof so as to result in altering the position of manipulable support 32 as desired.

This tilting of the upper surface of ring 74 can be accomplished by tilting ring 74 back and forth about transverse shaft 71 rotatably coupled thereto, and by tilting ring 74 and transverse shaft 71 back and forth about the shaft midpoint pin, all through the extension and retraction of the output shafts of linear actuators 15''' and 16''' which are rotatably coupled to mounting arrangement main base 11'. The output shafts of linear actuators 15''' and 16''' each have a socket, 78, connected thereto and corresponding sockets are connected to the bottom surface of ring 74 but are unseen in the view of FIG. 22. Connecting rods, 79, with a ball on each end thereof extend between the corresponding socket on the output shaft of each of the linear actuators and the corresponding sockets on the bottom surface of ring 74 with the end balls fitted into the corresponding sockets. Thus, extending and retracting the shafts of linear actuators 15''' and 16''' can tilt plate 74 in a direction desired to result in change in the position of manipulable support 32 in manipulator 10 as desired by the user.

In addition, shaft 11'' can be rotated within mounting arrangement main base 11' to thereby rotate manipulator 10 without any rotation being required of linear actuators 15''' and 16''', or of main base 11' through the corresponding rotation of ball 11''' and the upper half of ring 74. Thus, roll motion of manipulator 10 is decoupled from the tilting forces provided by actuators 15''' and 16''' for positioning manipulable support 32.

Figure 23:
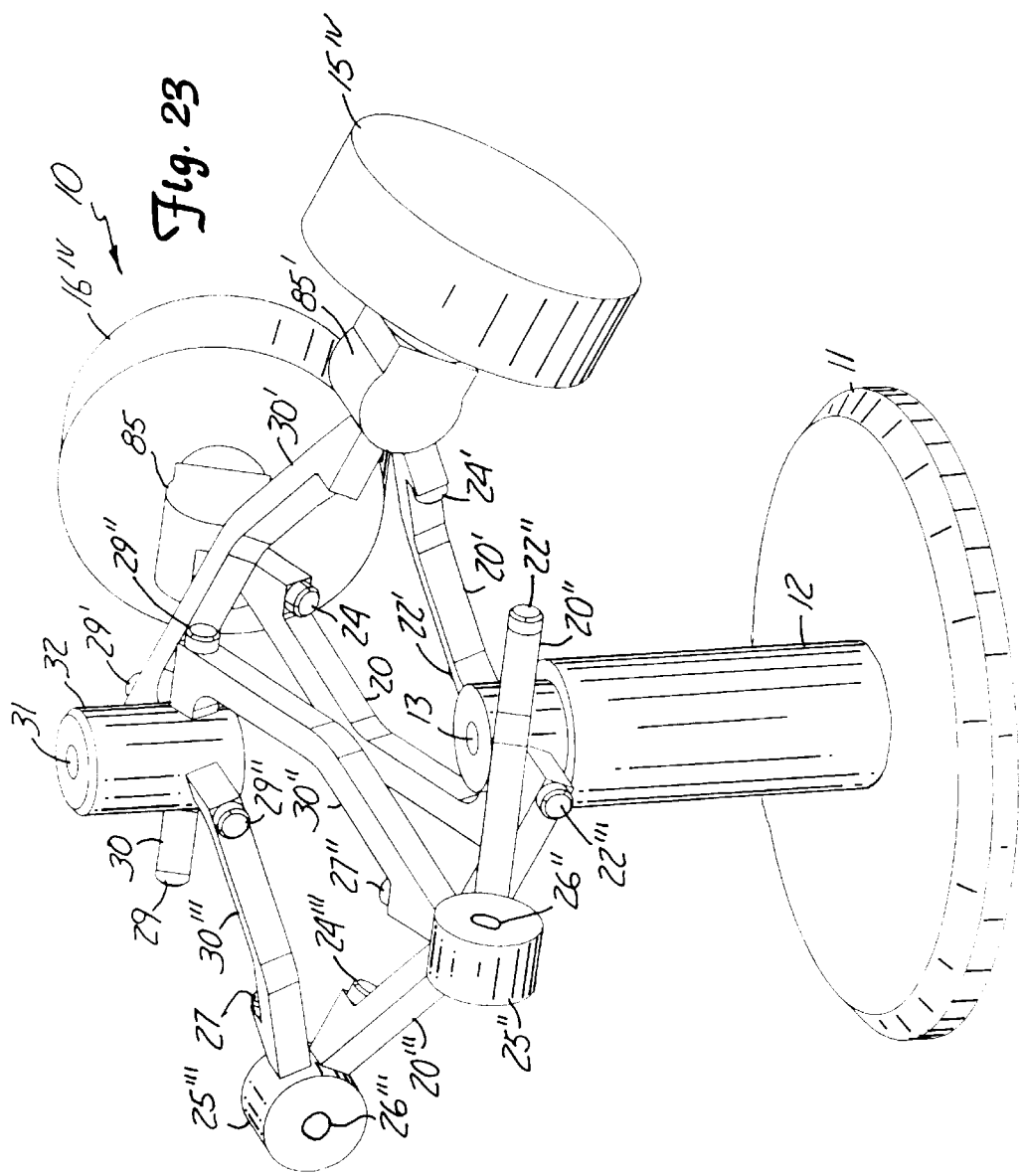
FIGS. 23 and 24 show perspective and fragmentary views of an alternative embodiment of the present invention.

A further possibility for providing manipulating forces to joint or manipulator 10 for positioning selected parts thereof is shown in FIG. 23. Here, entirely omitted are the electric motors and linear actuators used in previous examples to manipulate pivoting links in the lower plurality thereof in which they were supported directly by mounting arrangement 11, perhaps while extending through that mounting arrangement. Rather, two electric motors, 15$^{iv}$ and 16$^{iv}$, are each mounted on a corresponding one of a pair of modified pivot holders, 85 and 85', present in manipulator 10 in place of corresponding pivot holders 25 and 25'. The other components shown in FIG. 23 have the same numerical designations as components of the same nature shown in the examples of FIGS. 1 through 12.

Figure 24:
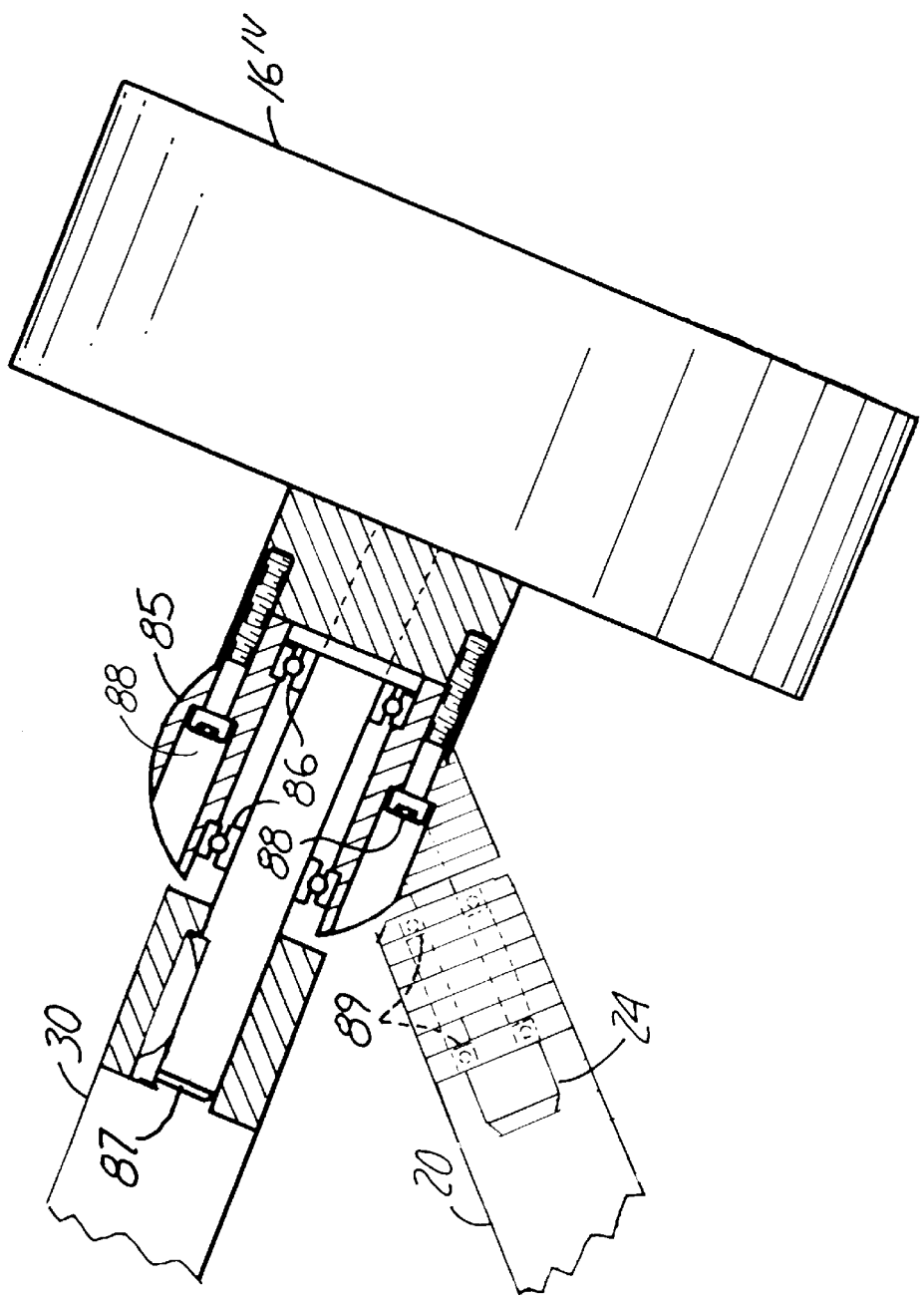

A fragmentary view of electric motor $16^{iv}$ and pivot holder member 85 along with portions of pivoting links 20 and 30 is shown in FIG. 24 with a portion thereof shown in cross section. As can be seen there, the rotor shaft of motor $16^{iv}$ serves as an alternative to pin or pivot screw 27 in extending from the rotor of the motor through pivot hole member 85 and a set of bearings, 86, contained therein to be affixed to pivoting link 30, this rotor shaft and pin being redesignated 87 in FIG. 24. Thus, rather than pivoting link 30 rotating about a pin 27 extending from pivot holding member 25 as before, motor $16^{iv}$ directs the rotation of pivoting link 30 with respect to pivot member 85 through the degree of rotation of its rotor. Pivot holder member 85 is assembled to motor $16^{iv}$ by a pair of screws, 88. Pin 24 is affixed in pivot holder member 85 just as it was affixed in pivot holder member 25 in the examples shown in FIGS. 1 through 12. Pivoting link 20 for the lower plurality thereof can rotate about pin 24 on a further set of bearings, 89, shown in dash line form in FIG. 24.

Rotation of rotor shaft 87 of electric motor $16^{iv}$ will result in forcing manipulable support 32 to rotate initially about the base rotational center of rotational motion in base support 12 thereby rotating the combination of pivot holder member 85' and the ends of pivoting links 20' and 30' rotatably coupled thereto along with the combination of pivot holder member 25'" and the ends of pivoting links 20'" and 30'" rotatably coupled thereto. Generally, rotation of the rotor of motor $15^{iv}$ results in the rotation of the combination of pivot holder member 85 along with the ends of pivoting links 20 and 30 rotatably coupled thereto and the combination of pivot holder member 25" and the ends of pivoting links 22" and 30" rotatably coupled thereto. Such rotations can, by causing the rotors of motors $15^{iv}$ and $16^{iv}$ singly or jointly to rotate, result in providing essentially all of the motions for manipulable support 32 that could be provided therefor in the examples shown in FIGS. 1 through 12.

Figure 25:
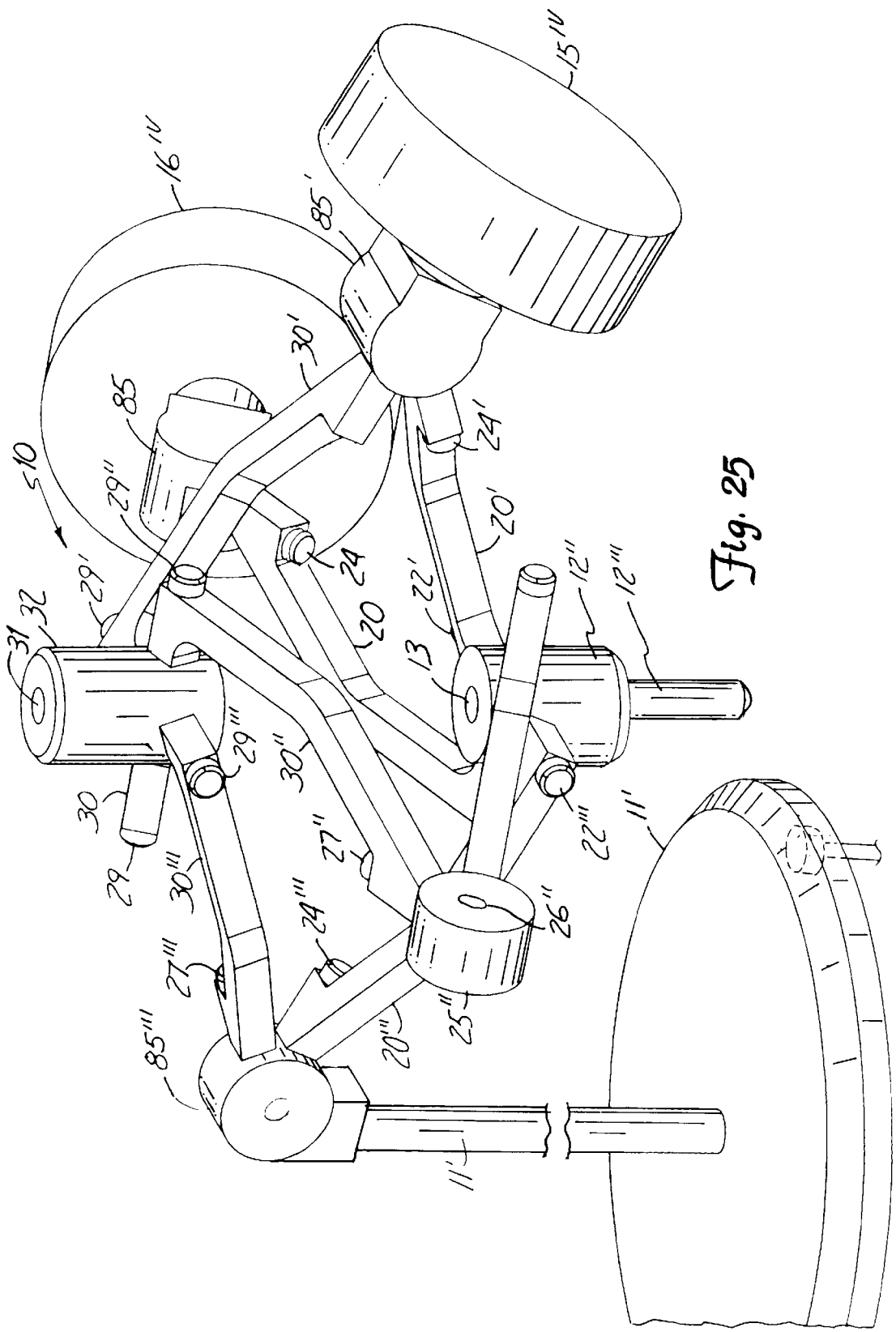
FIGS. 25 through 27 show perspective views of alternative embodiments of the present invention.

A further variation of the system shown in FIG. 23 is to change joint or manipulator 10 from being supported through having base support 12 supported on mounting arrangement 11 to the alternative shown in FIG. 25 where it is supported through a pivoting holder member. This is accomplished by providing a further modified pivot holder member, 85'", to replace pivot holder member 25'" with this modified pivot holder member having a provision therein allowing it to be mounted on a shaft 11" supported on a main mounting arrangement plate 11'. A modified base support, 12", rather than being directly supported by mounting arrangement 11 as before, is supported in FIG. 25 by the remaining portions of the structure of manipulator 10 mounted on shaft 11' to thereby allow base support 12" to become the output structure for the system. That is, rotation of the rotors of motors $15^{iv}$ and $16^{iv}$, along with the rotation of mounting plate 11', allows a further output device, 12'", mounted on support 12" to be placed anywhere over an area surrounding mounting arrangement plate 11' and to have device 12'" presented at any of a wide range of angles at such a selected position. Manipulable support 32 is allowed to take whatever reactive position occurs in accommodating the placement of device 12'" as desired.

Figure 26:
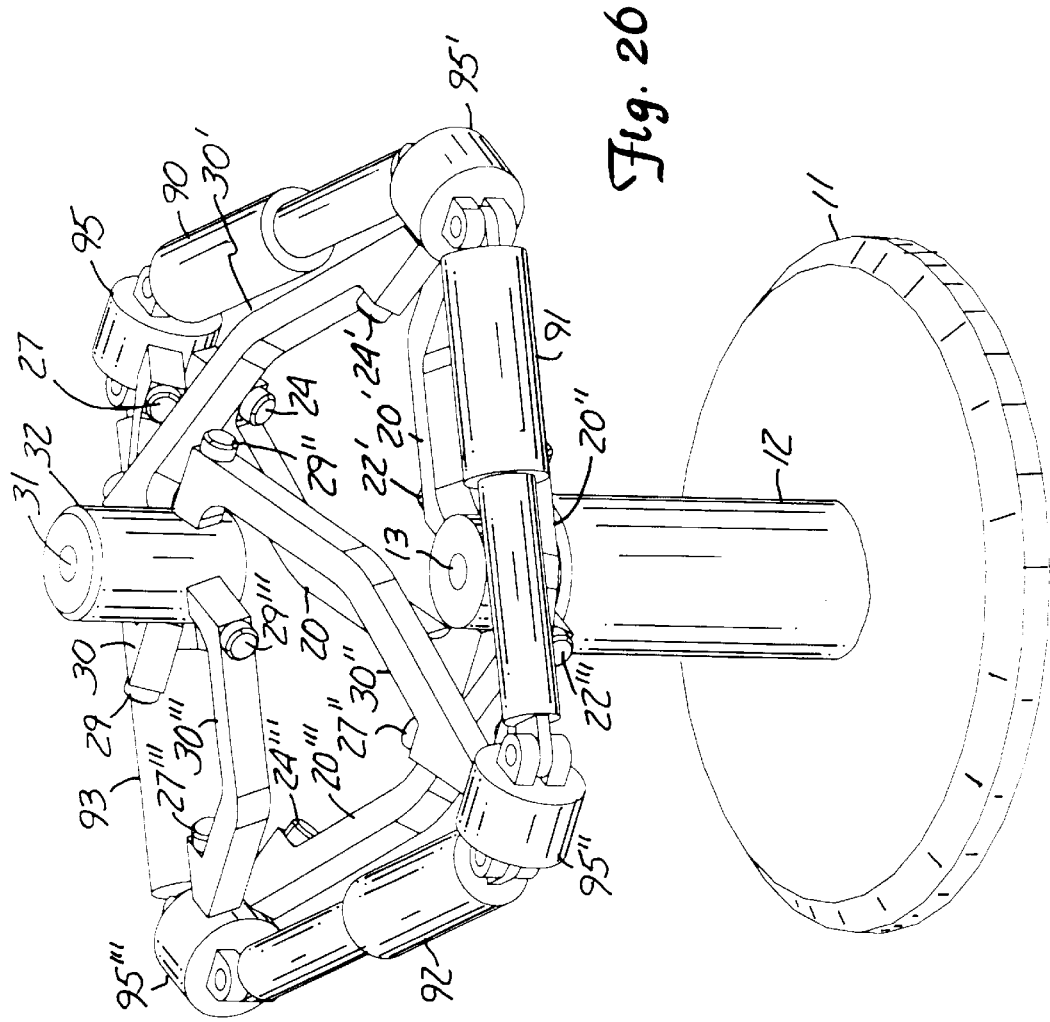

A further variant of the system shown in FIG. 23 involving applying motive force at the pivot holder members therein using a different kind of actuator is as shown in FIG. 26. There, linear actuators, 90, 91, 92 and 93, are each directly rotatably connected to and between adjacent pivot holder members, 95, 95', 95" and 95'". Although the minimum irreducible length of linear actuators 90, 91, 92 and 93 limits the amount of travel of two adjacent pivot holder members toward one another and so the angular range over which manipulable support 32 can be directed by these actuators, a small but precisely selectable angular range of motion is available to that support under the directions of these linear actuators.

This limited range of angular motion for manipulable support 32 can be increased by resort to another variation involving four linear actuators, but with one end of each rotatably mounted to base 11. The other end thereof can be connected through a capturing pulley connected to a corresponding one of a set of four cables each rotatably connected between adjacent pivot holder member pairs. This arrangement allows these linear actuators to again position manipulable support 32 over an angular range therefor by selectively pulling and releasing the corresponding pulley to which it is connected in concert with the others.

Figure 27:
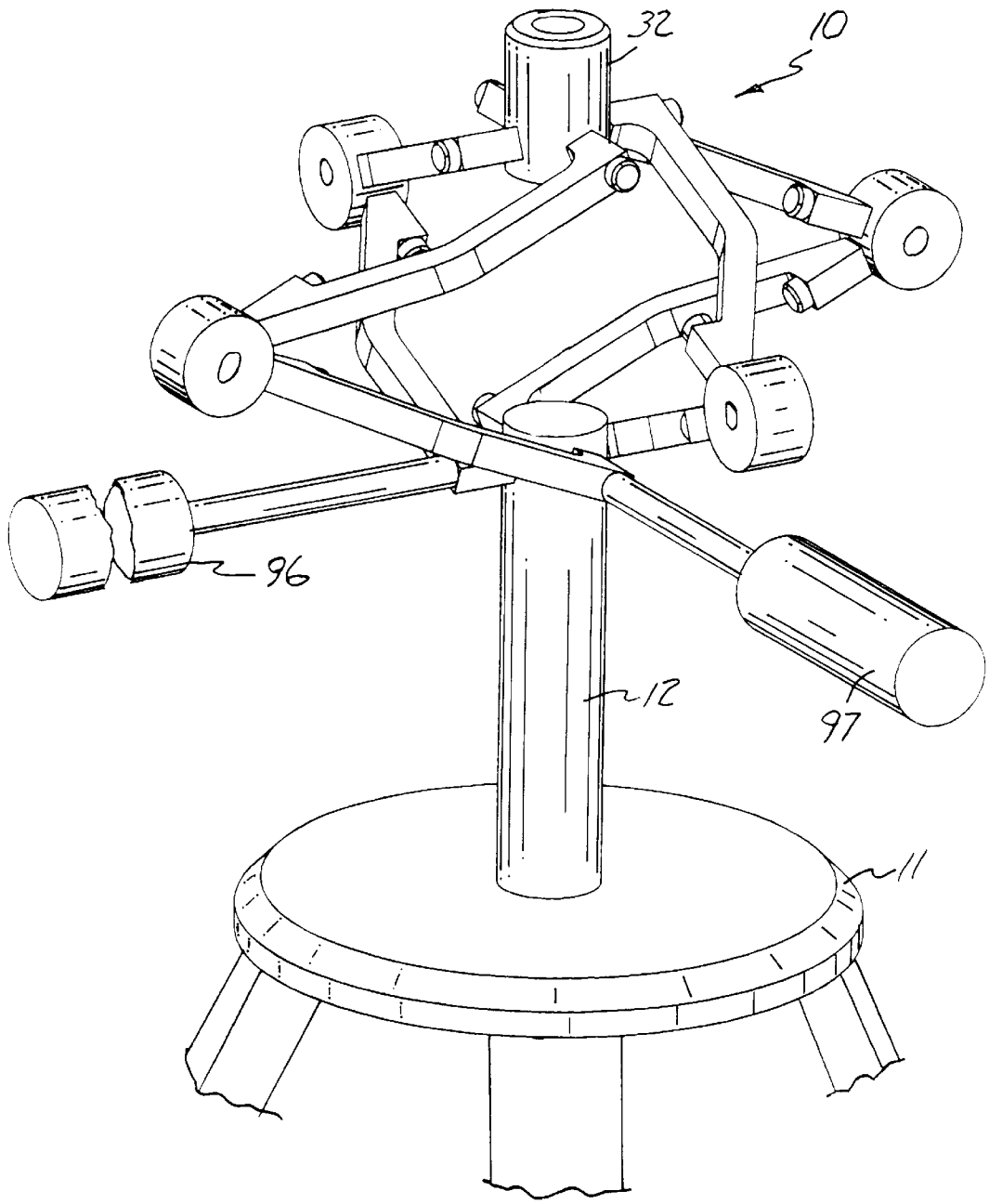

Although the various versions of the joint or manipulator 10 and 10' described heretofore are all described as being operated by motive means or actuators, either rotational or linear, such a joint can also be used in relatively static situations. A typical use would be as a positionable support for a camera on a tripod, a representation of such an arrangement being provided in FIG. 27. Mounting arrangement 11 is provided as the three-legged tripod base supporting base support 12.

Joint 10, rather than having motors 15 and 16 connected to two of the pivoting links in the lower plurality thereof as in the examples of FIGS. 1 through 12, has instead a pair of handles, 96 and 97, fitted on round shafts with portions of these shafts, on the ends thereof opposite the handles, having threads therealong and diameters small enough to pass through holes in pivoting links 20 and 20' into threaded holes (where pins or pivot screws 22 and 22' were) in base support 12. At a length inward from these ends of these shafts equal to the thickness of these links at such holes therein plus a suitable fraction of the depths of the threaded holes in base support 12 a shoulder occurs beyond which the shaft has a greater diameter than the diameters of the holes in these pivoting links. Thus, the pivoting links can rotate about the smaller diameter portions of the shafts until the corresponding handle is sufficiently tightened manually to result in the shoulder on the shaft forcing the corresponding pivoting link against base support 12 to in effect lock it in whatever position it may be at the time of such tightening. By so capturing two of the pivot links in the lower plurality thereof by manually tightening handles 96 and 97 at some corresponding selected angles of rotation of these links about the handle shafts, manipulable support 32 can be fixedly positioned temporarily pointing in any direction over a wide range of angles to direct a camera mounted on manipulable support 32 toward the scene desired to be photographed.

Figure 28:
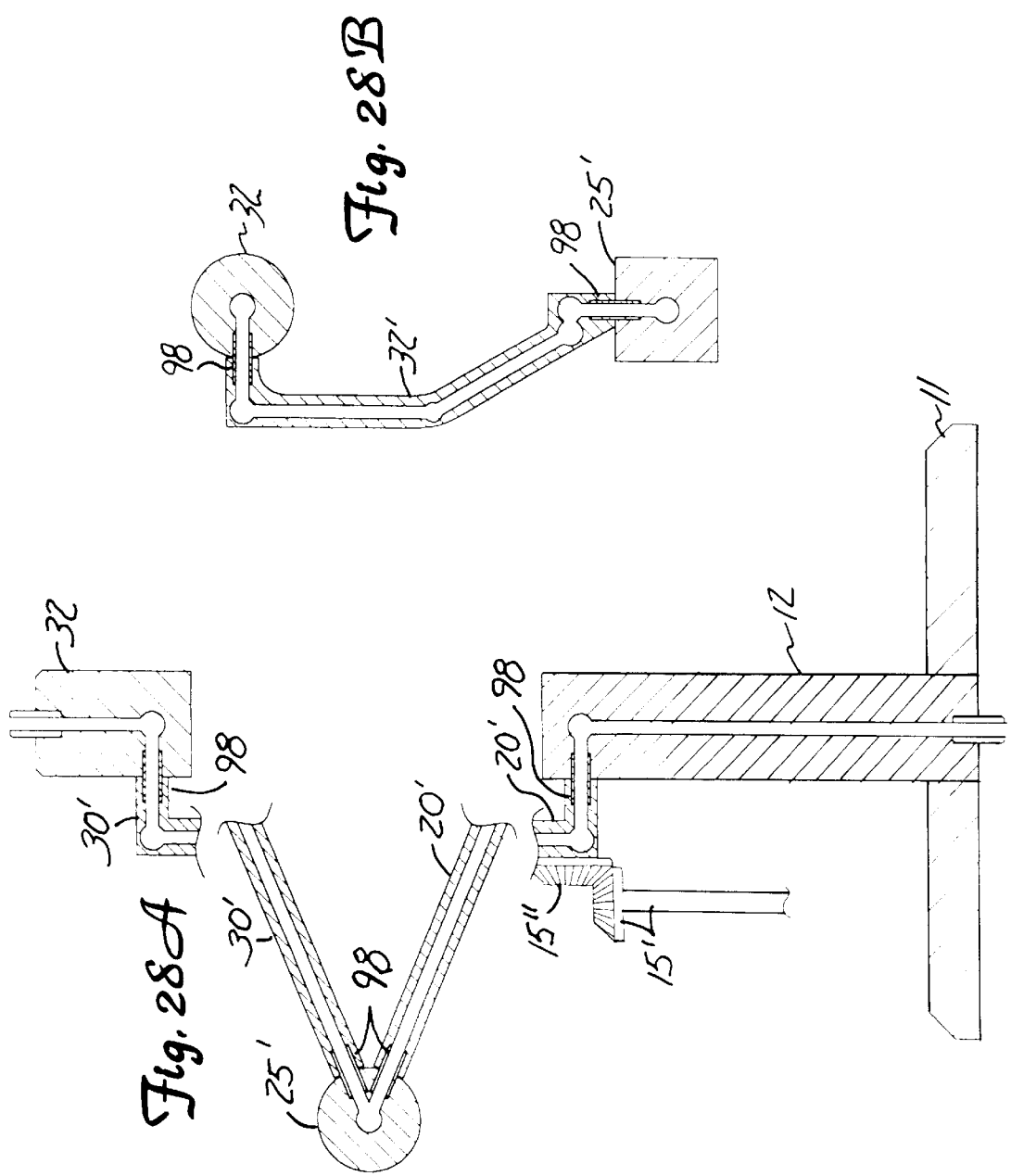
FIGS. 28A and 28B show partial fragmented elevation and partial plan views of an alternative embodiment of the present invention.

In a further possible variation, the pivoting links and pivot holder members, and the base and manipulable supports, used in the various examples of joint or manipulator 10 in FIGS. 1 through 12 for instance, lend themselves to serving as conduits for fluid or light or the like. FIG. 28A is a fragmented elevation view partly in cross section of parts of a portion of a joint or manipulator 10 from the example in FIGS. 6 through 7B showing how a conduit path for fluids can be formed in these parts to permit passing of fluid from mounting arrangement 11 through base support 12, pivoting link 20', pivot holder member 25', pivoting link 30' and manipulator support 32. FIG. 28B is a corresponding a top view in cross section of pivot holder 25', pivoting link 30' and manipulator support 32 of part of the structure shown in FIG. 28A to show part of this same conduit path in these members. Note that pivoting links 20' and 30' rotate about sealed bushings, 98, having an open passageway therethrough, where they are rotatably coupled to base support 12, pivot holder member 25' and manipulable support 32.

Figure 29:
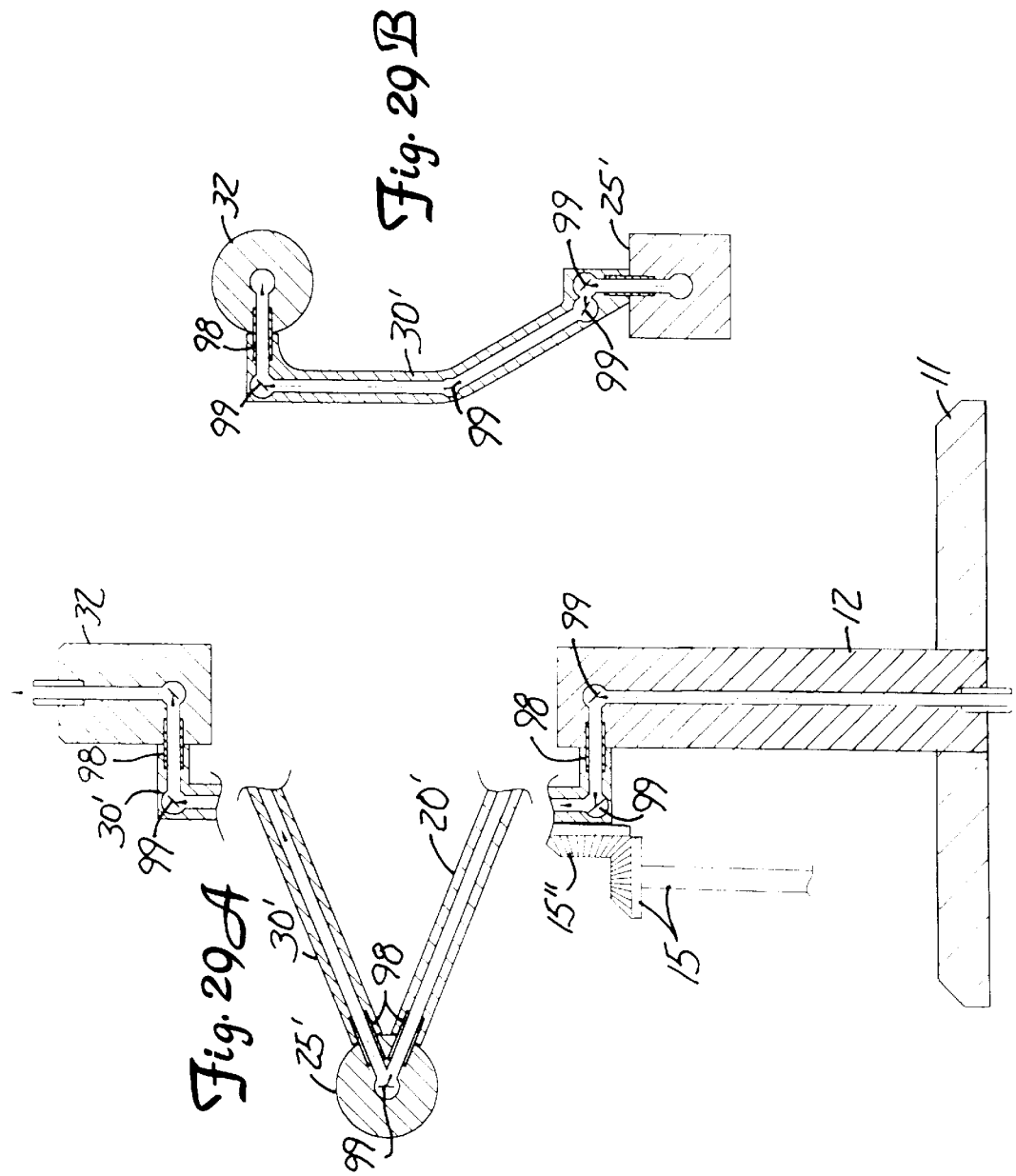
FIGS. 29A and 29B show partial fragmented elevation and partial plan views of an alternative embodiment of the present invention.

FIG. 29A shows the same fragmented elevation view, again partly in cross section, of the same conduit path through the same parts of the same manipulator portion as was shown in FIG. 28A but with the path made suitable for transferring a beam of light therealong rather than a fluid. This is accommodated by providing suitable mirrors, 99, at each point in which the light needs to change direction to be kept following the desired conduit path. FIG. 29B provides a top view in cross section of this same light path involving the same structures as were shown in FIG. 28B.

Figure 30:
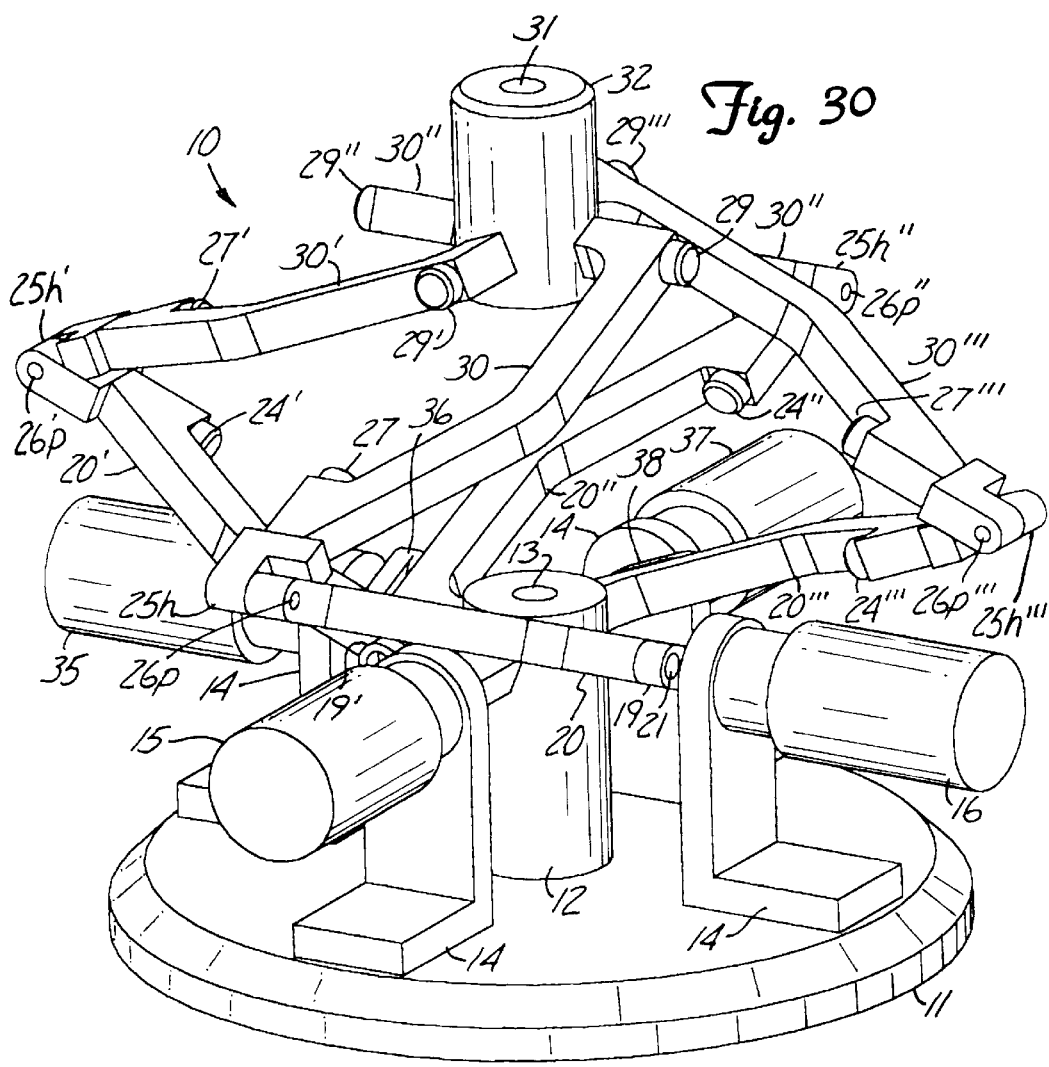
FIGS. 30 through 32 show two perspective and an elevation view of an alternative embodiment of the present invention.
Figure 31:
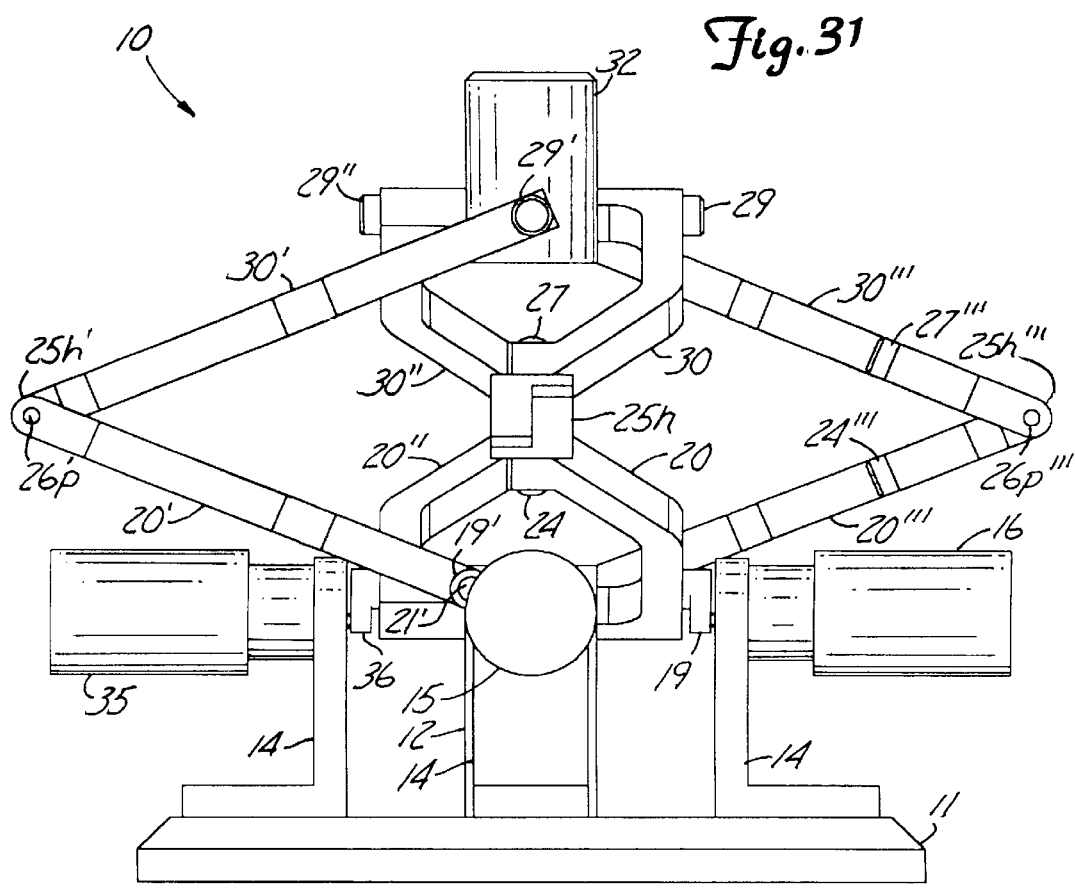

Rather than having to mount a further mechanical actuator on manipulable support 32 as a basis for providing a member which can be moved outwardly and inwardly with respect to manipulable support 32 along its axis of radial symmetry, joint or manipulator 10 can be modified to provide that capability directly to support 32 and so to anything mounted thereon. Such a modified joint is shown in FIG. 30 in a perspective view thereof. Two primary modifications have been made to joint or manipulator 10 in FIG. 30, these being the provision of a hinge in each of the pivot holder members and the addition of two further actuators to provide all of the lower rotating links with a corresponding actuator capable of rotating the lower pivoting link to which it is connected about the pin or pivot screw or other arrangement rotatably connecting that link to base support 12. FIG. 31 shows an elevation view of the version of joint or manipulator 10 shown in FIG. 30.

Pivot holder members 25, 25', 25'' and 25''' of previous drawings have essentially the same designations for corresponding pivot holder members in FIGS. 30 and 31 but with the addition of an "h" placed after numerals 25 in each instance to indicate it is a hinged member. The holes 26, 26', 26'' and 26''' in the pivot holder members in previous drawings are now each a common hole through both hinge portions of a member having a hinge pin therethrough and so have been redesignated 26p, 26p', 26p'', and 26p''' in these figures. The designator 35 has again been used for one of the added actuators, actuator 35 is being shown as an electric motor (without any controls therefor being shown) having a rotating output shaft again connected to crank arm 36 which in turn is connected to lower pivoting link 20''. A further actuator has been added shown as an electric motor, 37, (again without any controls therefor being shown) that is in a support 14, as are the others, and has its rotatable output shaft connected to a further crank arm, 38, which is connected to lower pivoting link 20'''.

Figure 32:
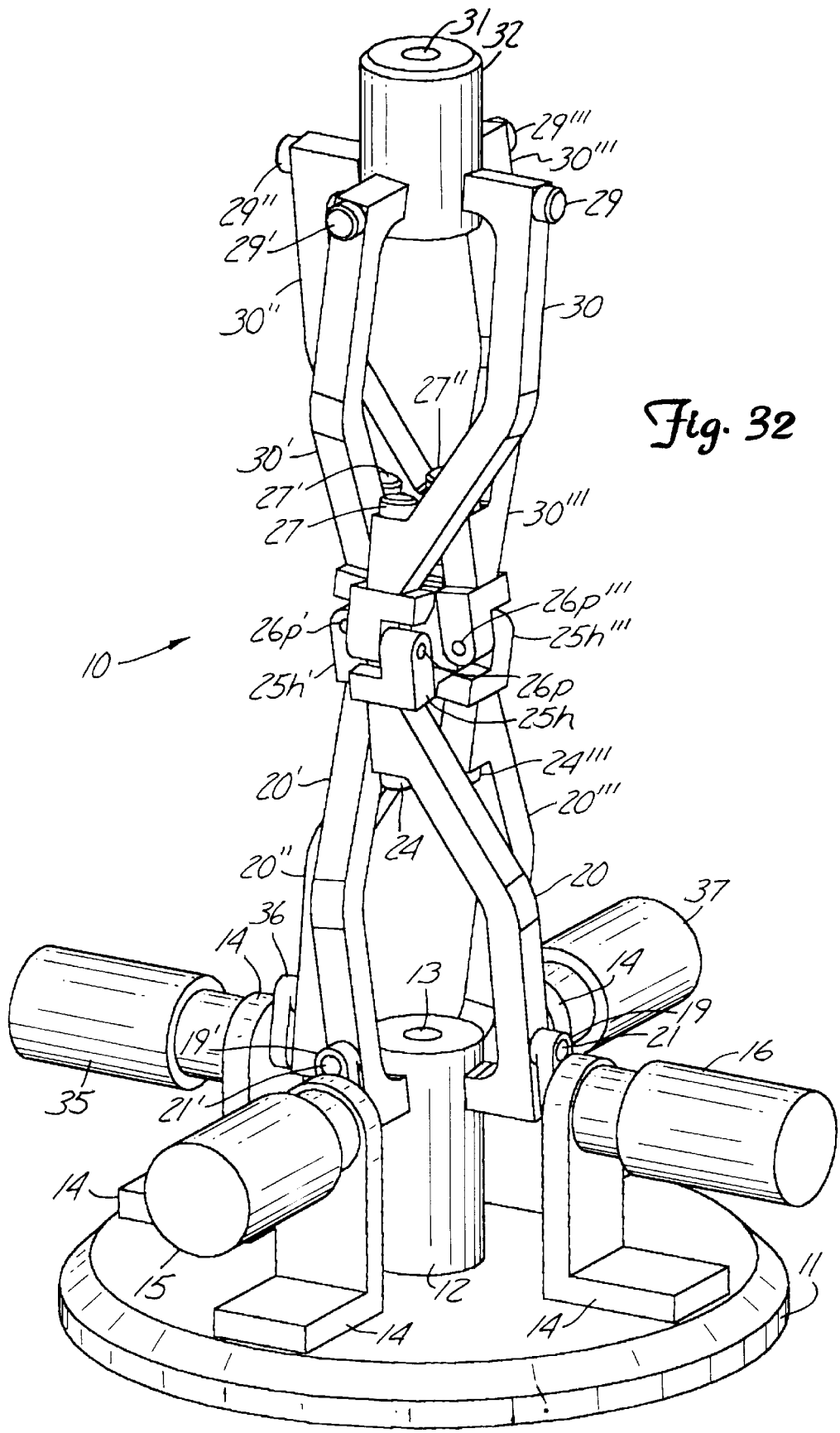

If each of electric control motors 15, 16, 35 and 37 operates its rotatable output shaft in a clockwise direction when looking from the back of a motor toward base support 12, each such rotation will cause the lower pivoting link connected thereto to also rotate in a clockwise direction to lift the opposite end thereof connected to a pivot holder member upward away from base 11 and toward the axis of rotational symmetry of base support 12, i.e. the vertical direction, with the result seen in FIG. 32. In turn, the hinge portion of the pivot holder member rotatably connected to each of these lower pivoting links is forced to rotate in one direction about the hinge pin that rotatably connects it to the other hinge portion of that pivot holder member. The accompanying inward motion of the lower pivoting link end and the connected pivot holder member portion forces the other hinge portion of that member rotatably connected to a corresponding upper pivoting link to rotate in an opposite direction about this hinge pin and forces this latter link upward as the angle between the hinge portions increases. That is, such rotations by these motors of the lower pivoting links that are matched both in angular extent and direction results in moving manipulable support 32 away from base support 12 along the axis of radial symmetry of manipulable support 32. Conversely, if each of these electric motors rotates in a counterclockwise direction to a matched extent, manipulable support 32 will be moved toward base support 12 along the radial axis of symmetry of that support as the angles between the pivot holder member hinge portions decrease.

On the other hand, matched rotations in opposite directions of the members of a pair of motors positioned on opposite sides of base support 12 across from one another, without rotation of the other pair of motors, will result in tilting manipulable support 32 toward the direction the electric motor rotating in a counterclockwise direction is moving the holder connected end of the lower pivoting link connected thereto which will be over one of the nonrotating motors. Adding clockwise rotation to the previously nonrotating motors will allow a significant increase in the tilt angle achieved but will reduce any extension of manipulable support 32 along its axis of radial symmetry at some point because the angle between the hinge portions of the pivot holder members cannot be increased much before interference occurs between the pivot holder members reaching approximately vertical positions.

Matched rotations in opposite directions of the members of both pairs of motors positioned on opposite sides of base support 12 across from one another will result in tilting manipulable support 32 toward a direction halfway between the electric motors in the pairs that are rotating in a counterclockwise direction again with limited extension of manipulable support 32 along its axis of radial symmetry. Such rotations which are unmatched in magnitude will result in tilting manipulable support 32 toward a direction between the electric motors in the pairs that are rotating in a counterclockwise direction that is closer to the one rotates over the larger counterclockwise angle. The various tilts described above of manipulable support 32 from the vertical will be further described below. Of course, combined tilting motions and extension or contraction motions of manipulable support 32 along its axis of radial symmetry can be provided by suitable rotation of the output shafts of these motors in selected directions and amounts.

The upper pivoting links 30, 30', 30'' and 30''' are shown in FIGS. 30 through 32 assembled directly over corresponding ones of lower plurality pivoting links 20, 20', 20'' and 20''' on the same sides of supports 32 and 12. Again, this need not be the arrangement as the upper pivoting links can be assembled to extend from the side of manipulable support 32 which is opposite from the side of base support 12 to which the corresponding lower plurality pivoting link is rotatably connected. This latter arrangement can be seen in the plan view shown in FIG. 33 of joint or manipulator 10 so assembled.

Figure 33:
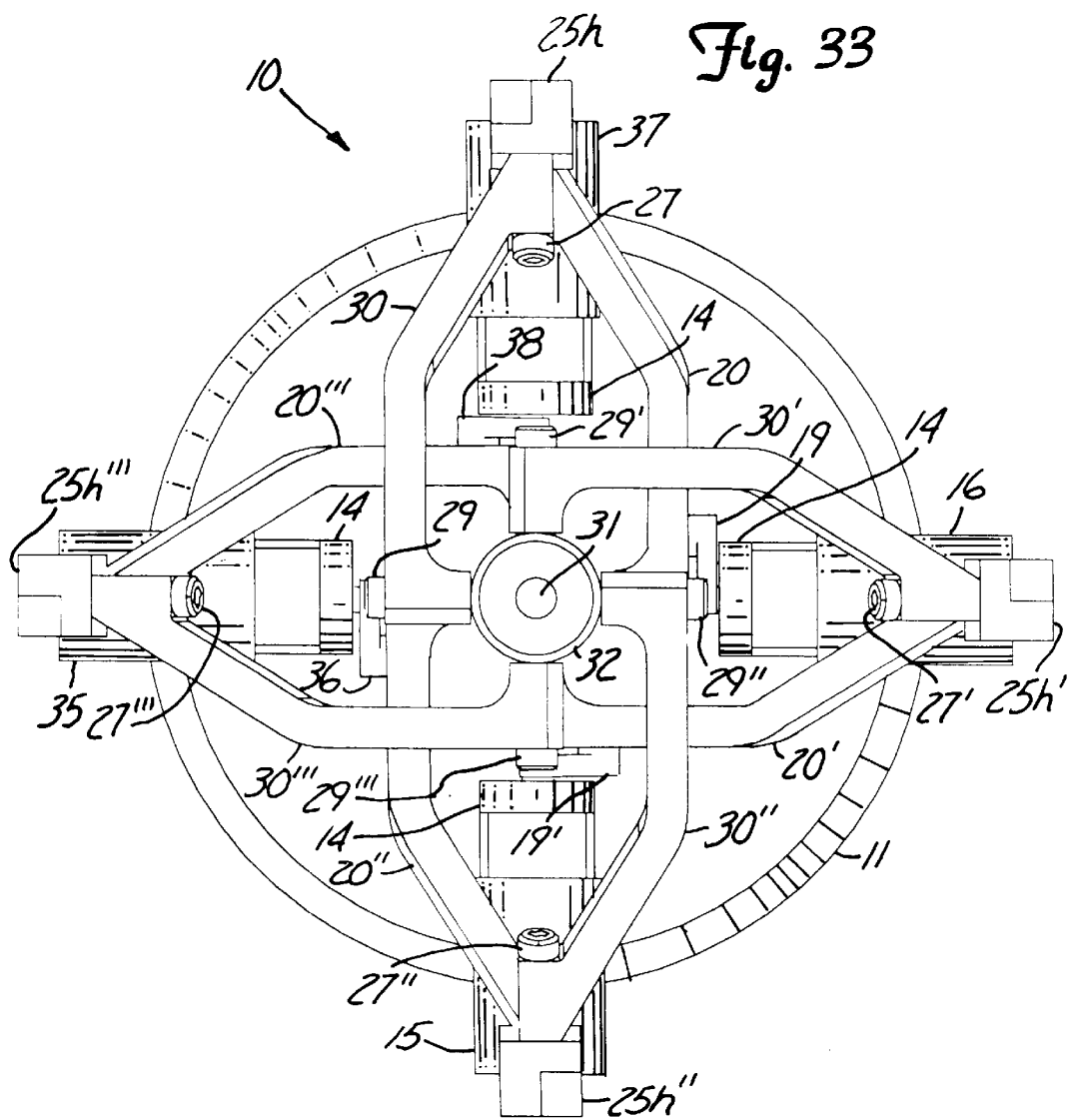
FIGS. 33 through 36 show a plan view and three perspective views of other embodiments of the present invention, and FIGS. 37A and B, 38A and B, and 39A, B and C show a further embodiment of the invention shown in FIGS. 30 through 32.
Figure 34:
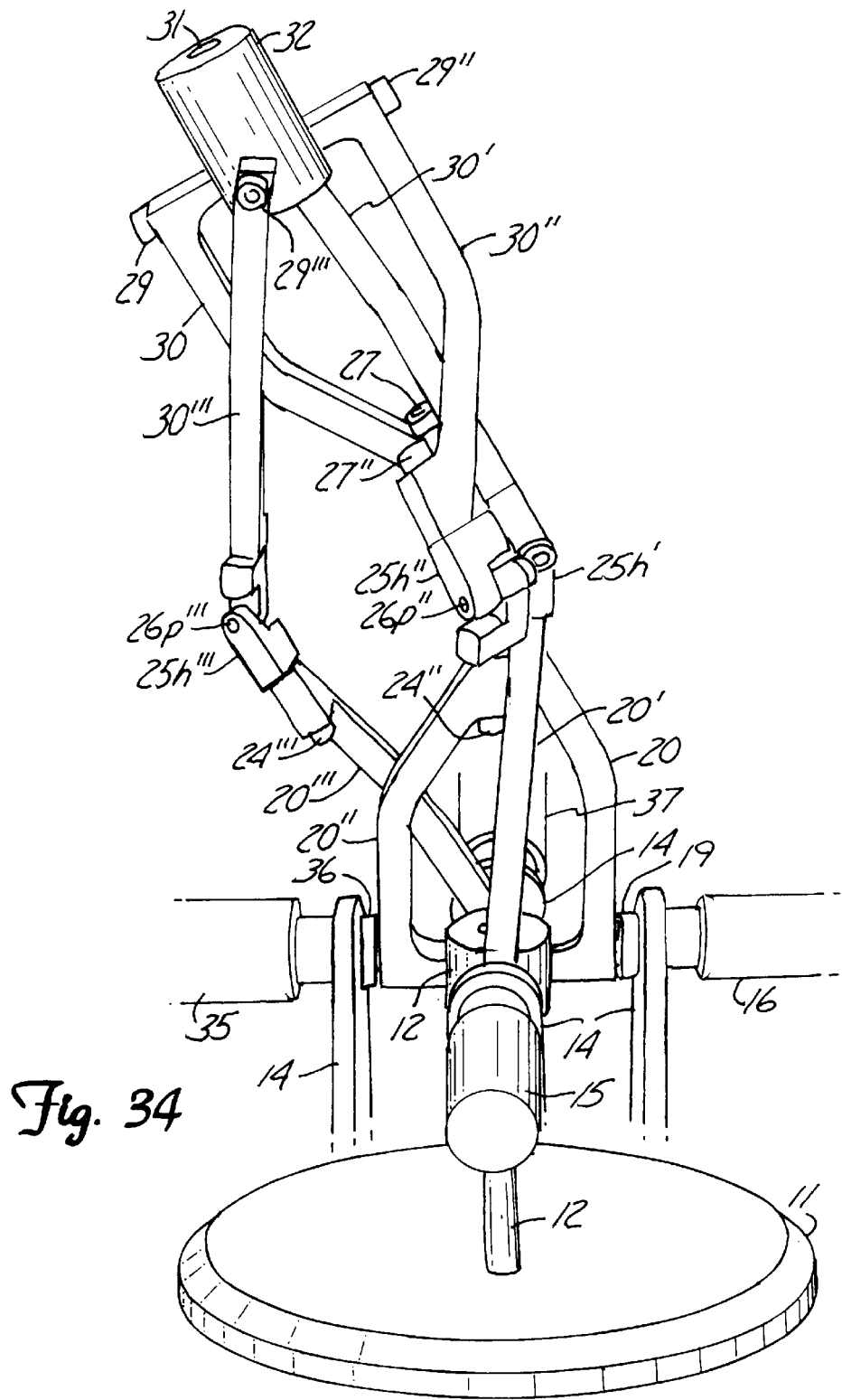
Figure 35:
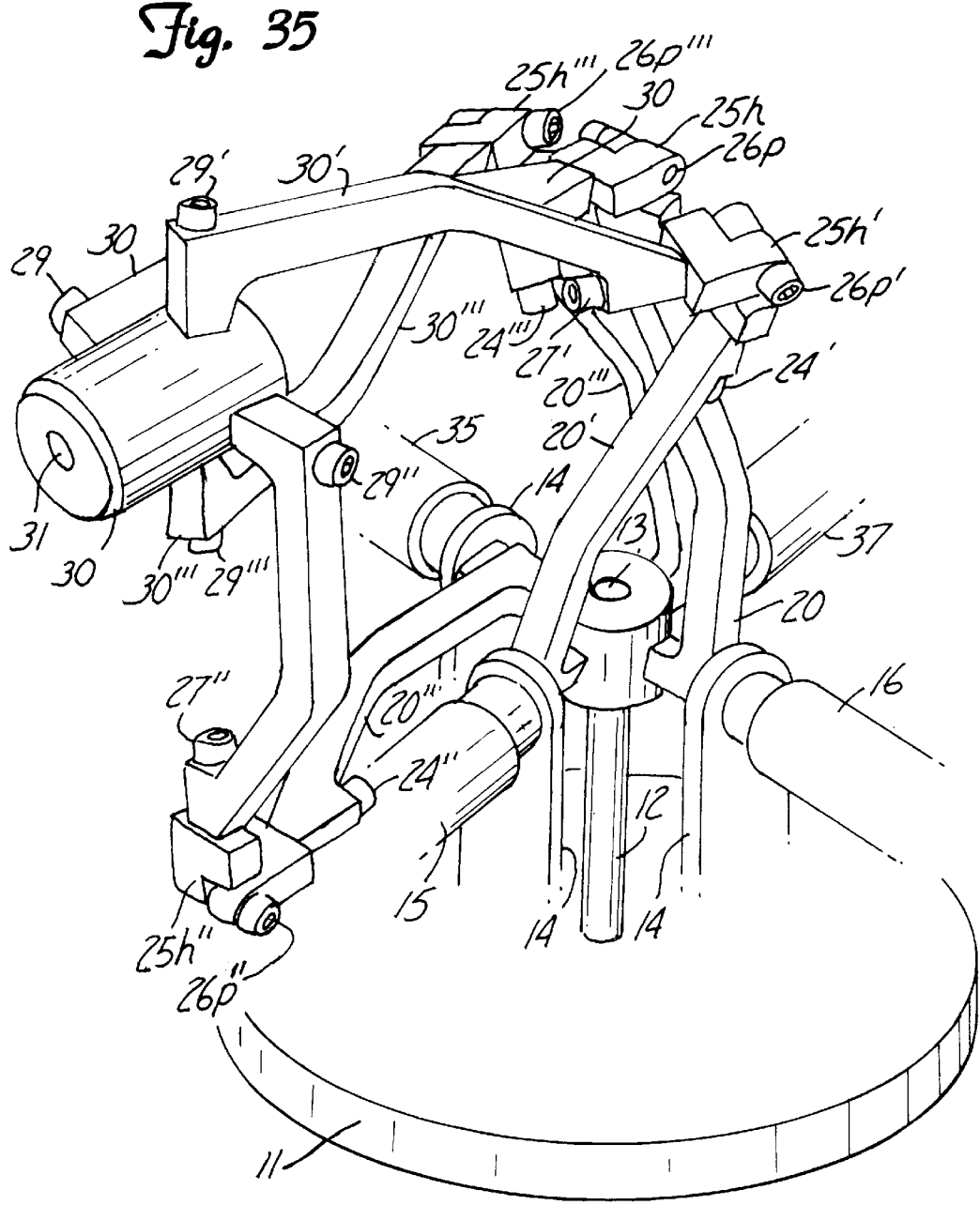
Figure 36:
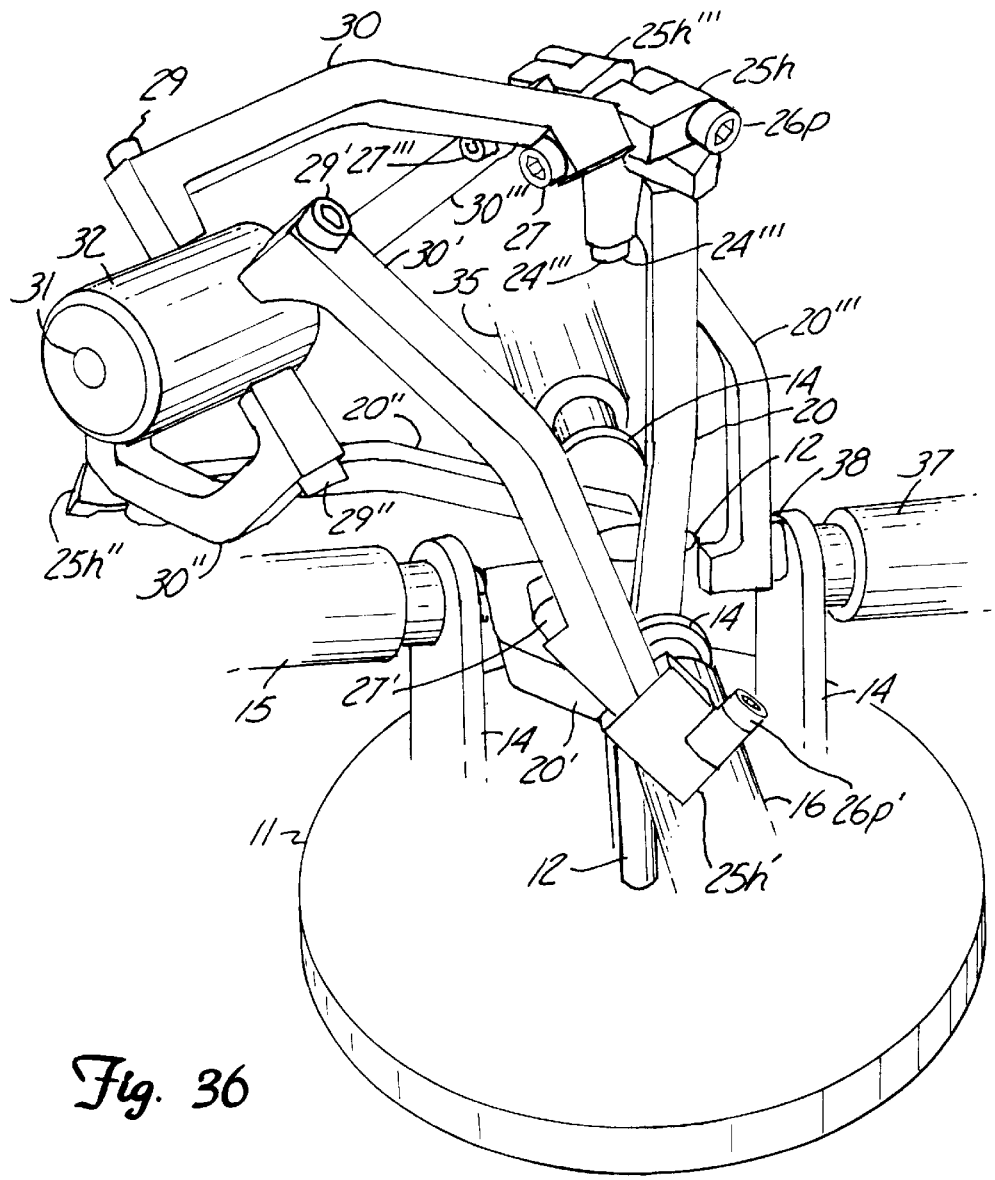

Three views of joint or manipulator 10 as assembled in FIG. 33 are shown in FIGS. 34, 35 and 36 each showing a different tilt angle achieved by manipulable support 32. In FIG. 34, manipulable support 32 is extended outward relatively far from base support 12 and tilted to approximately 45° from the vertical over motor 35. This required that motors 15, 16 and 35 each rotate the lower pivoting link connected thereto in a counterclockwise direction while motor 37 rotate lower pivoting link 20''' in a clockwise direction. If motors 15, 16 and 35 each rotate the lower pivoting link connected thereto in a counterclockwise direction to nearly a vertical position with motor 37 rotating lower pivoting link 20''' in a clockwise direction to a relatively small angle, manipulable support 32 will extend a considerable distance outward along its axis of rotational symmetry at this tilt angle. If, instead, motors 15, 16 and 35 each rotate the lower pivoting link connected thereto in a counterclockwise direction to a relatively small angle and motor 37 rotates lower pivoting link 20''' in a clockwise direction to a relatively large angle, manipulable support 32 can achieve this same tilt angle but with much less extension outward along its axis of rotational symmetry.

FIG. 35 shows manipulable support 32 rotated to something more than 90° from the vertical over motor 15. This is achieved by motors 15, 16 and 37 having rotated the lower pivoting links to which they are connected in a counterclockwise direction to approximately a vertical position with motor 35 having rotated lower pivoting link 20" in a clockwise direction to a below horizontal position.

The situation in FIG. 36 has manipulable support 32 rotated to something more than 90° from the vertical along a vertical plane which is oriented at about 45° from each of motors 15 and 16. This result comes about by motors 16 and 37 having rotated lower pivoting links 20 and 20''', respectively, in a counterclockwise direction to approximately a vertical position with motors 15 and 35 correspondingly having rotated lower pivoting links 20' and 20''' in a clockwise direction to a below horizontal position.

Other azimuthal angle positions with respect to base support 12, along with selected angular deviations from vertical, can be provided for manipulable support 32 by corresponding combinations of direction and amount of rotation of each of electric motors 15, 16, 35 and 37. Here again, although the separation of manipulable support 32 from base support 12 can be significantly increased when the axis of rotational symmetry of manipulable support 32 is aligned with, or at relatively small angles with respect to, the axis of rotational symmetry of base support 12, the possibility of such a separation increase between these supports is reduced as the tilt angle of support 32 increases from the aligned position to significantly larger angular deviation values because of the occurrence of interference between the pivoting links.

Figure 37A:
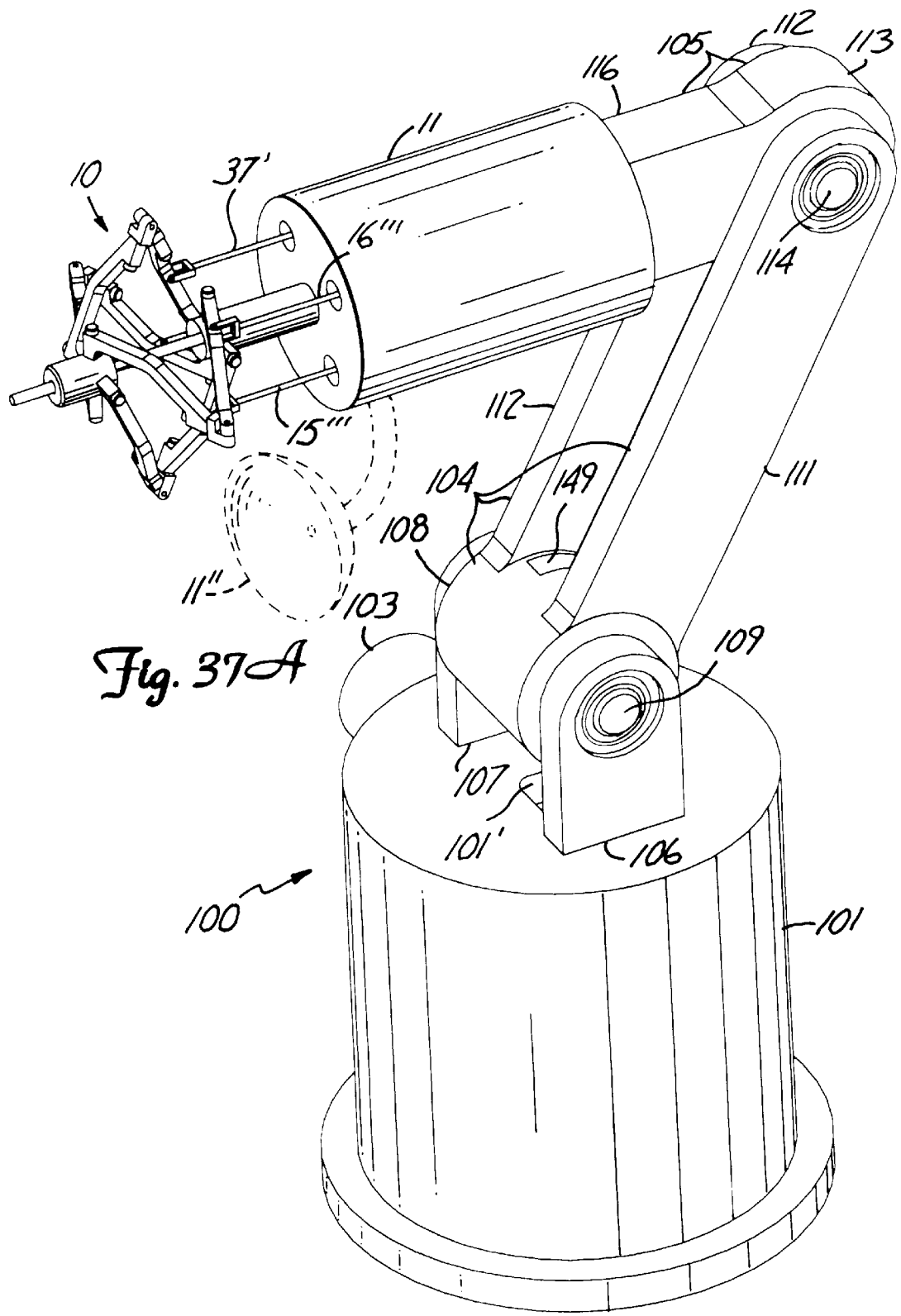
Figure 37B:
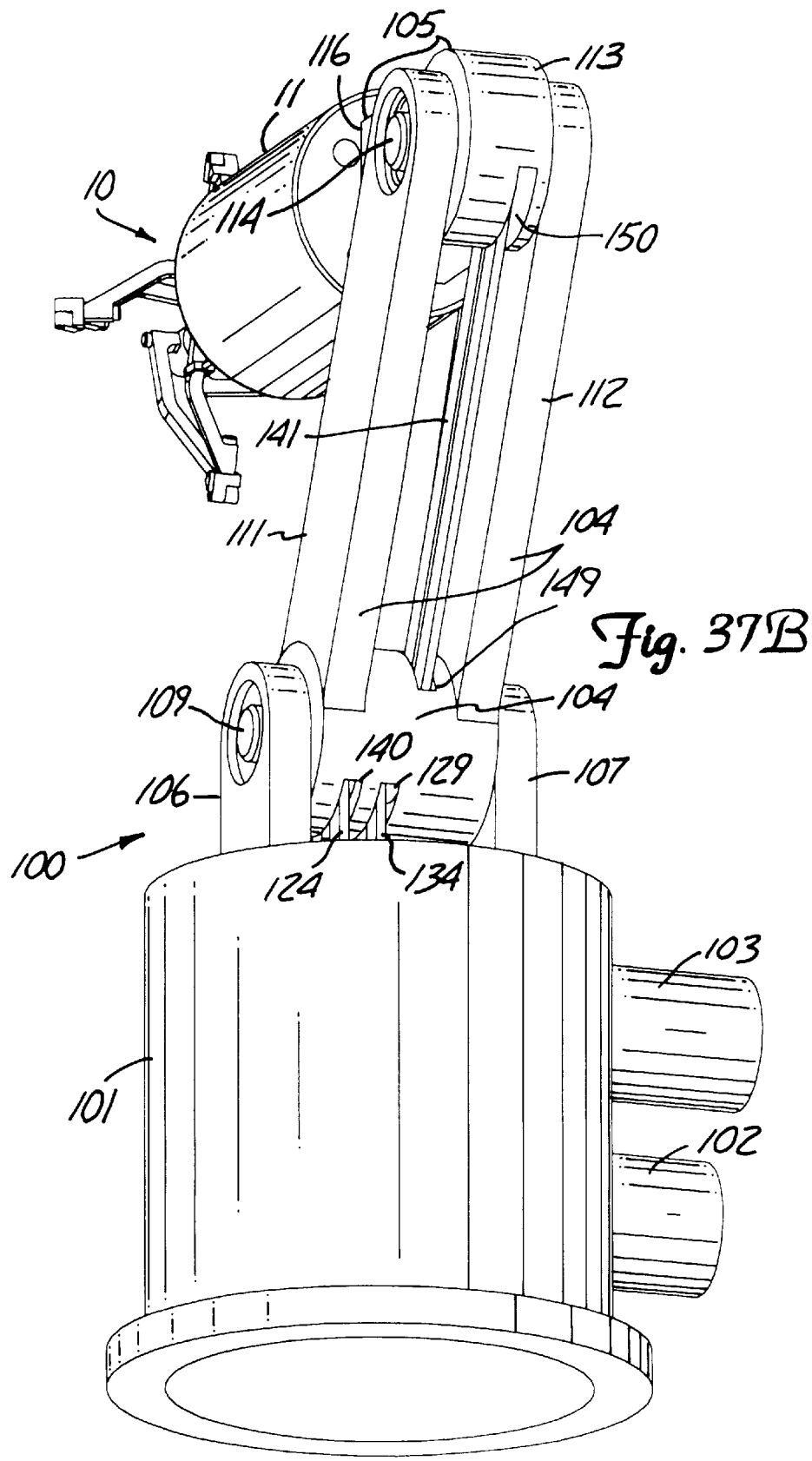

The capability of joint or manipulator 10 set out in FIGS. 30 through 36 to move precisely not only over a spatial surface defined by the range of tilt angles available to manipulable support 32, but also angularly over different spatial surfaces offset from one another in radial directions with respect to base support 12 (at least at angles from the vertical not too far from the vertical) provides an instrument capable of intricate actions at its output end, that is, at manipulable support 32. Uses for such an instrument might include assembling components into an assembly, altering surfaces of materials through various kinds of surface geometry or texture changing activities, or performing surgical procedures. FIGS. 37A and B show one example of a support and positioning mount, 100, for joint or manipulator 10 that could be used in undertaking such activities. Mount 100 has a rotatable base, 101, in which two electric motors, 102 and 103, are supported such that the rotatable shafts of each are exposed within base 101. The rotating mechanism for base 101 is not shown in these figures but is easily provided such as by providing teeth on the lower rim of base 101 to be driven by a motor having a gear on its rotating shaft.

Motors 102 and 103, under the control of an external control system not shown, are used to operate a mechanism to be described below which operates two independently rotatable extensions, 104 and 105. A pair of bosses, 106 and 107, are mounted on the upper exposed surface of base 101 with a space therebetween to accommodate a cylindrical housing portion, 108, of extension 104. Cylindrical housing portion 108 has a pair of end shafts, 109 and 110, which extend into openings in bosses 106 and 107, respectively, to be supported in those openings by ball bearing arrangements, or bushings, so that end shafts 109 and 110 can rotate relatively freely therein with respect to these bosses.

Extension 104 has a further pair of arms, 111 and 112, spaced apart from one another by each being mounted rigidly to cylindrical housing portion 108 near a corresponding end of that housing. Extension 105 has a cylindrical housing portion 113 with a pair of end shafts, 114 and 115, each extending from a corresponding end thereof. End shafts 114 and 115 each fit into a corresponding opening in one of arms 111 and 112 at the ends thereof opposite housing 108 to be supported by ball bearings, or bushings, in these openings so as to be able to rotate relatively freely with respect to these arms. Base 11 is rigidly mounted to an arm portion, 116, of extension 105. In precise manipulatory situations, base 11 may be positioned so as to be further supported by an auxiliary base support. Such an auxiliary support 11", is shown in dashed line form for a head surgery situation as a cup to be positioned against the patient's head to further steady base 11.

The mechanism for rotating extension 104 about an axis extending through end shafts 109 and 110, which are radially symmetric thereabout, and for rotating extension 105 about an axis extending through end shafts 114 and 115, which are radially symmetric thereabout, is more fully shown in FIGS. 38A and 38B in which some of the housing and extension structures have been broken away. The rotation of cylindrical housing 108 is controlled by the rotation of the output shaft of motor 102 to which is connected a disk, 120. Disk 120 has a first actuator link, 121, rotatably connected thereto by a pin, 122, near the periphery of that disk. Disk 120 also has affixed thereto at another point near the periphery of that disk a boss, 123. A further actuator link, 124, is rotatably connected to boss 122 via pin, 125. Boss 123 has an extent outward from disk 120 which is greater than the distance to the outer surface of actuator link 121 from disk 120.

The opposite end of actuator link 124 is rotatably connected by an unseen pin to an interior side, 126, of cylindrical housing 108, a connection which cannot be seen in these figures but which is made at a selected distance to the axis of rotation of that housing. The opposite end of actuator link 121 is rotatably connected to a boss, 127, affixed at another location to side 126 of cylindrical housing 108 by a pin, 128, at a distance from the axis of rotation of housing 108. Boss 127 has an extent outward from interior side 126 which is greater than the distance to the outer surface of actuator link 124 from side 126. Actuator links 121 and 124 extend from these last described connections in and to housing 108 through a slot opening, 129, therein to the connections to disk 120 through a further opening, 101', in mount 101.

Thus, rotation of disk 120 caused by motor 102 will cause cylindrical housing 108 to rotate within bosses 106 and 107 on end shafts 109 and 110. Since actuator link 121 can rotate underneath actuator link 124 at disk 120 due to boss 123, and since actuator link 124 can slide underneath actuator link 121 at interior wall 126 of cylindrical housing 108 due to boss 127, disk 120 could be rotated through about 330° between the points link 121 is in interference with boss 123. However, the actual limit on the rotation of disk 120 is set by the interference between slot opening 129 in cylindrical housing 108 and links 121 and 124 which allows about 180° of rotation to result in a similar rotation range for cylindrical housing 108.

The rotation of cylindrical housing 113 is controlled by electric motor 103 through the use of two pairs of actuator links and two rotating disks. The output shaft of motor 103 has a disk, 130, connected thereto to be rotated by that motor shaft. A first actuator link, 131, is rotatably connected to disk 130 by a pin, 132, at a location near the periphery of that disk. Disk 130 has a boss, 133, affixed thereto at another location near the periphery of that disk, and a second actuator link, 134, is rotatably connected to boss 133 by a pin, 135. Boss 133 has an extent outward from disk 130 which is greater than the distance to the outer surface of actuator link 131 from disk 130.

Actuator link 134 is, at its opposite end, is rotatably connected to a further disk, 136, near the periphery thereof on a first side of that disk by an unseen pin. Disk 136 has a boss, 137, affixed thereto also near the periphery thereof at another location on the first side of that disk, and actuator link 134 is rotatably connected to boss 137 by a pin, 138. Boss 137 has an extent outward from the first side of disk 136 which is greater than the distance to the outer surface of actuator link 134 from the first side of disk 136. Disk 136 is rotatably connected to an interior wall, 139, of cylindrical housing 108 at the first side of that disk by a bearing held in that wall that is holding the outer edge of the disk rotatably thereon. Actuator links 131 and 134 extend from their connections to disk 136 in cylindrical housing 108 through an opening, 140, therein to their connections to disk 130 through opening 101' in mount 101.

As a result, rotation of disk 130 by motor 103 will cause disk 136 to correspondingly rotate through the forces exerted thereon by actuator links 131 and 134. Again, since link 131 can slide beneath link 134 at disk 130 because of boss 133, and because link 134 can slide beneath link 131 at disk 136 because of boss 137, disk 130 could rotate about 330° between points of interference between link 131 and boss 133. Here again, however, the limitation on the rotation range of disk 130 is set by a link-housing opening stop to be described below which limits disk 136 to rotate over a similar angular range.

Disk 136 is rotatably connected at a second side thereof to a further actuator link, 141, by a pin, 142, near the periphery of that disk. A further boss, 143, is affixed to disk 136 near the periphery thereof at a different location on the second side thereof. A further actuator link, 144, is rotatably connected to boss 143 by a pin, 145. Boss 143 has an extent outward from the second side of disk 136 which is greater than the distance to the outer surface of actuator link 141 from the second side of disk 136.

Actuator link 144 is, at its opposite end, also rotatably connected to an interior surface, 146, of cylindrical housing 113 by a pin, 146', at a selected distance from its axis of rotation. A boss, 147, is affixed to interior surface 146 of cylindrical housing 113 at a distance from its axis of rotation in another location. Actuator link 141 is rotatably connected to boss 147 by a pin, 148. Boss 147 has an extent outward from interior surface 146 which is greater than the distance to the outer surface of actuator link 144 from surface 146. Actuator links 141 and 144 from their connections to disk 136 pass through a slot opening, 149, in cylindrical housing 108 and through a further slot opening, 150, in cylindrical housing 113 to reach their connections to interior surface 146.

Rotation of disk 136 will cause actuator links 141 and 144 to rotate cylindrical housing 113. Since link 141 can slide under link 144 at disk 136, and link 144 can slide underneath link 141 at interior surface 146 of cylindrical housing 113, the rotation of disk 136 again could occur over a range of about 330° but the limitation on this range is instead set by the link-housing opening interference. This interference is set by slot opening 150 and links 141 and 144 to allow about 180° of rotation, and a similar range of rotation for disk 130, which results in rotation of cylindrical housing 113 over a similar angular range.

Electrical wiring or optical cabling can be provided from base 101 through cylindrical housing 108 along or through one of arms 111 or 112 and through cylindrical housing 105 and an opening provided in arm 116 to reach base 11 for providing controlled actuation signals thereto. Such signals provide for controlling four linear actuators being used to operate joint or manipulator 10 rather than the four electric motors used for this purpose shown in FIGS. 30 through 36. Base 11 with these actuators is shown in greater detail in FIG. 39A where these linear actuators are designated 15''', 16''', 35' and 37'. Each of these linear actuators is rotatably coupled at one end thereof to a corresponding one of the pivoting links in the lower plurality thereof in FIG. 39A through a clevis arrangement when coupled thereto as shown in FIG. 39A. The corresponding pivoting link passes through the "U" shaped space in the corresponding clevis and is rotatably secured there by a pin passing through the pivoting link and both sides of the clevis. The resulting operation of joint or manipulator 10 is as described for the similar structures shown in FIGS. 30 through 36, but a further alternative is shown in FIG. 39A.

In this alternative, rather than holes 26p, 26p', 26p'' and 26p''' being provided in pivot holders 25h, 25h', 25h'' and 25h''' for the hinge pins as shown by solid lines, arcuate slots shown in dashed line form can alternatively be provided for the hinge pins to travel within. These pins in this alternative would be biased by springs or other means toward the inner ends of the corresponding one of the slots. In situations of manipulable support 32 being forced to approach base support 12, support 32 would be subject to more closely approaching support 12 with the application of sufficient further force so as to result in the hinge pins being forced against the bias toward the outer ends of the slots.

Figure 39B:
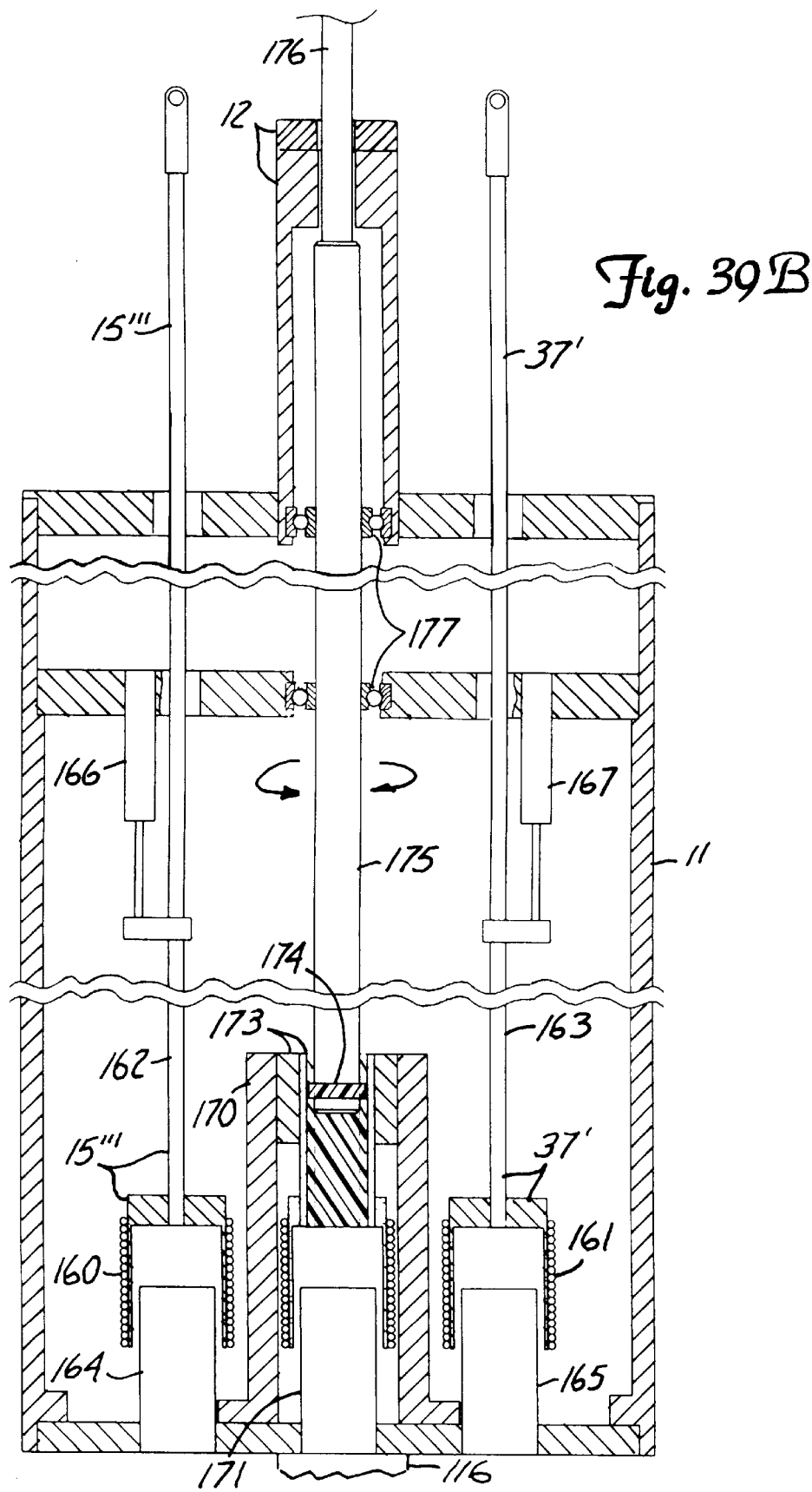

FIG. 39B is a cross-section view of the interior of base 11 taken from FIG. 39A showing the arrangements provided in implementing linear actuators 15''', 16''', 35' and 37'. Only actuators 15''' and 37' can be seen in the cross-section view of FIG. 39B.

Linear actuators 15''' and 37' are each formed by movable solenoidal coil structures, 160 and 161, which are affixed to the output shafts, 162 and 163, of linear actuators 15''' and 37', respectively. Solenoidal coil structure 160 can move back and forth along the axis of radial symmetry of a cylindrical magnetic slug, 164, mounted in the bottom plate of base 11. Similarly, solenoidal coil structure 161 can move back and forth along the axis of radial symmetry of a further cylindrical magnetic material slug, 165, also mounted in the bottom plate of base 11. Thus, appropriate electrical current selectively provided to the wire winding in solenoidal coil structure 160 or solenoidal coil structure 161 will cause those structures to move back and forth along the axis of radial symmetry of its corresponding magnetic slug to force shafts 162 and 163, respectively, back and forth to raise and lower the lower pivoting link to which it is rotatably connected by a corresponding clevis.

The positioning of those lower pivoting links is typically desired to be known by the not shown control system provided to operate joint or manipulator 10 for purposes of accurate and optimal control of the operation thereof. For this purpose, a pair of linear variable differential transformers, 166 and 167, are provided with one end thereof mounted on base 11 and the other end thereof affixed to the corresponding one of output shafts 162 and 163, respectively, to measure its relative translation. Additional wiring or optical cabling can be used to return such signals to and through mount 101, or they can be transmitted over the electrical wiring or optical cabling used in connection with the operation of solenoidal coils 160 and 161.

A further moveable structure provided in a cylindrical shell guide bushing, 170, and a corresponding cylindrical magnetic slug, 171, can be used to provide a rotating cable extending through manipulable support 32 at interior opening 31 therein to be present at the output of joint or manipulator 10. A threaded interior cylinder, 173, as a part of a further movable solenoidal coil structure mates with a threaded nut, 174, affixed to a cylinder, 175, holding a cable, 176. Supplying current to the solenoidal coil and solenoidal coil structure 173 causes that structure to move back and forth along the axis of rotational symmetry of magnetic slug 171 depending on the direction of the current. Correspondingly, the threads on interior cylinder portion of structurel 73 force threaded nut 174 to rotate thereby causing cylinder 175 and cable 176 to similarly rotate within bearings, 177.

Alternatively, a translating cable can be provided rather than a rotating cable, as shown in FIG. 39C, by eliminating threaded nut 174, the threaded sleeve portion of moveable solenoidal coil structure 173, guide 170, and bearings 177, and substituting a sheathed cable therefor. Cable holder 175 of FIG. 39B is an outer sheath, 175', in FIG. 39C which is fixedly held in base 11. Moveable solenoidal coil structure 173 is then free to move cable 176 back and forth in sheath 175 in accord with current supplied to the coil therein. If desired, the structures of FIGS. 39B and 39C can be combined to provide both rotational and translational capabilities in cable 176.

Alternatively, solenoidal coil structure 173 in FIG. 39C can be replaced by a motor with a rotatable shaft connected to a shaft replacing cable 176. Such a shaft is connected to a universal joint in base support 12. A further shaft is connected to that universal joint and to another such universal joint in manipulable support 32. The output shaft extends from this last universal joint out opening 31 in support 32.

Although the present invention has been described with reference to preferred embodiments, workers skilled in the art will recognize that changes may be made in form and detail without departing from the spirit and scope of the invention.

What is claimed is:

1. A controlled relative motion system permitting a controlled motion member, joined to another base member, to selectively move with respect to that base member, said system comprising:

a base support;

a manipulable support;

a first pivot holder comprising at least one holding member having a first portion thereof rotatably connected to a second portion thereof;

a first plurality of pivoting links each rotatably coupled to said base support so as to be rotatable about a corresponding base link axis and each coupled to said first pivot holder so as to be rotatable about a corresponding holder link axis including at least one of said first plurality of pivoting links being rotatably connected to said first pivot holder holding member first portion as aforesaid, each of said first plurality of pivoting links having said corresponding base link axis thereof extending in a direction differing from that in which said corresponding holder link axis thereof extends, each of said first plurality of pivoting links having said corresponding base link axis thereof and said corresponding holder link axis thereof extending in different directions than do said corresponding base link axis and said corresponding holder link axis of another of said first plurality of pivoting links; and a second plurality of pivoting links each rotatably coupled to said first pivot holder so as to be rotatable about a corresponding holder link axis and each coupled to said manipulable support so as to be rotatable about a corresponding support link axis including at least one of said second plurality of pivoting links being rotatably connected to said first pivot holder holding member second portion as aforesaid, each of said second plurality of pivoting links having said corresponding holder link axis thereof extending in a direction differing from that in which said corresponding support link axis thereof extends, each of said second plurality of pivoting links having said corresponding holder link axis thereof and said corresponding support link axis thereof extending in different directions than do said corresponding holder link axis and said corresponding support link axis of another of said second plurality of pivoting links.

2. The apparatus of claim 1 where one of said first plurality of pivoting links has said base link axis thereof and said holding link axis thereof each oriented substantially perpendicular to planes which intersect one another at substantially right angles.

3. The apparatus of claim 2 wherein each of said base link axes extend along a corresponding radius of a circle centered in said base support, and each said base link axis being separated from another such axis adjacent thereto by an angle substantially equal to 360° divided by that total number of said pivoting links in said first plurality of pivoting links.

4. The apparatus of claim 1 wherein each of said first plurality of said pivoting links is rotatably coupled to said base support through use of a pin extending between said base support and that said pivoting link about which rotation can occur by at least one of said base support and that said pivoting link.

5. The apparatus of claim 4 wherein at least one of said base support and said pivoting link between which said pin extends is coupled to said pin through a bearing means.

6. The apparatus of claim 4 wherein each of said first plurality of said pivoting links is rotatably coupled to said base support through use of a clevis supported by said base support.

7. The apparatus of claim 1 wherein said base support is held by a mounting arrangement.

8. The apparatus of claim 7 wherein said mounting arrangement comprises a base housing, a first rotatable housing and a second rotatable housing, said base housing comprising a pair of force imparting members each capable of providing a rotational motive force and each rotatably connected to a corresponding one of said first and second rotatable housings by at least one pair of rigid linking members.

9. The apparatus of claim 8 wherein each of said pair of force imparting members is rotatably connected to said pair of rigid linking members through a rotatable body, and said force imparting member rotatably connected to said second rotatable housing is so connected with two pairs of rigid linking members which are rotatably connected to one another through a further rotatable body.

10. The apparatus of claim 7 wherein said mounting arrangement comprises a cable extending through said base and manipulable supports and a cable motive means capable of rotating said cable with respect to said manipulable support.

11. The apparatus of claim 7 wherein said mounting arrangement comprises a cable extending through said base and manipulable supports and a cable motive means capable of translating said cable with respect to said manipulable support.

12. The apparatus of claim 1 wherein each of said base link axes extend along a corresponding radius of a circle centered in said base support, and each said base link axis being separated from another such axis adjacent thereto by an angle substantially equal to 360° divided by that total number of said pivoting links in said first plurality of pivoting links.

13. The apparatus of claim 1 further comprising a first plurality of force imparting members each coupled to a said pivoting link in said first plurality thereof so as to be able to cause at least one of those said pivoting links in said first plurality thereof to rotate about its corresponding said base link axis, and wherein at least one of said first plurality of force imparting members provides a rotational motive force.

14. The apparatus of claim 13 wherein each of said pivoting links in said first plurality thereof has coupled thereto a corresponding one of said first plurality of force imparting members.

15. The apparatus of claim 1 further comprising a first plurality of force imparting members each coupled to a said pivoting link in said first plurality thereof so as to be able to cause at least one of those said pivoting links in said first plurality thereof to rotate about its corresponding said base link axis, and wherein at least one of said first plurality of force imparting members provides a linear motive force.

16. The apparatus of claim 15 wherein each of said pivoting links in said first plurality thereof has coupled thereto a corresponding one of said first plurality of force imparting members.

* * * * *